(12) United States Patent
Akiyama

(10) Patent No.: US 6,812,668 B2
(45) Date of Patent: Nov. 2, 2004

(54) APPARATUS, METHOD AND PROGRAM FOR CONTROLLING AN ELECTRIC MOTOR

(75) Inventor: Shigeki Akiyama, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 86 days.

(21) Appl. No.: 10/383,558

(22) Filed: Mar. 10, 2003

(65) Prior Publication Data

US 2003/0178958 A1 Sep. 25, 2003

(30) Foreign Application Priority Data

Mar. 25, 2002 (JP) .......................... 2002-083102
Jun. 28, 2002 (JP) .......................... 2002-190106

(51) Int. Cl.[7] .............. B41J 19/18; H02P 5/00
(52) U.S. Cl. .............. 318/610; 318/599; 318/621; 318/632
(58) Field of Search .............. 318/293, 568.22, 318/599, 600, 601, 602, 603, 610, 621, 632

(56) References Cited

U.S. PATENT DOCUMENTS

| | | | | |
|---|---|---|---|---|
| 5,124,626 A | * | 6/1992 | Thoen | 318/610 |
| 5,475,291 A | * | 12/1995 | Yoshida et al. | 318/568.22 |
| 5,625,264 A | * | 4/1997 | Yoon | 318/254 |
| 6,127,793 A | * | 10/2000 | Kerner | 318/561 |
| 6,198,246 B1 | * | 3/2001 | Yutkowitz | 318/561 |

FOREIGN PATENT DOCUMENTS

| | | |
|---|---|---|
| JP | A 8-101716 | 4/1996 |
| JP | A 2001-186785 | 7/2001 |
| JP | A 2001-253132 | 9/2001 |

* cited by examiner

*Primary Examiner*—Bentsu Ro
(74) *Attorney, Agent, or Firm*—Oliff & Berridge, PLC

(57) ABSTRACT

Apparatus, method and program for controlling electric motors to drive movable objects, wherein an input-rectifying device is operable, when a control signal to be applied to one of the electric motors requires the motor to be operated so as to operate the object in a direction opposite to a predetermined direction, to rectify the control signal so as to limit a motion of the object in the opposite direction, and a differential-control-quantity compensating device is operable after expiration of a predetermined time after a differential control quantity used together with proportional and integral control quantities to generate a control signal to be applied to another motor is updated on the basis of an error between a detected speed and a target speed of the object, so as to reduce the differential control quantity.

51 Claims, 22 Drawing Sheets

EXAMPLE OF VELOCITY CONTROL RESPONSE
ACCORDING TO FIRST SPECIMEN APPARATUS OF THE INVENTION

EXAMPLE OF VELOCITY CONTROL RESPONSE
ACCORDING TO PRIOR ART APPARATUS

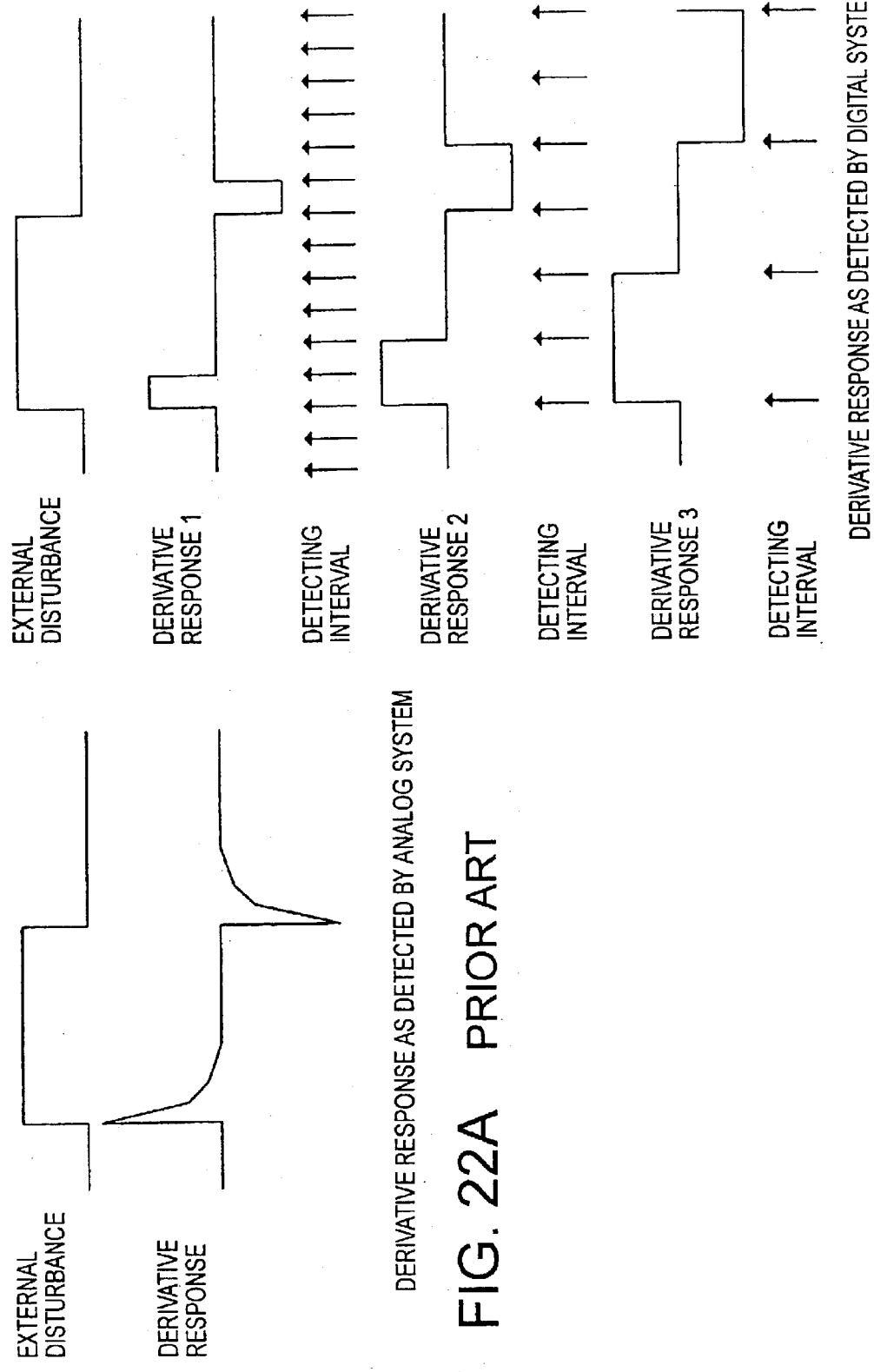

APPARATUS, METHOD AND PROGRAM FOR CONTROLLING AN ELECTRIC MOTOR

The present application is based on Japanese Patent Application Nos. 2002-083102 and 2002-190106 respectively filed on Mar. 25, 2002 and Jun. 28, 2002, the content of which is incorporated herein by reference.

BACKGROUND OF THE INVENTION

1. Field of the Invention

The present invention relates in general to an apparatus, a method and a program for controlling an electric motor by feedback control using a state estimator or an observer and an apparatus and a method for controlling an operating speed of an electric motor by feedback control to drive a movable object such that a moving speed of the movable object coincides with a target speed value.

2. Discussion of Related Art

There is known an apparatus arranged to control an electric motor by feedback control using a state estimator. FIG. 21 illustrates an example of a feedback control system using a state estimator. This feedback control system includes a state estimator 0 which estimates a state quantity x representative of an internal state of a movable object A, on the basis of a control input u that is a value of a control signal to be applied to an electric motor M, and a control output y representative of an actual operating state of the movable object A as driven by the electric motor M. The control input u to be applied to the electric motor M is generated on the basis of a product of the estimated state quantity x and a gain g, and a product of the gain g and an integrated error (r−y) between a target value r of a control quantity of the electric motor M and the control output y. According to this feedback control, the operation of the electric motor M is controlled such that the control output y eventually coincides with the target value r.

The operating state of the movable object A is usually detected on an output of an encoder, which is arranged to generate encoder signals as the rotor of the electric motor M is rotated. A count of the encoder signals is used as the control output y of the movable object A. When the control input u applied to the electric motor M is a positive value, the angular velocity of the motor M in its forward or normal operating direction is increased according to an absolute value of the control value u. When the control input u is a negative value, on the other hand, the angular velocity of the motor M in its reverse direction is increased, that is, the angular velocity of the motor M in its forward operating direction is reduced, according to the absolute value of the control input u.

However, the motor control apparatus arranged as described above suffers from a risk of temporary operation of the electric motor M (or the movable object) in the direction opposite to the direction in which the motor M is always operated to operate the movable object in the predetermined direction.

Where the electric motor is turned off immediately after the last encoder signal is generated by the encoder provided to detect the operating state of the movable object, there is a comparatively long time interval between the moment at which the motor is turned on again and the moment at which the next encoder signal is to be generated (at which the first encoder signal is to be generated after the motor is turned on again). Where the motor is turned off immediately before the next encoder signal is to be generated by the encoder, there is a comparatively short time interval between the moment at which the motor is turned on again and the moment at which the next encoder signal is to be generated. Thus, the time interval between the moment when the motor is turned on again and the moment at which the next encoder signal is to be generated varies depending upon the moment at which the motor is turned off at the end of the last operation.

Where there is a comparatively long time interval between the moment at which the motor is turned on again and the moment at which the next or first encoder signal is to be generated, only the state quantity x estimated by the state estimator increases during this comparatively long time interval, so that the control signal input to further increase the angular velocity of the motor is applied to the motor. As a result, the count of the encoder signals and the control output y accordingly increase, so that the count of the encoder signals eventually exceeds a value corresponding to the state quantity x as estimated by the state estimator. Consequently, the control signal input to reduce the angular velocity of the motor is applied to the motor. In a transient period immediately after the moment of starting of the motor, the angular velocity of the motor is not so high. In this transient period, therefore, a relatively large amount of reduction of the angular velocity of the motor as represented by the control signal input may cause a risk that the motor is not merely stopped with its operating velocity being zeroed, but the motor is operated in the opposite direction.

Where there is a comparatively short time interval between the moment at which the motor is turned on again and the moment at which the next or first encoder signal is to be generated, the count of the encoder signals and the control output y increase during this comparatively short time interval before the state quantity x estimated by the state estimator increases, so that the control signal input to reduce the angular velocity of the motor is applied to the motor. As in the case where there is a comparatively long time interval between the next or first encoder signal is to be generated after the motor is turned on again, a relatively large amount of reduction of the angular velocity of the motor as represented by the control signal input may cause a risk that the motor is not merely stopped, but the motor is operated in the opposite direction.

After the electric motor is thus operated in the opposite direction, the state quantity x estimated by the state estimator becomes larger than a value corresponding to the count of the encoder (the control output y), so that control signal input to increase the angular velocity of the motor is applied to the motor, whereby the operation of the motor in the opposite direction is terminated in a short time. However, the temporary operation of the motor in the direction opposite to the direction of the normal operation of the motor results in a temporary operation of the movable object in the opposite direction, leading to a considerable amount of vibration of the motor and the movable object.

Where the movable object is a paper feeding mechanism arranged to feed a paper in a printer, the temporary operation of the motor in the opposite direction causes the paper to be fed in the reverse direction during the operation of the paper feeding mechanism to feed the paper in the predetermined forward direction, thus giving rise to a risk of deterioration of accuracy of positioning of the paper.

In a serial printer (e.g., an ink-jet printer) wherein a printing head performs a printing operation on a sheet of paper while the printing head is moved relative to the sheet of paper, a carriage carrying the printing head is moved by a carriage drive motor. To assure high accuracy of positioning of images printed on the sheet of paper, the moving speed of the carriage is required to be controlled with high accuracy, within a predetermined printing area of the sheet of paper. To this end, the moving speed of the carriage is detected by a suitable detector such as an encoder, and an electric current to be applied to the carriage drive motor (CR motor) is controlled according to a suitable control algorithm such as a PID control algorithm such that the detected moving speed of the carriage coincides with a predetermined target speed value, so that a torque generated by the CR motor to drive the carriage is controlled.

In the PID control, control quantities in the form of a proportional control quantity, an integral control quantity and a differential control quantity are calculated on the basis of the detected moving speed of the carriage or a speed error between the detected moving speed and the target speed value. Of these control quantities, the differential control quantity is used to control the electric motor, so as to reduce an influence of an external disturbance of a transient or instantaneous nature.

Where the moving speed of the carriage is detected in a discontinuous or discrete manner, the moving speed used to calculate the control quantities is not updated until the next speed detecting signal is generated. That is, although the actual moving speed has been changed, the moving speed used to calculate the control quantities is kept constant at the last detected value. Thus, the electric motor cannot be controlled adequately so as to reflect the actual moving speed of the carriage.

Described more specifically, where an external disturbance (a variation in the moving speed) is detected by a continuous system (analog system), a derivative response (differential control quantity) has a waveform wherein the differential control quantity abruptly changes upon generation of the external disturbance, as indicated in FIG. 22A. Where the external disturbance is detected by a discrete system (digital system), the derivative response is held constant until the next speed detecting signal is generated, as indicated in FIG. 22B.

A possibility of inadequate control of the moving speed increases with an increase in the detecting interval. The inadequate control includes an overshoot that the actual moving speed becomes considerably higher than the target speed, and an oscillation of the moving speed which is an oscillatory change of the moving speed to and from the target speed. In FIG. 22B, the waveforms of derivative responses 1, 2 and 3 are obtained where the detecting interval is relatively short, medium and long, respectively.

By shortening the detecting interval, it is possible to shorten the time period during which the control quantities are inadequately calculated on the basis of the detected moving speed which is different from the actual moving speed. This arrangement may reduce the possibility of inadequate control of the motor.

However, the shortening of the detecting interval is limited, and does not make it possible to sufficiently reduce the possibility of the inadequate control of the motor. Further, even where the detecting interval is shortened, the actual moving speed of the carriage when the motor is controlled on the basis of the differential control derivative calculated upon generation of the instantaneous external disturbance changes in a time shorter than the shortened detecting interval, so that there is a high possibility that the control quantities become inadequate before the next speed detecting signal is generated.

SUMMARY OF THE INVENTION

It is a first object of the present invention to minimize a risk of a temporary operation of an electric motor or a movable object in a direction opposite to a predetermined direction in which the motor or movable object is to be normally operated. It is a second object of this invention to minimize an influence of an instantaneous external disturbance which would cause an inadequate control of an electric motor where a moving speed of a movable object moved by the electric motor is detected by a discrete or digital system. The first or second object may be achieved according to any one of the following modes of the present invention in the form of a motor control apparatus, a motor control method or a motor control program, each of which is numbered like the appended claims and depends from the other mode or modes, where appropriate, for easier understanding of technical features disclosed in the present application and possible combinations of those features. However, it is to be understood that the invention is not limited to those technical features or combinations thereof, and that any one of a plurality of technical features described below with respect to any one mode of the invention may be a subject matter of the present invention, without the other technical feature or features being combined with that one technical feature.

(1) An apparatus for controlling an electric motor provided to drive a movable object, comprising:

a target inputting portion operable to input a target value for controlling a motion of the movable object by the electric motor;

a detector operable to detect one of the motion of the movable object or a motion of the electric motor;

a first signal generator operable to generate a first control signal on the basis of an output of the detector and the target value input by the target inputting portion;

an estimator operable to estimate a state quantity indicative of a state of the motion of the movable object, on the basis of the output of the detector and a motor control signal applied to the electric motor;

a second signal generator operable to generate a second control signal on the basis of the state quantity estimated by the estimator;

a motor-control-signal generator operable to generate the motor control signal on the basis of the first control signal and the second control signal; and a rectified-input applying portion operable when the motor control signal requires the electric motor to be operated so as to operate the movable object in an opposite direction opposite to a predetermined direction, the rectified-input applying portion rectifying the motor control signal so as to limit the motion of the movable object in the above-indicated opposite direction, and applying the rectified motor control signal to the electric motor.

In the motor control apparatus constructed according to the above mode (1) of the present invention, the rectified-input applying portion is operated when the motor control signal generated by the motor-control-signal generator requires the electric motor to be operated so as to operate the movable object in the direction opposite to the predetermined or desired direction, so that the motor control signal rectified by the rectified-input applying portion so as to limit the motion of the movable object in the opposite direction is applied to the electric motor. Thus, the present motor control apparatus makes it possible to minimize a risk of a temporary motion of the movable object in the direction opposite to the predetermined or desired direction.

The above-indicated predetermined or desired direction of operation of the movable object is a direction in which the movable object is to be operated in a normal state, or a direction in which the movable object is designed to be operated.

The detector is provided to detect the motion of the movable object or electric motor, and may include a rotary or linear encoder. Where the encoder is used, encoder signals generated by the encoder are counted, and a count of the encoder signals may be used as an output of the detector indicative of the motion of the movable object or electric motor.

The motor-control-signal generator is arranged to generate the motor control signal to be applied to the electric motor, on the basis of the first control signal generated by the first signal generator and the second control signal generated by the second signal generator. The motor-control-signal generator may be arranged such that when one of the first and second control signals is not present, the motor control signal is generated on the basis of only the other of the first and second control signals.

The rectified-input applying portion is arranged to rectify or adjust the motor control signal so as to limit or restrict the motion of the movable object in the opposite direction, and apply the thus rectified or adjusted motor control signal to the electric motor. With the electric motor controlled according to the rectified motor control signal, the motion of the movable object in the direction opposite to the predetermined or desired direction is limited or restricted. For instance, the rectified-input applying portion is arranged to rectify the motor control signal, so as to prevent or inhibit a rotary motion of the electric motor in the direction opposite to the predetermined direction. The rectified-input applying portion may be arranged to apply the rectified motor control signal directly to the electric motor, or indirectly to the electric motor through a suitable motor driver circuit provided to drive the electric motor.

The present motor control apparatus wherein the rectified-input applying portion is operable to limit the motion of the movable object in the direction opposite to the predetermined direction may be modified such that the rectified-input applying portion is operable when the motor control signal requires the electric motor to be operated so as to operate the movable object in a direction different or other than the predetermined direction, so that the rectified motor control signal is applied to the electric motor so as to limit the motion of the movable object in the direction other than the predetermined direction.

(2) An apparatus according to the above mode (1), wherein the rectified-input applying portion applies to the electric motor the motor control signal as generated by the motor-control-signal generator, when the motor control signal requires the electric motor to be operated so as to operate the movable object in the predetermined direction.

In the motor control apparatus according to the above mode (2) of the invention, the motor control signal as generated by the motor-control-signal generator is applied to the electric motor when the motor control signal requires the electric motor to be operated so as to operate the movable object in the predetermined direction.

The operation of the rectified-input applying portion to rectify the motor control signal which requires the electric motor to be operated so as to operate the movable object to be operated in the opposite direction may be always performed after an initiation of the operation of the electric motor. However, the electric motor may be required to be operated so as to operate the movable object in the opposite direction opposite to the predetermined direction. For example, the electric motor may be controlled so as to activate the movable object in the opposite direction, when the motion of the movable object in the predetermined direction at a relatively high speed is stopped or terminated, by applying to the electric motor the motor control signal that causes the application of a plugging brake to the electric motor for braking the movable object to decelerate its motion. In view of this situation, the rectified-input applying portion is preferably arranged according to the following mode (3):

(3) An apparatus according to the above mode (1) or (2), wherein the rectified-input applying portion is operable for a predetermined time period after a moment of initiation of an operation of the electric motor, and when the motor control signal requires the electric motor to be operated so as to operate the movable object in the direction opposite to the predetermined direction.

In the motor control apparatus according to the above mode (3), the motor control signal is rectified for only the predetermined time period after the moment of initiation of the electric motor. A motion of the movable object in the opposite direction generally takes place in an initial or transient time period immediately after the moment of initiation of the operation of the electric motor. In view of this, it is desirable to set this transient time period as the time period during which the rectified-input applying portion is held operable to rectify the motor control signal for limiting the motion of the movable object in the opposite direction. This arrangement permits a plugging brake to be applied to the electric motor as needed, after the transient period has expired.

Namely, after the initial or transient time period immediately after the moment of initiation of the operation of the electric motor has expired, the rectified-input applying portion is inoperable to rectify the motor control signal, so that the electric motor can be braked by application of a plugging brake thereto, so that the movable object can be rapidly decelerated and stopped.

The time period during which the motor control signal so as to limit the motion of the movable object in the opposite direction is rectified by the rectified-input applying portion may be detected by measuring a time after the moment of initiation of the electric motor, or by comparing the output of the detector with a predetermined threshold value. Further, this time period may be either a constant time during or may be changed depending upon a suitable parameter, as in the apparatus according to the following mode (4):

(4) An apparatus according to the above mode (3), further comprising a rectifying-time-period changing portion operable to change the time period depending upon the target value.

In the motor control apparatus according to the above mode (4), the rectified-input applying portion is held operable to rectify the motor control signal for the time period which varies with the target value inputted by the target inputting portion.

Generally, the speed of motion of the movable object (or the angular velocity of the electric motor) is determined by the target value inputted by the target inputting portion. Namely, where the target value is relatively large, that is, where the amount of motion of the movable object (or the amount of operation of the electric motor) is relatively large, the speed of motion of the movable object (or the angular velocity of the electric motor) is accordingly high. Where the target value is relatively small, that is, where the amount of motion of the movable object (or the amount of operation of the electric motor) is relatively small, on the other hand, the speed of motion of the movable object (or the angular velocity of the electric motor) is accordingly low.

It is also noted that the moment at which the motor control signal requires the electric motor to be operated so as to operate the movable object in the direction opposite to the predetermined direction in the transient period immediately after the moment of initiation of the operation of the electric motor is advanced with an increase in the speed of motion of the movable object (in the angular velocity of the electric motor). It is further noted that the amount of motion of the movable object (or the amount of motion of the electric motor) until the control signal requires the electric motor to be operated so as to operate the movable object in the opposite direction increases with an increase in the speed of motion of the movable object (or the angular velocity of the electric motor).

It follows from the above analysis that the moment at which the motor control signal requires the electric motor to be operated so as to operate the movable object in the opposite direction is advanced with an increase in the target value inputted by the target inputting portion, and that the amount of motion of the movable object (or the amount of operation of the electric motor) until the motor control signal requires the electric motor to be operated as indicated above increases with an increase in the target value.

It follows from the above analysis that where the time period during which the rectified-input applying portion is operable to rectify the motor control signal is detected by measuring a time after the moment of initiation of the operation of the electric motor, for example, the rectifying-time-period changing portion may be arranged to change the time period such that the time period decreases with an increase in the target value inputted by the target inputting portion, so that the motor control signal can be rectified until the amount of operation of the electric motor has increased to a predetermined constant value irrespective of the target value. Where the above-indicated timer period expires when the value represented by the output of the detector has reached a threshold value, on the other hand, the threshold value may be changed so as to increase with an increase in the target value, so that the motor control signal can be rectified for the predetermined time period irrespective of the target value.

(5) An apparatus according to any one of the above modes (1)–(4), wherein the first signal generator includes an integrating portion operable to integrate an error between the target value and a value represented by the output of the detector, and a first-gain multiplying portion operable to multiply the error integrated by the integrating portion, by a predetermined first gain, and wherein the second signal generator includes a second-gain multiplying portion operable to multiply the state quantity estimated by the estimator, by a predetermined second gain.

In the motor control apparatus according to the above mode (5), the first signal generator, the second signal generator and the estimator cooperate to effect a feedback control of the electric motor such that the value represented by the output of the detector coincides with the target value inputted by the target inputting portion.

The time period during which the rectified-input applying portion is held operable to rectify the motor control signal so as to limit the motion of the movable object may be changed on the basis of not only the target value but also any other suitable parameter, as in the following mode (6):

(6) An apparatus according to the above mode (5), wherein the rectified-input applying portion is operable for a predetermined time period after a moment of initiation of an operation of the electric motor, and when the motor control signal requires the electric motor to be operated so as to operate the movable object in the direction opposite to the predetermined direction, the apparatus further comprising:

a gain changing portion operable to change the first gain used by the first-gain multiplying portion; and a rectifying-time-period changing portion operable to change the time period depending upon the target value and the first gain.

In the motor control apparatus according to the above mode (6), the time period during which the rectified-input applying portion is held operable to rectify the motor control signal is changed depending upon not only the target value inputted by the target inputting portion, but also the first gain used by the first-gain multiplying portion.

As discussed above, the speed of the motion of the movable object (or the angular velocity of the electric motor) increases with an increase in the target value inputted by the target inputting portion, that is, with an increase in the amount of the motion of the movable object (or the amount of operation of the electric motor). In this respect, it is noted that the speed of the motion of the movable object (or the angular velocity of the electric motor) increases with the first gain used by the first-gain multiplying portion.

It follows from the above fact that where the time period during which the rectified-input applying portion is operable to rectify the motor control signal is detected by measuring a time after the moment of initiation of the operation of the electric motor, for example, the rectifying-time-period changing portion may be arranged to change the time period such that the time period decreases with an increase in the first gain used by the first-gain multiplying portion, so that the motor control signal can be rectified for the predetermined time period irrespective of the target value. Where the above-indicated timer period expires when the value represented by the output of the detector has reached a threshold value, on the other hand, the threshold value may be changed so as to increase with an increase in the first gain, so that the motor control signal can be rectified until the amount of operation of the electric motor has increased to a predetermined constant value irrespective of the target value.

The time period during which the rectified-input applying portion is held operable to rectify the motor control signal so as to limit the motion of the movable object may be changed on the basis of not only the target value but also any other suitable parameter other than the first gain indicated above, as in the following mode (7):

(7) An apparatus according to the above mode (5) or (6), wherein the rectified-input applying portion is operable for a predetermined time period after a moment of initiation of an operation of the electric motor, and when the motor control signal requires the electric motor to be operated so as to operate the movable object in the direction opposite to the predetermined direction, the apparatus further comprising:

a gain changing portion operable to change the second gain used by the first-gain multiplying portion; and a rectifying-time-period changing portion operable to change the time period depending upon the target value and the second gain.

In the motor control apparatus according to the above mode (7), the time period during which the rectified-input applying portion is held operable to rectify the motor control signal is changed depending upon not only the target value inputted by the target inputting portion, but also the second gain used by the second-gain multiplying portion.

As discussed above, the speed of the motion of the movable object (or the angular velocity of the electric motor) increases with an increase in the target value inputted by the target inputting portion, that is, with an increase in the amount of the motion of the movable object (or the amount of operation of the electric motor). In this respect, it is noted that the speed of the motion of the movable object (or the angular velocity of the electric motor) increases with the second gain used by the second-gain multiplying portion.

It follows from the above fact that where the time period during which the rectified-input applying portion is operable to rectify the motor control signal is detected by measuring a time after the moment of initiation of the operation of the electric motor, for example, the rectifying-time-period changing portion may be arranged to change the time period such that the time period decreases with an increase in the second gain used by the second-gain multiplying portion, so that the motor control signal can be rectified for the predetermined time period irrespective of the target value. Where the above-indicated timer period expires when the value represented by the output of the detector has reached a threshold value, on the other hand, the threshold value may be changed so as to increase with an increase in the second gain, so that the motor control signal can be rectified until the amount of operation of the electric motor has increased to a predetermined constant value irrespective of the target value.

The detector which is provided to detect the motion of the movable object or electric motor may be arranged as in the following mode (8):

(8) An apparatus according to any one of the above modes (1)–(7), wherein the movable object includes a rotary body rotatable during an operation of the electric motor, and the detector includes a rotary member rotatable with the rotary body.

In the motor control apparatus according to the above mode (8), the detector can detect a rotary motion or position of the rotatable body of the movable object.

For the detector to detect the motion of the electric motor, the detector may be arranged as in the following mode (9):

(9) An apparatus according to any one of the above modes (1)–(7), wherein the detector includes a rotary member attached to a rotary shaft of the electric motor.

In the motor control apparatus according to the above mode (9), the detector can directly detect a rotary motion or position of the electric motor.

(10) An apparatus according to any one of the above modes (1)–(9), wherein the movable object is a rotary body rotated by the electric motor to feed a recording medium in a printer for performing a printing operation on the recording medium.

In the motor control apparatus according to the above mode (10), the rotary body such as a paper feeding roller is effectively prevented from being operated to feed the recording medium in the reverse direction while the printing operation is performed with the recording medium fed in the forward direction.

(11) An apparatus according to any one of the above modes (1)–(10), wherein the detector detects the motion of the movable object or electric motor in a discrete manner.

(12) An apparatus according to any one of the above modes (1)–(11), wherein the motor-control-signal generator includes an intermittent-rotary-motion signal generating portion operable to generate the motor control signal for operating the electric motor to cause an intermittent rotary motion in the predetermined direction.

(13) An apparatus according any one of the above modes (1)–(12), wherein the target inputting portion is operable to input the target value which corresponds to a position at which the movable object is positioned by the electric motor.

(14) A method of controlling an electric motor provided to drive a movable object, comprising the steps of:

inputting a target value for controlling a motion of the movable object by the electric motor;

detecting one of the motion of the movable object or a motion of the electric motor;

generating a first control signal on the basis of the detected motion of the movable object or electric motor and the target value;

estimating a state quantity indicative of a state of the motion of the movable object, on the basis of the detected motion of the movable object or electric motor and a motor control signal applied to the electric motor;

generating a second control signal on the basis of the estimated state quantity;

generating the motor control signal on the basis of the first control signal and the second control signal; and rectifying the motor control signal, when the motor control signal requires the electric motor to be operated so as to operate the movable object in an opposite direction opposite to a predetermined direction, so as to limit the motion of the movable object in the opposite direction, and applying the rectified motor control signal to the electric motor.

The motor control method according to the above mode (14) has substantially the same advantage as described above with respect to the apparatus according to the above mode (1).

(15) A method according to the above mode (14), wherein the motor control signal is applied to the electric motor, without rectification of the motor control signal, when the motor control signal requires the electric motor to be operated so as to operate the movable object in the predetermined direction.

The motor control method according to the above mode (15) has substantially the same advantage as described above with respect to the apparatus according to the above mode (2).

(16) A method according to the above mode (14) or (15), wherein the motor control signal which requires the electric motor to be operated so as to operate the movable object in the opposite direction is rectified for a predetermined time period after a moment of initiation of an operation of the electric motor.

The motor control method according to the above mode (16) has substantially the same advantage as described above with respect to the apparatus according to the above mode (3).

(17) A method according to the above mode (16), further comprising the step of changing the time period depending upon the target value.

The motor control method according to the above mode (17) has substantially the same advantage as described above with respect to the apparatus according to the above mode (4).

(18) A method according to any one of the above modes (14)–(17), wherein the first control signal is generated by integrating an error between the target value and the detected motion of the movable object or electric motor, and multiplying the integrated error by a predetermined first gain, and wherein the second control signal is generated by multiplying the estimated state quantity by a predetermined second gain.

The motor control method according to the above mode (18) has substantially the same advantage as described above with respect to the apparatus according to the above mode (5).

(19) A method according to the above mode (18), wherein the motor control signal which requires the electric motor to be operated so as to operate the movable object in the opposite direction is rectified for a predetermined time period after a moment of initiation of an operation of the electric motor, the method further comprising the steps of:

changing the first gain used to generate the first control signal; and changing the time period depending upon the target value and the first gain.

The motor control method according to the above mode (19) has substantially the same advantage as described above with respect to the apparatus according to the above mode (6).

(20) A method according to the above mode (18) or (19), wherein the motor control signal which requires the electric motor to be operated so as to operate the movable object in the opposite direction is rectified for a predetermined time period after a moment of initiation of an operation of the electric motor, the method further comprising the steps of:

changing the second gain used to generate the second control signal; and changing the time period depending upon the target value and said second gain.

The motor control method according to the above mode (20) has substantially the same advantage as described above with respect to the apparatus according to the above mode (7).

(21) A method according to any one of the above modes (14)–(20), wherein the movable object is a rotary body rotated by the electric motor to feed a recording medium in a printer for performing a printing operation on the recording medium.

The motor control method according to the above mode (21) has substantially the same advantage as described above with respect to the above mode (10).

(22) A control program executable by a computer system, for controlling an electric motor provided to drive a movable object, by implementing the steps of:

inputting a target value for controlling a motion of the movable object by the electric motor;

detecting one of the motion of, the movable object or a motion of the electric motor;

generating a first control signal on the basis of the detected motion of the movable object or electric motor and the target value;

estimating a state quantity indicative of a state of the motion of the movable object, on the basis of the detected motion of the movable object or electric motor and a motor control signal applied to the electric motor;

generating a second control signal on the basis of the estimated state quantity;

generating the motor control signal on the basis of the first control signal and the second control signal; and rectifying the motor control signal, when the motor control signal requires the electric motor to be operated so as to operate the movable object in an opposite direction opposite to a predetermined direction, so as to limit the motion of the movable object in the opposite direction, and applying the rectified motor control signal to the electric motor.

The computer system operable according to the control program according to the above mode (22) is identical in function with the motor control apparatus according to the above mode (1), and therefore has substantially the same advantage as described above with respect to the above mode (1).

According to a first preferred form of the control program, the generated motor control signal is applied to the electric motor, without rectification of the motor control signal, when the motor control signal requires the electric motor to be operated so as to operate the movable object in the predetermined direction.

The computer system operable according to the first preferred form of the control program is identical in function with the motor control apparatus according to the above mode (2), and has substantially the same advantage as described above with respect to the apparatus according to the above mode (2).

According to a second preferred form of the control program, the motor control signal which requires the electric motor to be operated so as to operate the movable object in the opposite direction is rectified for a predetermined time period after a moment of initiation of an operation of the electric motor.

The computer system operable according to the second preferred form of the control program, which is identical in function with the motor control apparatus according to the above mode (3), has substantially the same advantage as described above with respect to the apparatus according to the above mode (3).

The above-indicated second preferred form of the control program is preferably arranged to further implement the step of changing the time period depending upon the target value.

The computer system operable according to the above-indicated preferred arrangement of the control program is identical in function with the motor control apparatus according to the above mode (4), and has substantially the same advantage as described above with respect to the apparatus according to the above mode (4).

According to a third preferred form of the control program, the first control signal is generated by integrating an error between the target value and the detected motion of the movable object or electric motor, and multiplying the integrated error by a predetermined first gain, and wherein the second control signal is generated by multiplying the estimated state quantity by a predetermined second gain.

The computer system operable according to the third preferred form of the control program is identical in function with the motor control apparatus according to the above mode (5) and has substantially the same advantage as described above with respect to the apparatus according to the above mode (5).

The above-indicated third preferred form of the control program is preferably arranged such that the motor control signal which requires the electric motor to be operated so as to operate the movable object in the opposite direction is rectified for a predetermined time period after a moment of initiation of an operation of the electric motor, and to further implement the steps of:

changing the first gain used to generate the first control signal; and changing the time period depending upon the target value and the first gain.

The computer system operable according to the above-indicated preferred arrangement of the control program is identical in function with the motor control apparatus according to the above mode (6) and has substantially the same advantage as described above with respect to the apparatus according to the above mode (6).

The above-indicated third preferred form of the control program is alternatively or further preferably arranged such that the motor control signal which requires the electric motor to be operated so as to operate the movable object in the opposite direction is rectified for a predetermined time period after a moment of initiation of an operation of the electric motor, and to further implement the method further comprising the steps of:

changing the second gain used to generate the second control signal; and changing the time period depending upon the target value and said second gain.

The computer system operable according to the above-indicated preferred arrangement of the control program is identical in function with the motor control apparatus according to the above mode (7) and has substantially the same advantage as described above with respect to the apparatus according to the above mode (7).

The control program is available on the motor control apparatus described above with respect to the above modes (1)–(13), and to the user of the apparatus, through a floppy disc (FD), a CD-ROM, program codes stored in a read-only-memory (ROM), or any other data storage medium, or an internet or any other communication line or network.

The computer system used to execute the control program described above may be a computer system incorporating a CPU and provided in the motor control apparatus described above with respect to the above modes (1)–(13), or may alternatively be connected to the motor control apparatus through a wire or wireless communication system.

(23) A control program according to the above mode (22), wherein the movable object is a rotary body rotated by the electric motor to feed a recording medium in a printer for performing a printing operation on the recording medium.

The computer system operable according to the control program according to the above mode (23) is identical in function with the motor control apparatus according to the above mode (10), and has substantially the same advantage as described above with respect to the above mode (10).

(24) A data storage medium accessible by a computer system and storing a control program according to the above mode (22).

(25) A printer including a paper-feeding electric motor, and a paper-feeding mechanism having a rotary body rotatable by the paper-feeding electric motor to feed a recording medium, during a printing operation on the recording medium, the printer comprising cough a target inputting portion operable to input a target value for controlling a rotary motion of the rotary body by the paper-feeding electric motor;

a detector operable to detect one of the rotary motion of the rotary body and a rotary motion of the paper-feeding electric motor;

a first signal generator operable to generate a first control signal on the basis of an output of the detector and the target value input by the target inputting portion;

an estimator operable to estimate a state quantity indicative of a state of the rotary motion of the rotary body, on the basis of the output of the detector and a motor control signal applied to the paper-feeding electric motor;

a second signal generator operable to generate a second control signal on the basis of the state quantity estimated by the estimator;

a motor-control-signal generator operable to generate the motor control signal on the basis of the first control signal and the second control signal; and a rectified-input applying portion operable when the motor control signal requires the paper-feeding electric motor to be operated so as to rotate the rotary body in an opposite direction opposite to a predetermined direction, the rectified-input applying portion rectifying the motor control signal so as to limit the rotary motion of the rotary body in the opposite direction, and applying the rectified motor control signal to the paper-feeding electric motor.

In the printer according to the above mode (25), the rotary body such as a paper feeding roller is effectively prevented from being rotated to feed the recording medium in the reverse direction while the printing operation is performed with the recording medium fed in the forward direction.

(26) A printer according to the above mode (25), further including a carriage-drive electric motor, a carriage movable by the carriage-drive electric motor in a direction intersecting a direction of feeding of the recording medium by the paper feeding mechanism, and a printing head carried by the carriage and operable to perform the printing operation on the recording medium, the printer further comprising:

a speed detector operable to detect a moving speed of the carriage in a discrete manner;

a speed-control-error calculator operable to calculate a speed control error between the moving speed detected by the speed detector and an externally commanded target speed value;

a speed-control-quantity calculator operable to calculate speed control quantities including a proportional control quantity proportional to the detected moving speed or the speed control error, and an integral control quantity proportional to an integral of the speed control error;

a differential-control-quantity calculator operable to calculate a differential control quantity proportional to a derivative or an amount of change per unit time of the detected moving speed or the speed control error;

a control-command-value determining portion operable to determine a control command value for operating the carriage-drive electric motor to move the carriage at the target speed value, on the basis of the speed control quantities and the differential control quantity, the electric motor being controlled according to the control command value such that the detected moving speed coincides with the target speed value; and a differential-control-quantity compensating portion operable after a predetermined derivative effective time after each point of time at which the differential control quantity is updated by the differential-control-quantity calculator on the basis of the moving speed detected by the speed detector, to compensate the differential control quantity such that the compensated differential control quantity is smaller than the differential control quantity as updated by the differential-control-quantity calculator, the derivative effective time being shorter than a period of detection of the moving speed by the speed detector.

The printer according to the above mode (26) has an advantage as described below with respect to the following mode (27), as well as the advantage described above with respect to the above mode (25).

(27) An apparatus for feedback-controlling an operating speed of an electric motor provided to drive a movable object, comprising:

a speed detector operable to detect a moving speed of the movable object in a discrete manner;

a speed-control-error calculator operable to calculate a speed control error between the moving speed detected by the speed detector and an externally commanded target speed value;

a speed-control-quantity calculator operable to calculate speed control quantities including a proportional control quantity proportional to the detected moving speed or the speed control error, and an integral control quantity proportional to an integral of the speed control error;

a differential-control-quantity calculator operable to calculate a differential control quantity proportional to a derivative or an amount of change per unit time of the detected moving speed or the speed control error;

a control-command-value determining portion operable to determine a control command value for operating the electric motor to move the movable object at the target speed value, on the basis of the speed control quantities and the differential control quantity, the electric motor being controlled according to the control command value such that the detected moving speed coincides with the target speed value; and a differential-control-quantity compensating portion operable after expiration of a predetermined derivative effective time after each point of time at which the differential control quantity is updated by the differential-control-quantity calculator on the basis of the moving speed detected by the speed detector, to compensate the differential control quantity such that the compensated differential control quantity is smaller than the differential control quantity as updated by the differential-control-quantity calculator, the derivative effective time being shorter than a period of detection of the moving speed by the speed detector.

In the motor control apparatus according to the above mode (27), the differential-control-quantity compensating portion which is operable after the predetermined derivative effective time has expired is arranged to reduce the differential control quantity as calculated by the differential-control-quantity calculator, so that the reduced differential control quantity is used by the control-command-value determining portion to determine the control command value after expiration of the derivative effective time.

In the motor control apparatus according to the above mode (27), therefore, the weight of the derivative control quantity used to determine the control command value is not held constant during an entire length of a time period following each point of time at which the differential control quantity is updated by the differential-control-quantity calculator. Namely, the differential control quantity as calculated or updated by the differential-control-quantity calculator is used without compensation thereof before expiration of the predetermined derivative effective time, and is reduced to a suitably reduced value after the expiration of the derivative effective time.

In the motor control apparatus according to the above mode (27), the electric motor is controlled according to the control command value determined by using the differential control quantity as calculated by the differential-control-quantity calculator, until the predetermined derivative effective time has expired. Accordingly, the electric motor can be controlled with high stability, even in the presence of an instantaneous external disturbance or noise. After the derivative effective time has passed, however, the differential control quantity as reduced by the differential-control-quantity compensating portion is used to determine the control command value, making it possible to reduce a risk of inadequate determination of the control command value and prevent consequent inadequate control of the motor involving an overshoot or other drawback, during a time period between the moment of expiration of the derivative effective time and the next point of time at which the moving speed is detected or at which the differential control quantity is updated.

(28) An apparatus according to the above mode (27), wherein the differential-control-quantity compensating portion reduces the differential control quantity as a time passes after the expiration of the predetermined derivative effective time.

In the motor control apparatus according to the above mode (28) wherein the differential control quantity is reduced as the time passes after the expiration of the derivative effective time, the weight of the derivative control quantity used to determine the control command value is gradually reduced.

The arrangement according to the above mode (27) therefore permits optimization of the control command value and assures adequate control of the electric motor, even where it takes a relatively long control response time until the actual moving speed of the movable object coincides with the target speed value.

(29) An apparatus according to the above mode (27), wherein the differential-control-quantity compensating portion reduces the differential control quantity to a predetermined constant value.

In the motor control apparatus according to the above mode (29), the weight of the differential control quantity used to determine the control command value can be rapidly reduced after the expiration of the predetermined derivative effective time.

The arrangement according to the above mode (29) permits optimization of the control command value where it takes a relatively short control response time until the actual moving speed of the movable object coincides with the target speed value, after a control of the electric motor according to the control command value influenced by an instantaneous external disturbance.

Where the actual moving speed of the movable object can coincide with the target speed value in a relatively short control response time, for example, the differential control quantity is preferably reduced to zero after the expiration of the derivative effective time. Where the actual moving speed can be made close to the target speed value in a relatively short control response time, but a comparatively small error is left therebetween, the differential control quantity is preferably reduced to a predetermined percentage (e.g., about 20%) of the value as calculated by the differential-control-quantity calculator.

(30) An apparatus according to any one of the above modes (27)–(29), wherein the differential-control-quantity calculator calculates the differential control quantity at a predetermined constant time interval.

In the motor control apparatus according to the above mode (30), the differential-control-quantity calculator calculates the differential control quantity, not at a time interval which varies with the moving speed of the movable object, but at the predetermined constant time interval, so that the control command value can be updated at this constant time interval, assuring improved stability of control of the electric motor irrespective of the moving speed of the movable object.

In the motor control apparatus according to the above mode (30) wherein the differential control quantity is updated at the predetermined constant time interval, the electric motor can be controlled with high stability irrespective of whether the moving speed of the movable object is detected at a constant time interval or not.

(31) An apparatus according to any one of the above modes (27)–(30), further comprising a command-signal generator operable to generate a pulse-width-modulation signal for controlling the electric motor, on the basis of the control command value, at a predetermined pulse-width-modulation time interval, and the predetermined derivative effective time is longer than the pulse-width-modulation time interval.

In the motor control apparatus according to the above mode (31) wherein the predetermined derivative effective time is longer than the pulse-width-modulation time interval, the compensation of the differential control quantity does not take place during the pulse-width-modulation time interval, making it possible to prevent a delay in the control response of the electric motor. In particular, the derivative effective time determined to be substantially equal to a multiple of the pulse-width-modulation time interval permits the moment of compensation of the calculated differential control quantity to be substantially coincident with the moment at which the pulse-width-modulation signal is updated by the command-signal generator, so that the control response of the electric motor can be improved while preventing an unnecessary time between the moment of compensation of the differential control quantity and the moment of updating of the pulse-width-modulation signal.

Therefore, the motor control apparatus according to the above mode (31) does not suffer from deterioration of the control response and consequent inadequate control of the electric motor, even where the motor control apparatus is arranged to discontinuously or discretely detect the moving speed of the movable object and control the electric motor by pulse width modulation (PWM control).

(32) An apparatus according to any one of the above modes (27)–(31), further comprising a derivative-effective-time determining portion operable to determine the predetermined derivative effective time depending upon the target speed value.

In the motor control apparatus according to the above mode (32) wherein the derivative effective time is determined depending upon the target speed value of the movable object, which may be changed according to an external signal, the derivative effective time suitably determined depending upon the target speed value permits a suitable change of the weight of the differential control quantity used to determine the control command value, so that the actual moving speed can coincide with the target speed value after generation of an external disturbance.

The motor control apparatus according to the above mode (32) permits the control command value to be suitably determined for adequate control of the electric motor, even where the target speed value is variable.

(33) An apparatus according to any one of the above modes (27)–(32), wherein the movable object is a carriage which is movable by the electric motor and which carries a printing head for performing a printing operation in a printer.

(34) An apparatus according to any one of the above modes (27)–(33), further comprising a constant-target-value determining portion operable to determine a constant value as the externally commanded target speed value.

(35) A method of feedback-controlling an operating speed of an electric motor provided to drive a movable object, comprising the steps of:

detecting a moving speed of the movable object in a discrete manner;

calculating a speed control error between the detected moving speed and an externally commanded target speed value;

calculating speed control quantities including a proportional control quantity proportional to the detected moving speed or the speed control error, and an integral control quantity proportional to an integral of the speed control error;

calculating a differential control quantity proportional to a derivative or an amount of change per unit time of the detected moving speed or the speed control error;

determining a control command value for operating the electric motor to move the movable object at the target speed value, on the basis of the speed control quantities and the differential control quantity, the electric motor being controlled according to the control command value such that the detected moving speed coincides with the target speed value; and after expiration of a predetermined derivative effective time after each point of time at which the differential control quantity is updated on the basis of the detected moving speed, compensating the differential control quantity such that the compensated differential control quantity is smaller than the updated differential control quantity, the derivative effective time being shorter than a period of detection of the moving speed.

In the motor control method according to the above mode (35), the control command value is determined by using the differential control quantity as calculated or updated, until the predetermined derivative effective time has expired after each point of time at which the differential control quantity is updated. After the derivative effective time has expired, the differential control quantity compensated to a reduced value is used to determine the control command value. In the present motor control method, therefore, the weight of the derivative effective time is not held constant during an entire length of a time period following each point of time at which the differential control quantity is updated. Instead, the weight of the differential control quantity is reduced to a suitably reduced value after the expiration of the derivative effective time.

Namely, the electric motor is controlled according to the control command value determined by using the differential control quantity as calculated, before the expiration of the predetermined derivative effective time. Accordingly, the electric motor can be controlled with high stability such that the actual moving speed of the movable object approaches the target speed value in a relatively short time, even in the presence of an instantaneous external disturbance or noise.

During the derivative effective time, the actual moving speed varies as a result of a control of the electric motor according to the control command value. At the moment when the predetermined derivative effective time has passed, for instance, the actual moving speed is different from the last detected moving speed (closer to the target speed value). Accordingly, the control command value before the moving speed is detected at the next point of time does not reflect the actual moving speed, so that a continued use of the once determined control command value may cause a relatively large amount of deviation of the actual moving speed from the target speed value.

In the present motor control method, however, the differential control quantity is compensated to a suitably reduced value after the expiration of the predetermined derivative effective time, and the control command value is determined by using the thus reduced differential control quantity, making it possible to prevent a significant deviation of the control command value from an optimum value corresponding to the actual moving speed. Thus, the present motor control method makes it possible to reduce a risk of inadequate determination of the control command value during a time period between the moment of expiration of the derivative effective time and the next point of time at which the moving speed is detected or the differential control quantity is updated.

In the motor control method according to the above mode (35), the electric motor is controlled according to the control command value determined by using the differential control quantity as calculated, until the predetermined derivative effective time has expired. Accordingly, the electric motor can be controlled with high stability, even in the presence of an instantaneous external disturbance or noise. After the derivative effective time has passed, however, the differential control quantity is reduced, and the reduced differential-control-quantity compensating portion is used to determine the control command value, making it possible to reduce a risk of inadequate determination of the control command value and prevent consequent inadequate control of the motor involving an overshoot or other drawback, during the time period between the moment of expiration of the derivative effective time and the next point of time at which the moving speed is detected or at which the differential control quantity is updated.

Where it takes a relatively long control response time until the actual moving speed coincides with the target speed value after the electric motor is controlled according to the control command value influenced by an instantaneous external disturbance, rapid reduction of the differential control quantity may give rise to a risk that the actual moving speed does not sufficiently coincide with the target speed value, leading to inadequate control of the electric motor. In view of this risk, the motor control method may be arranged according to the following mode (36).

(36) A method according to the above mode (35), wherein the step of compensating the differential control quantity comprises reducing the differential control quantity as a time passes after the expiration of the predetermined derivative effective time.

In the motor control method according to the above mode (36), the weight of the differential control quantity used to determine the control command value is gradually reduced after the predetermined derivative effective time has expired. This gradual reduction of the weight of the differential control quantity permits optimization of the control command value and assures adequate control of the electric motor, even where it takes a relatively long control response time until the actual moving speed of the movable object coincides with the target speed value.

(37) A method according to the above mode (35), wherein the step of compensating the differential control quantity comprises reducing the differential control quantity to a predetermined constant value.

In the motor control method, the weight of the differential control quantity is relatively rapidly reduced after the expiration of the derivative effective time. This alternative arrangement according to the above mode (37) permits optimization of the control command value where it takes a relatively short control response time until the actual moving speed of the movable object coincides with the target speed value, after a control of the electric motor according to the control command value influenced by an instantaneous external disturbance.

Where the actual moving speed of the movable object can coincide with the target speed value in a relatively short control response time, for example, the differential control quantity is preferably reduced to zero after the expiration of the derivative effective time. Where the actual moving speed can be made close to the target speed value in a relatively short control response time, but a comparatively small error is left therebetween, the differential control quantity is preferably reduced to a predetermined percentage (e.g., about 20%) of the calculated value.

The timing at which the differential control quantity is calculated can be determined as needed. For instance, the differential control quantity may be calculated at the time at which the moving speed of the movable object is detected. Where the period of detection of the moving speed of the movable object varies with the actual moving speed, the timing of calculation of the differential control quantity also varies with the actual moving speed. Accordingly, the point of time at which the control command value is updated also varies with the actual moving speed. When the control command value is updated at a relatively long time interval, in particular, the electric motor cannot be controlled with high stability, due to a relatively long period of control according to the inadequate control command value not reflecting the actual moving speed of the movable object. In view of this drawback, the motor control method is preferably arranged according to the following mode (38).

(38) A method according to any one of the above modes (35)–(37), wherein the step of calculating a differential control quantity comprises calculating the differential control quantity at a predetermined constant time interval.

In the motor control method according to the above mode (38), the differential control quantity is not calculated at a time interval which varies with the moving speed of the movable object, but is calculated at the predetermined constant time interval, so that the control command value can be updated at this constant time interval, assuring improved stability of control of the electric motor irrespective of the moving speed of the movable object.

In the motor control method according to the above mode (38) wherein the differential control quantity is updated at the predetermined constant time interval, the electric motor can be controlled with high stability irrespective of whether the moving speed of the movable object is detected at a constant time interval or not.

Where the electric motor is controlled by pulse width modulation (by PWM control), a pulse-width-modulation signal (PWM control signal) is generated or updated at a predetermined pulse-width-modulation time interval, such that the value of the pulse-width-modulation signal used to control the electric motor is held constant during the period of the pulse-width-modulation signal. If the differential control quantity is compensated during this period, the compensation of the differential control quantity will not be reflected on the pulse-width-modulation signal until the period has expired. If the derivative effective time is determined to be shorter than the pulse-width-modulation time interval, the compensation of the differential control quantity always takes place during the period of the pulse-with-modulation signal. In view of this, the motor control method is preferably arranged according to the following mode (39).

(39) A method according to any one of the above modes (35)–(38), further comprising the step of generating a pulse-width-modulation signal for controlling the electric motor, on the basis of the control command value, at a predetermined pulse-width-modulation time interval, and wherein the step of compensating the differential control quantity comprises compensating the differential control quantity after expiration of the predetermined derivative effective time which is longer than the pulse-width-modulation time interval.

In the motor control method according to the above mode (39) wherein the predetermined derivative effective time is longer than the pulse-width-modulation time interval, the compensation of the differential control quantity does not take place during the pulse-width-modulation time interval, making it possible to prevent a delay in the control response of the electric motor.

In particular, the derivative effective time determined to be substantially equal to a multiple of the pulse-width-modulation time interval permits the moment of compensation of the calculated differential control quantity to be substantially coincident with the moment at which the pulse-width-modulation signal is updated by the command-signal generator in the step of generating the pulse-width-modulation signal, so that the control response of the electric motor can be improved while preventing an unnecessary time between the moment of compensation of the differential control quantity and the moment of updating of the pulse-width-modulation signal.

Therefore, the motor control method according to the above mode (39) does not suffer from deterioration of the control response and consequent inadequate control of the electric motor, even where the motor control apparatus is arranged to discontinuously or discretely detect the moving speed of the movable object and control the electric motor by pulse width modulation (PWM control).

An instantaneous external disturbance may cause a variation in the moving speed of the movable object. In this event, the moving speed is eventually stabilized or converged at the target speed value. As known in the art, a time from a moment of initiation of the variation of the moving speed to the moment at which the moving speed is stabilized at the target speed value varies depending upon various factors (such as the target speed value). Therefore, the optimum value of the derivative effective time varies depending upon the target speed value. Where the target speed value is changed or variable, the use of the constant derivative effective time may cause inadequate control of the electric motor. In view of this drawback, the motor control method is preferably arranged according to the following mode (40).

(40) A method according to any one of the above modes (35)–(39), further comprising the step of determining the predetermined derivative effective time depending upon the target speed value.

In the motor control method according to the above mode (40) wherein the derivative effective time is determined depending upon the target speed value of the movable object, which may be changed according to an external signal, the derivative effective time suitably determined depending upon the target speed value permits a suitable change of the weight of the differential control quantity used to determine the control command value, so that the actual moving speed can coincide with the target speed value after generation of an external disturbance.

(41) A method according to any one of the above modes (35)–(40), wherein the movable object is a carriage which is movable by the electric motor and which carries a printing head for performing a printing operation in a printer.

(42) A control program executable by a computer system, for controlling an electric motor provided to drive a movable object, by implementing the steps of:

detecting a moving speed of the movable object in a discrete manner;

calculating a speed control error between the detected moving speed and an externally commanded target speed value;

calculating speed control quantities including a proportional control quantity proportional to the detected moving speed or the speed control error, and an integral control quantity proportional to an integral of the speed control error;

calculating a differential control quantity proportional to a derivative or an amount of change per unit time of the detected moving speed or the speed control error;

determining a control command value for operating the electric motor to move the movable object at the target speed value, on the basis of the speed control quantities and the differential control quantity, the electric motor being controlled according to the control command value such that the detected moving speed coincides with the target speed value; and after expiration of a predetermined derivative effective time after each point of time at which the differential control quantity is updated on the basis of the detected moving speed, compensating the differential control quantity such that the compensated differential control quantity is smaller than the updated differential control quantity, the derivative effective time being shorter than a period of detection of the moving speed.

(43) A control program according to the above mode (42), wherein the movable object is a carriage which is movable by the electric motor and which carries a printing head for performing a printing operation in a printer.

(44) A data storage medium accessible by a computer system and storing a control program according to the above mode (42).

(45) A printer including a carriage-drive electric motor, a carriage movable by the carriage-drive electric motor, and a printing head carried by the carriage and operable to perform a printing operation on a recording medium, the printer comprising:

a speed detector operable to detect a moving speed of the movable object in a discrete manner;

a speed-control-error calculator operable to calculate a speed control error between the moving speed detected by the speed detector and an externally commanded target speed value;

a speed-control-quantity calculator operable to calculate speed control quantities including a proportional control quantity proportional to the detected moving speed or the speed control error, and an integral control quantity proportional to an integral of the speed control error;

a differential-control-quantity calculator operable to calculate a differential control quantity proportional to a derivative or an amount of change per unit time of the detected moving speed or the speed control error;

a control-command-value determining portion operable to determine a control command value for operating the electric motor to move the movable object at the target speed value, on the basis of the speed control quantities and the differential control quantity, the electric motor being controlled according to the control command value such that the detected moving speed coincides with the target speed value; and a differential-control-quantity compensating portion operable after expiration of a predetermined derivative effective time after each point of time at which the differential control quantity is updated by the differential-control-quantity calculator on the basis of the moving speed detected by the speed detector, to compensate the differential control quantity such that the compensated differential control quantity is smaller than the differential control quantity as updated by the differential-control-quantity calculator, the derivative effective time being shorter than a period of detection of the moving speed by the speed detector.

(46) A printer including:
a medium-support member operable to support a recording medium;
a printing head operable to perform a printing operation on the recording medium supported by the medium-support member;
an intermittent-relative-movement device including an electric motor and operable to intermittently move the recording medium and the printing head relative to each other; and
a motor control apparatus operable to control the electric motor,
and wherein the motor control apparatus comprising:
a target inputting portion operable to input a target value for controlling an intermittent relative movement of the recording medium and the printing head;
a detector operable to detect the intermittent relative movement;
a first signal generator operable to generate a first control signal on the basis of an output of the detector and the target value input by the target inputting portion;
an estimator operable to estimate a state quantity indicative of a state of the intermittent relative movement, on the basis of the output of the detector and a motor control signal applied to the electric motor;
a second signal generator operable to generate a second control signal on the basis of the state quantity estimated by the estimator;
a motor-control-signal generator operable to generate the motor control signal on the basis of the first control signal and the second control signal; and
a rectified-input applying portion operable when the motor control signal requires the electric motor to be operated so as to effect the intermittent relative movement in an opposite direction opposite to a predetermined direction, the rectified-input applying portion rectifying the motor control signal so as to limit the intermittent relative movement in the opposite direction, and applying the rectified motor control signal to the paper-feeding electric motor.

(47) A printer according to the above mode (46), wherein the intermittent-relative-movement device comprises at least one rotatable feed roller for contact with the recording medium to feed the recording medium, and a roller rotating device including the electric motor and operable to intermittently rotate the at last one rotatable feed roller.

(48) A printer including:
a medium-support member operable to support a recording medium;
a printing head operable to perform a printing operation on the recording medium supported by the medium-support member;
a continuous-relative-movement device including an electric motor and operable to continuously move the recording medium and the printing head relative to each other; and
a motor control apparatus operable to control the electric motor,
and wherein the motor control apparatus comprising:
a speed detector operable to detect a speed of a continuous relative movement of the recording medium and the printing head in a discrete manner;
a speed-control-error calculator operable to calculate a speed control error between the speed of the continuous relative movement detected by the speed detector and an externally commanded target speed value;
a speed-control-quantity calculator operable to calculate speed control quantities including a proportional control quantity proportional to the detected speed of the continuous relative movement or the speed control error, and an integral control quantity proportional to an integral of the speed control error;
a differential-control-quantity calculator operable to calculate a differential control quantity proportional to a derivative or an amount of change per unit time of the detected speed of the continuous relative movement or the speed control error;
a control-command-value determining portion operable to determine a control command value for operating the electric motor to effect the continuous relative movement at the target speed value, on the basis of the speed control quantities and the differential control quantity, the electric motor being controlled according to the control command value such that the detected speed of the continuous relative movement coincides with the target speed value; and
a differential-control-quantity compensating portion operable after expiration of a predetermined derivative effective time after each point of time at which the differential control quantity is updated by the differential-control-quantity calculator on the basis of the speed of the continuous relative movement detected by the speed detector, to compensate the differential control quantity such that the compensated differential control quantity is smaller than the differential control quantity as updated by the differential-control-quantity calculator, the derivative effective time being shorter than a period of detection of the speed of the continuous relative movement by the speed detector.

(49) A printer according to the above mode (48), wherein the continuous-relative-movement device comprises a carriage which carries the printing head and which is movable in a direction parallel to the medium-support member, and a carriage moving device including the electric motor and operable to move the carriage.

(50) A printer including:
a medium-support member operable to support a recording medium;
a printing head operable to perform a printing operation on the recording medium supported by the medium-support member;
an intermittent-relative-movement device including a first electric motor and operable to intermittently move the recording medium and the printing head relative to each other;
a continuous-relative-movement device including a second electric motor and operable to continuously move the recording medium and the printing head relative to each other;
a first motor control apparatus operable to control the first electric motor; and
a second motor control apparatus operable to control the second electric motor,
wherein the first motor control apparatus comprising:
a target inputting portion operable to input a target value for controlling an intermittent relative movement of the recording medium and the printing head;
a detector operable to detect the intermittent relative movement;

a first signal generator operable to generate a first control signal on the basis of an output of the detector and the target value input by the target inputting portion;

an estimator operable to estimate a state quantity indicative of a state of the intermittent relative movement, on the basis of the output of the detector and a motor control signal applied to the first electric motor;

a second signal generator operable to generate a second control signal on the basis of the state quantity estimated by the estimator;

a motor-control-signal generator operable to generate the motor control signal on the basis of the first control signal and the second control signal; and a rectified-input applying portion operable when the motor control signal requires the first electric motor to be operated so as to effect the intermittent relative movement in an opposite direction opposite to a predetermined direction, the rectified-input applying portion rectifying the motor control signal so as to limit the intermittent relative movement in the opposite direction, and applying the rectified motor control signal to the first electric motor, and wherein the second motor control apparatus comprising:

a speed detector operable to detect a speed of a continuous relative movement of the recording medium and the printing head in a discrete manner;

a speed-control-error calculator operable to calculate a speed control error between the speed of the continuous relative movement detected by the speed detector and an externally commanded target speed value;

a speed-control-quantity calculator operable to calculate speed control quantities including a proportional control quantity proportional to the detected speed of the continuous relative movement or the speed control error, and an integral control quantity proportional to an integral of the speed control error;

a differential-control-quantity calculator operable to calculate a differential control quantity proportional to a derivative or an amount of change per unit time of the detected speed of the continuous relative movement or the speed control error;

a control-command-value determining portion operable to determine a control command value for operating the second electric motor to effect the continuous relative movement at the target speed value, on the basis of the speed control quantities and the differential control quantity, the second electric motor being controlled according to the control command value such that the detected speed of the continuous relative movement coincides with the target speed value; and a differential-control-quantity compensating portion operable after expiration of a predetermined derivative effective time after each point of time at which the differential control quantity is updated by the differential-control-quantity calculator on the basis of the speed of the continuous relative movement detected by the speed detector, to compensate the differential control quantity such that the compensated differential control quantity is smaller than the differential control quantity as updated by the differential-control-quantity calculator, the derivative effective time being shorter than a period of detection of the speed of the continuous relative movement by the speed detector.

(51) An apparatus for controlling an electric motor provided to drive a movable object, comprising (a) a position controlling portion and (b) a speed controlling portion, wherein the position controlling portion includes:

a target inputting portion operable to input a target position for controlling a position of the movable object by the electric motor;

a detector operable to detect one of the position of the movable object or a motion of the electric motor;

a first signal generator operable to generate a first control signal on the basis of an output of the detector and the target value input by the target inputting portion;

an estimator operable to estimate a state quantity indicative of a state of the motion of the movable object, on the basis of the output of the detector and a motor control signal applied to the electric motor;

a second signal generator operable to generate a second control signal on the basis of the state quantity estimated by the estimator;

a motor-control-signal generator operable to generate the motor control signal on the basis of the first control signal and the second control signal; and a rectified-input applying portion operable when the motor control signal requires the electric motor to be operated so as to operate the movable object in an opposite direction opposite to a predetermined direction, the rectified-input applying portion rectifying the motor control signal so as to limit the motion of the movable object in the opposite direction, and applying the rectified motor control signal to the electric motor, and wherein the speed controlling portion includes:

a speed detector operable to detect a moving speed of the movable object in a discrete manner;

a speed-control-error calculator operable to calculate a speed control error between the moving speed detected by the speed detector and an externally commanded target speed value;

a speed-control-quantity calculator operable to calculate speed control quantities including a proportional control quantity proportional to the detected moving speed or the speed control error, and an integral control quantity proportional to an integral of the speed control error;

a differential-control-quantity calculator operable to calculate a differential control quantity proportional to a derivative or an amount of change per unit time of the detected moving speed or the speed control error;

a control-command-value determining portion operable to determine a control command value for operating the electric motor to move the movable object at the target speed value, on the basis of the speed control quantities and the differential control quantity, the electric motor being controlled according to the control command value such that the detected moving speed coincides with the target speed value; and a differential-control-quantity compensating portion operable after expiration of a predetermined derivative effective time after each point of time at which the differential control quantity is updated by the differential-control-quantity calculator on the basis of the moving speed detected by the speed detector, to compensate the differential control quantity such that the compensated differential control quantity is smaller than the differential control quantity as updated by the differential-control-quantity calculator, the derivative effective time being shorter than a period of detection of the moving speed by the speed detector.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 22A is a view for explaining a derivative response of a velocity of a carriage when an external disturbance is detected continuously by an analog system; and FIG. 22B is a view for explaining a derivative response of the carriage velocity when the external disturbance is detected discontinuously or discretely by a digital system.

DETAILED DESCRIPTION OF THE PREFERRED EMBODIMENTS

Preferred embodiments of the present invention will be described by reference to the accompanying drawings. Referring first to FIGS. 1–6, there will first be described a motor control apparatus according to a preferred embodiment of the invention as applied to a paper-feeding electric motor in the form of a line feed motor 20 (hereinafter referred to as "LF motor 20") which is provided to activate a paper feeding mechanism of an ink-jet printer 1.

<General Arrangement>

Figure 1:
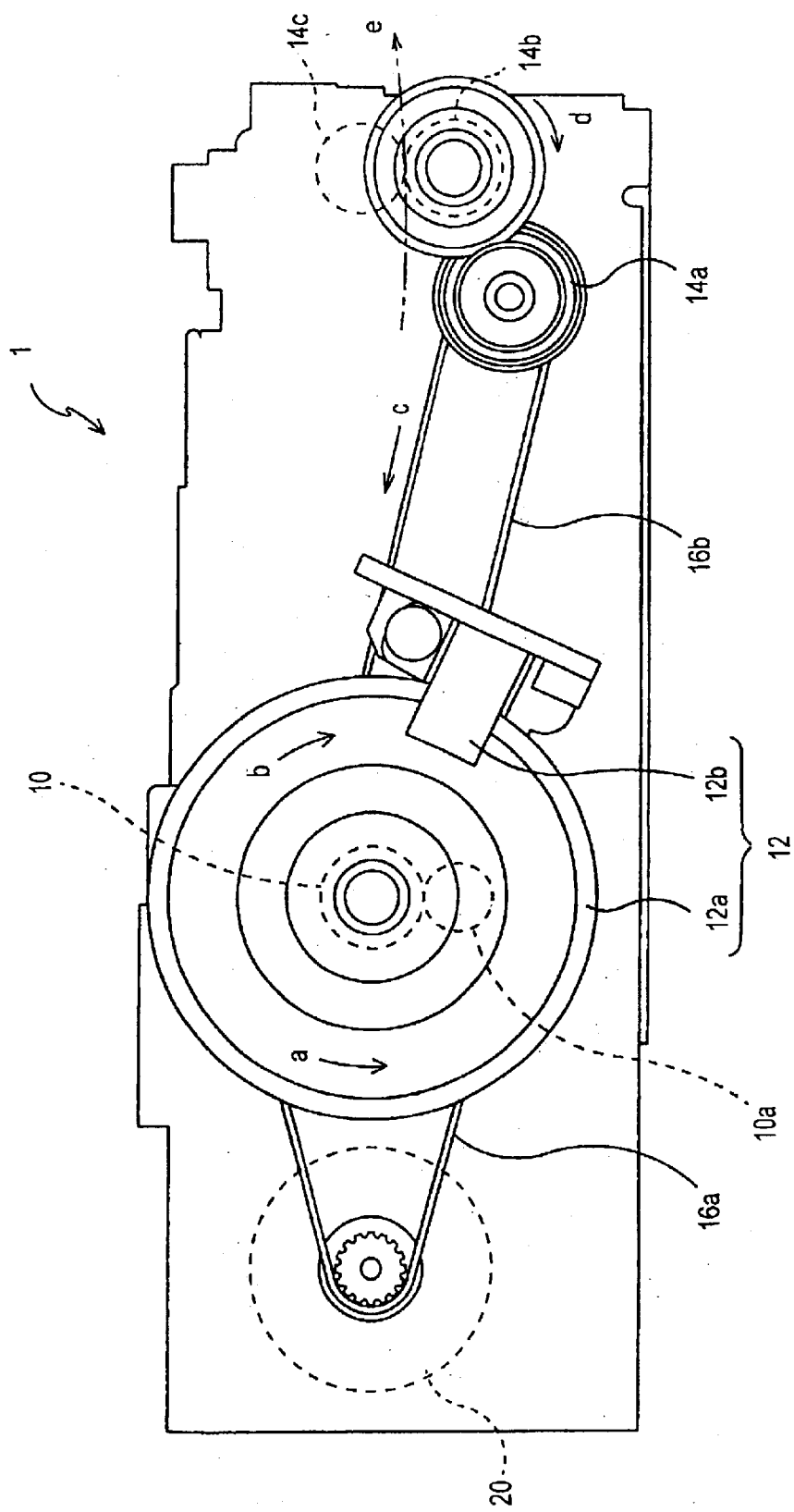
FIG. 1 is a side elevational view of a paper feeding mechanism of an ink-jet printer.
Figure 2:
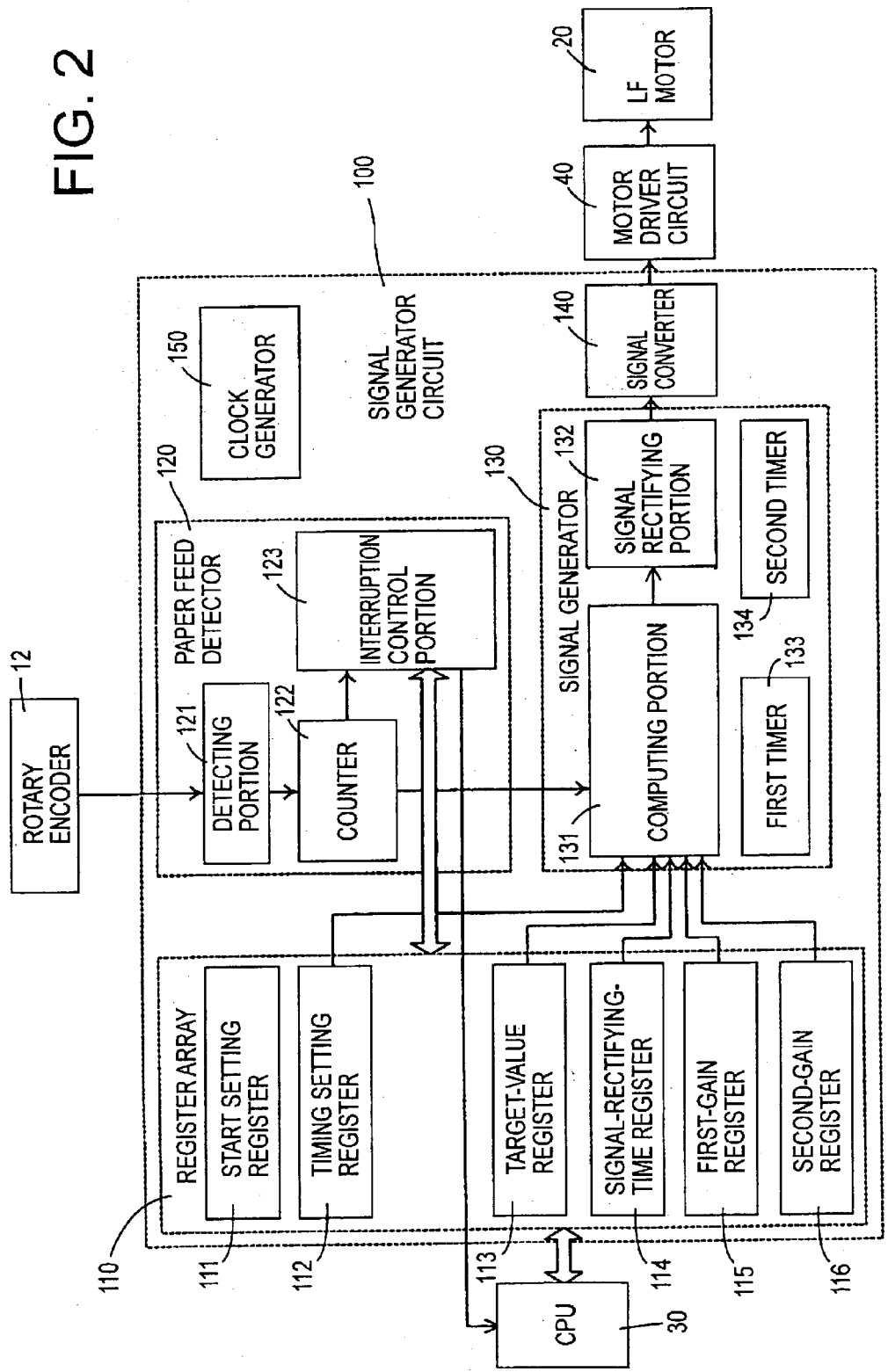
FIG. 2 is a block diagram showing a control system for the paper feeding mechanism of the printer of FIG. 1, which is constructed according to a preferred embodiment of this invention.

As shown in FIG. 1, the paper feeding mechanism of the printer 1 includes a paper feeding roller or a rotary body in the form of a main roller 10, a rotary encoder 12 (hereinafter referred to simply as "encoder 12") operable to detect an angular position or rotary motion of the main roller 10, an eject roller 14b, and the above-indicated LF motor 20. The main roller 10 of the paper feeding mechanism is a movable object operable by the LF motor 20.

The encoder 12 includes a rotary disc 12a rotatable with the main roller 10, and a photo-interrupter 12b arranged to detect an angular position of the rotary disc 12a. This encoder 12 is arranged to generate an encoder signal each time the rotary disc 12a has been rotated by a predetermined incremental angle. Since the rotary disc 12a is rotated with the main roller 10, the generation of each encoder signal by the encoder 12 indicates an intermittent feeding motion of the main roller 10 to intermittently feed a recording medium in the form of a sheet of paper by a predetermined incremental distance (e.g., 1/1,500 inch).

The LF motor 20 is provided to rotate the main roller 10 and the rotary disc 12a through a drive pulley (not shown) directly connected to the main roller 10 and a belt 16a which connects the LF motor 20 and the drive pulley. The LF motor 20 is used to also rotate the eject roller 14b through a belt 16b connected to the drive pulley and an idler gear 14a connected to the belt 16b. In FIG. 1, arrows "a" and "b" indicate the forward and reverse rotating directions of the main roller 10, respectively, and arrows "c" and "d" indicate the rotating directions of the belt 16b and the eject roller 14b, respectively, when the main roller 10 is rotated in the forward direction. Pinch rollers 10a are held in pressing contact with the main roller 10, while spur wheels 14c are held in pressing contact with the eject roller 14b. The sheet of paper is fed in the forward direction while it is passed through a nip between the main roller 10 and the pinch rollers 10a. A printing operation is performed to print an image on the sheet of paper, in a portion of a feed path of the sheet located between the main roller 10 and the eject roller 14b. The sheet of paper is ejected out of the printer 1 in a direction indicated by an arrow "e" in FIG. 1, while the sheet is passed through a nip between the eject roller 14b and the spur wheels 14c. When the LF motor 20 is operated in its forward direction, the main roller 10 is rotated in the forward direction (indicated by the arrow "a" in FIG. 1) to advance the sheet of paper in the forward direction from the main roller 10 toward the eject roller 14b.

The printer 1 incorporates a CPU (central processing unit) 30 operable to control the printer 1 as a whole, a motor driver circuit 40 operable to drive the LF motor 20, and a signal generator circuit 100 operable to generate a PWM signal (pulse-width modulation signal) to be applied to the motor driver circuit 40. It will be understood that the CPU 30, motor driver circuit 40 and signal generator circuit 100 constitute a major portion of the motor control apparatus according to the present embodiment.

The signal generator circuit 100 is a so-called ASIC (Application Specific Integrated Circuit), which includes: a register array 110 provided to store various parameters used for controlling the LF motor 20; a paper feed detector 120 operable to detect the condition of feeding of the sheet of paper, on the basis of the encoder signals received from the encoder 12; a signal generator 130 operable to generate a control signal for controlling the LF motor 20; a signal converter 140 operable to convert the control signal generated by the signal generator 130 into a PWM signal; and a clock generator 150 operable to generate clock pulses to be supplied to the various portions of the signal generator circuit 100. The clock generator 150 is arranged to generate the clock pulses whose period is shorter than the minimum period of the encoder signals generated by the encoder 12.

Figure 4:
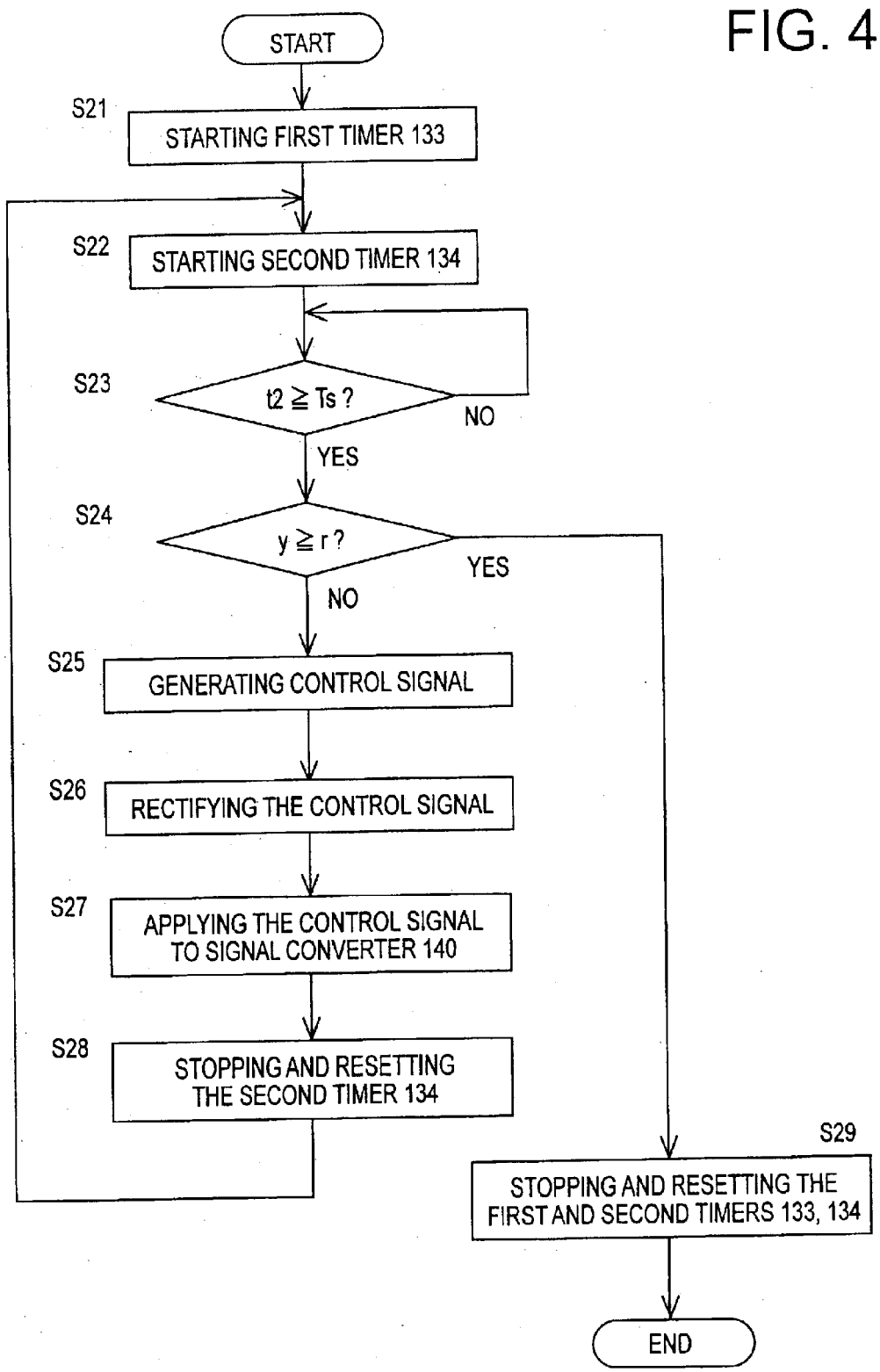
FIG. 4 is a flow chart illustrating a control routine executed by a signal generator of a signal generator circuit of the control device to generate a control signal for controlling an electric motor of the paper feeding mechanism.
Figure 6:
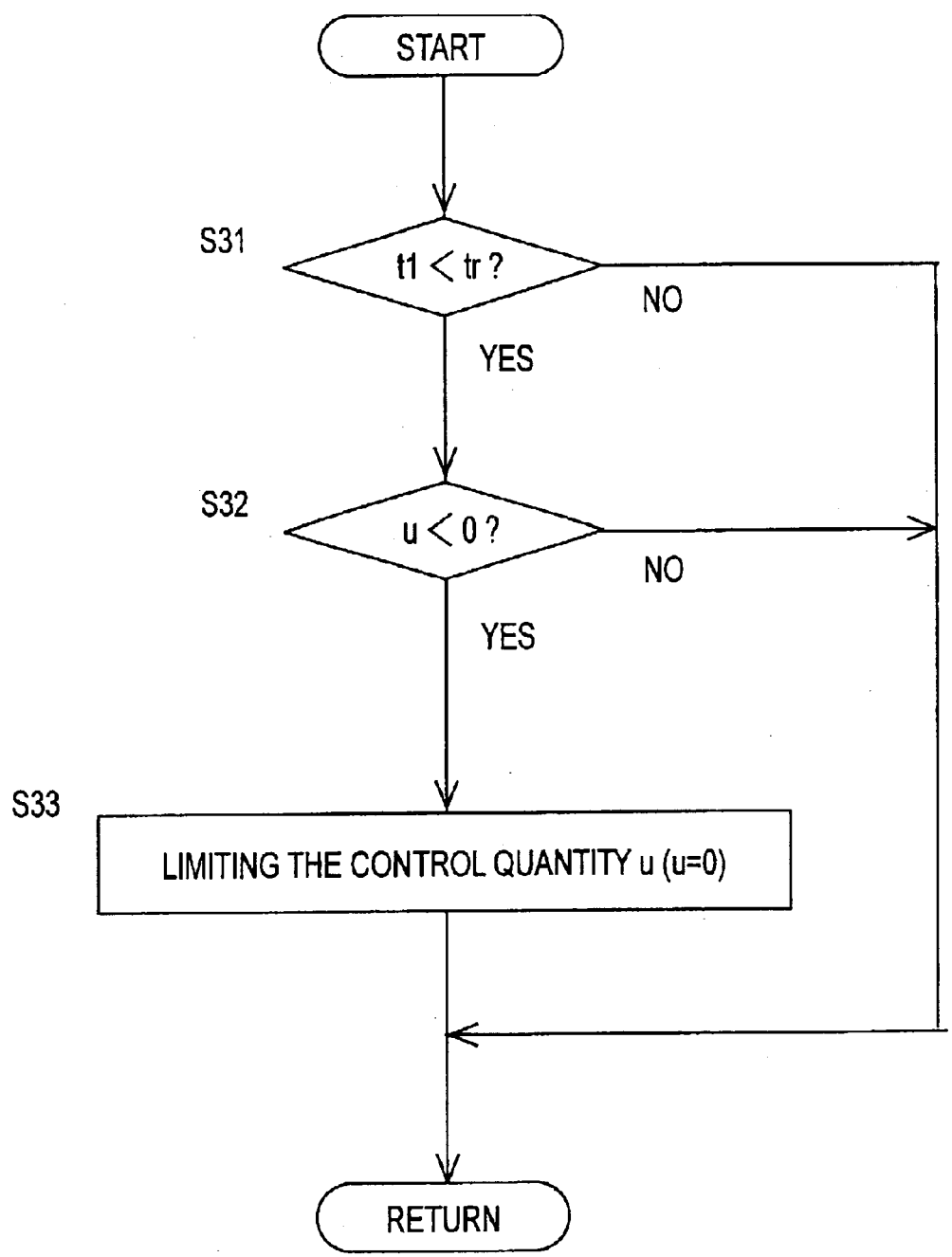
FIG. 6 is a flow chart illustrating a control routine executed by a signal rectifying portion of the signal generator to rectify a control input to the control signal.

The register array 110 includes: a start setting register 111 for starting the signal generator circuit 100: a timing setting register 112 for storing a sampling time Ts indicative of a moment at which the control signal is generated according to a routine illustrated in the flow chart of FIG. 4; a target-value register 113 for storing a target value r of the number of the encoder signals which indicates a desired feeding distance of the paper sheet; a signal-rectifying-time register 114 for storing a signal-rectifying time tr indicating a period during which the control signal is rectified according to a control routine illustrated in the flow chart of FIG. 6; a first-gain register 115 for storing an integral gain F1 used by the signal generator 130 to generate the control signal; and a second-gain register 116 for storing a state-feedback gain F2. The start setting register 111 is provided to store various commands written to start the signal generator circuit 100.

The paper feed detector 120 includes: a detecting portion 121 operable to receive the encoder signals from the encoder 12; a counter 122 operable to count the number of the encoder signals received by the detecting portion 121; and an interruption control portion 123 operable to apply an interruption signal to the CPU 30 when a count y of the counter 122 has reached a value corresponding to the desired feeding distance of the paper sheet as represented by the target value r set in the target-value register 113.

The signal generator 130 includes: a computing portion 131 operable to generate the control signal for controlling the LF motor 20; a signal rectifying portion 132 operable to rectify or limit the control signal as generated by the computing portion 131; and a first timer 133 and a second timer 134 operable to measure a time on the basis of the clock pulses generated by the clock generator 150.

<Control Operation of CPU 30>

Figure 3:
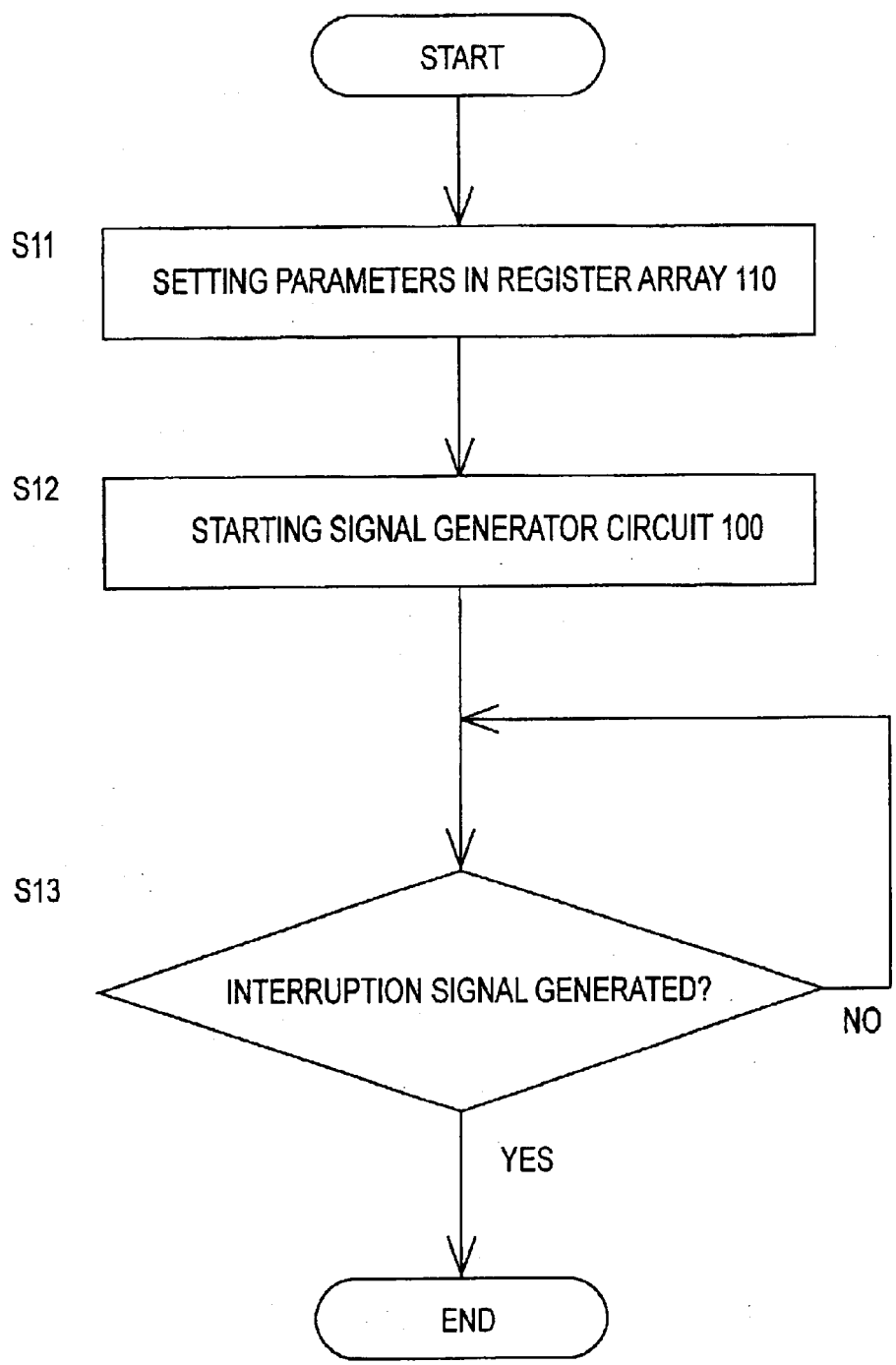
FIG. 3 is a flow chart illustrating a control routine executed by a central processing unit of the control device when a sheet of paper is fed by the paper feeding mechanism.

The CPU 30 operates to control the signal generator circuit 100 according to a control routine illustrated in the flow chart of FIG. 3, when the LF motor 20 is operated to feed the sheet of paper. This control routine is initiated with step s11 to set the various parameters in the registers 112–116 of the register array 110. Namely, the sampling time Ts is set in the timing setting register 112, and the target value r is set in the target-value register 113, while the signal rectifying time tr is set in the signal-rectifying-time register 114. Further, the integral gain F1 is set in the first-gain register 115, while the state-feedback gain F2 is set in the second-gain register 116.

The CPU 30 determines the integral gain F1 and the state-feedback gain F2 to be set in the respective first-gain and second-gain registers 115, 116, depending upon the specific target value r, such that the absolute values of the integral gain F1 and the state-feedback gain F2 increase with an increase in the target value r. The absolute values of the gains F1, F2 are related to the angular velocity of the LF motor 20, such that the angular velocity increases with an increase in those absolute values. According to the above-indicated determination of the gains F1, F2 to be set in the registers 115, 116 such that the absolute values of the gains F1, F2 increase with an increase in the target value r, the angular velocity of the LF motor 20 is increased with an increase of the operating amount of the LF motor 20 which increases with an increase in the target value r.

Further, the CPU 30 determines the signal rectifying time tr to be set in the signal-rectifying-time register 114, depending upon the specific target value r, that is, for each combination of the target value r and the corresponding integral gain F1 and state-feedback gain F2. Described more specifically, the signal rectifying time tr to be set in the signal-rectifying register 114 decreases with an increase in the target value r and with an increase in the absolute values of the gains F1, F2.

As described above with respect to the signal-rectifying register 114, the signal rectifying time tr indicates the time period during which the control signal is rectified or limited according to the control routine illustrated in the flow chart of FIG. 6. This time period is a time period during which the LF motor 20 is not likely to be controlled so as to activate the paper feeding mechanism for feeding the paper sheet in the reverse direction. The time period indicated by the signal rectifying time tr decreases with an increase in the angular velocity of the LF motor 20, that is, with an increase in the operating speed or velocity of the paper feeding mechanism. For instance, the LF motor 20 may be controlled so as to activate the paper feeding mechanism for feeding the paper sheet in the reverse direction, when the operation of the paper feeding mechanism to feed the paper sheet in the forward direction at a relatively high speed is stopped or terminated, by supplying the LF motor 20 with the control signal that causes the application of a plugging brake to the LF motor 20 for braking the paper feeding mechanism to decelerate the paper feeding motion. Generally, this situation does not take place in a transient period immediately after the operation of the LF motor 20 is initiated. Accordingly, the signal rectifying time tr is determined to indicate this initial transient period of the operation of the LF motor 20 (paper feeding mechanism).

Then, the CPU 30 goes to step s12 to start the signal generator circuit 100, by loading the start setting register 111 with the commands required to start the signal generator circuit 100. As a result, the signal generator 130 of the signal generator circuit 100 is operated to generate the control signal according to the control routine of FIG. 4, as described later in detail. Then, the thus generated control signal is applied to the motor driver circuit 40 via the signal converter 140, so that the operation of the LF motor 20 is initiated to start a feed movement of the paper sheet. When the actual feeding distance of the paper sheet has reached the desired value with repeated application of the control signal to the motor driver circuit 40, the interruption control portion 123 of the paper feed detector 120 of the signal generator circuit 100 generates the interruption signal.

The step s12 is followed by step s13 in which the CPU 30 determines whether the interruption signal has been generated from the interruption control portion 123 of the paper feed detector 120. This step s13 is repeatedly implemented until the interruption signal is generated, that is, as long as a negative decision (NO) is obtained in the step s13. When the interruption signal is generated, that is, when an affirmative decision (YES) is obtained in the step s13, the control routine of FIG. 3 is terminated.

<Generation of Control Signal by Signal Generator 130>

Referring next to the flow chart of FIG. 4, there will be described the control routine executed by the signal generator 130 of the signal generator circuit 100 to generate the control signal. This control routine is initiated when the start setting register 111 is loaded with the necessary commands in the step s12 of the control routine of FIG. 3. Although the signal generator circuit 100 is constituted by the so-called ASIC hardware, events of operation of the hardware arrangement of the signal generator 130 will be described by reference to the flow chart of FIG. 4, for easier understanding of the function of the signal generator 130.

The control routine of FIG. 4 is initiated with step s21 in which the signal generator 130 starts the first timer 133. Then, the signal generator 130 goes to step s22 to start the second timer 134. The step s22 is followed by step s23 in which the signal generator 130 determines whether a time t2 measured by the second timer 134 has reached the sampling time Ts set in the timing setting register 112. The step s23 is repeatedly implemented as long as a negative decision (NO) is obtained therein, that is, while the time t2 is shorter than the sampling time Ts.

When an affirmative decision (YES) is obtained in the step s23, that is, when the time t2 has reached time sampling time Ts, the signal generator 130 goes to step s24 to determine whether the actual feeding distance of the paper sheet has reached the target value r. This determination in the step s24 is made by comparing the count y of the counter 122 with the target value r set in the target-value register 113. If the count y is smaller than the target value r, it means that the actual paper feeding distance has not reached the desired value. If the count y is equal to or larger than the target value r, it means that the actual paper feeding distance has reached the desired value.

If the actual paper feeding distance has not reached the desired value, that is, when a negative decision (NO) is obtained in the step s24, the signal generator 130 goes to step s25 in which the computing portion 131 generates the control signal to be applied to the motor driver circuit 40. The manner in which the computing portion 131 generates the control signal will be described in detail by reference to the block diagram of FIG. 5. See <Generation of Control Signal by Computing Portion 131>.

Then, the signal generator 130 goes to step s26 in which the signal rectifying portion 132 rectifies or limits the control signal. The operation of the signal rectifying portion 132 in this step s26 is implemented until the predetermined signal rectifying time tr has passed after the moment of initiation of the present control routine of FIG. 4. The signal rectifying portion 132 rectifies or limits the control signal if this control signal requires the LF motor 20 to be operated so as to operate the paper feeding mechanism for feeding the sheet of paper in the reverse direction. That is, the control signal is rectified or limited so as to restrict or limit the operation of the LF motor 20 to limit the feeding motion of the paper sheet in the reverse direction. The manner in which the signal rectifying portion 132 rectifies the control signal will be described in detail by reference to the flow chart of FIG. 6. See <Operation of Signal Rectifying Portion 132 to Rectify Control Signal Input>.

Then, the signal generator 130 goes to step s27 in which the rectified or limited control signal is applied to the signal converter 140, which in turn converts the received control signal into the PWM signal to be applied to the motor driver circuit 40. The signal generator 130 then goes to step s28 to stop and reset the second timer 134. Then, the control flow goes back to the step s22.

When the actual paper feeding distance has reached the desired value, that is, when an affirmative decision (YES) is obtained in the step s24, during repeated implementation of the steps s22–s28, the signal generator 130 goes to step s29 to stop and reset the first and second timers 133, 134, and the present control cycle of FIG. 4 is terminated.

<Generation of Control Signal by Computing Portion 131>

Figure 5:
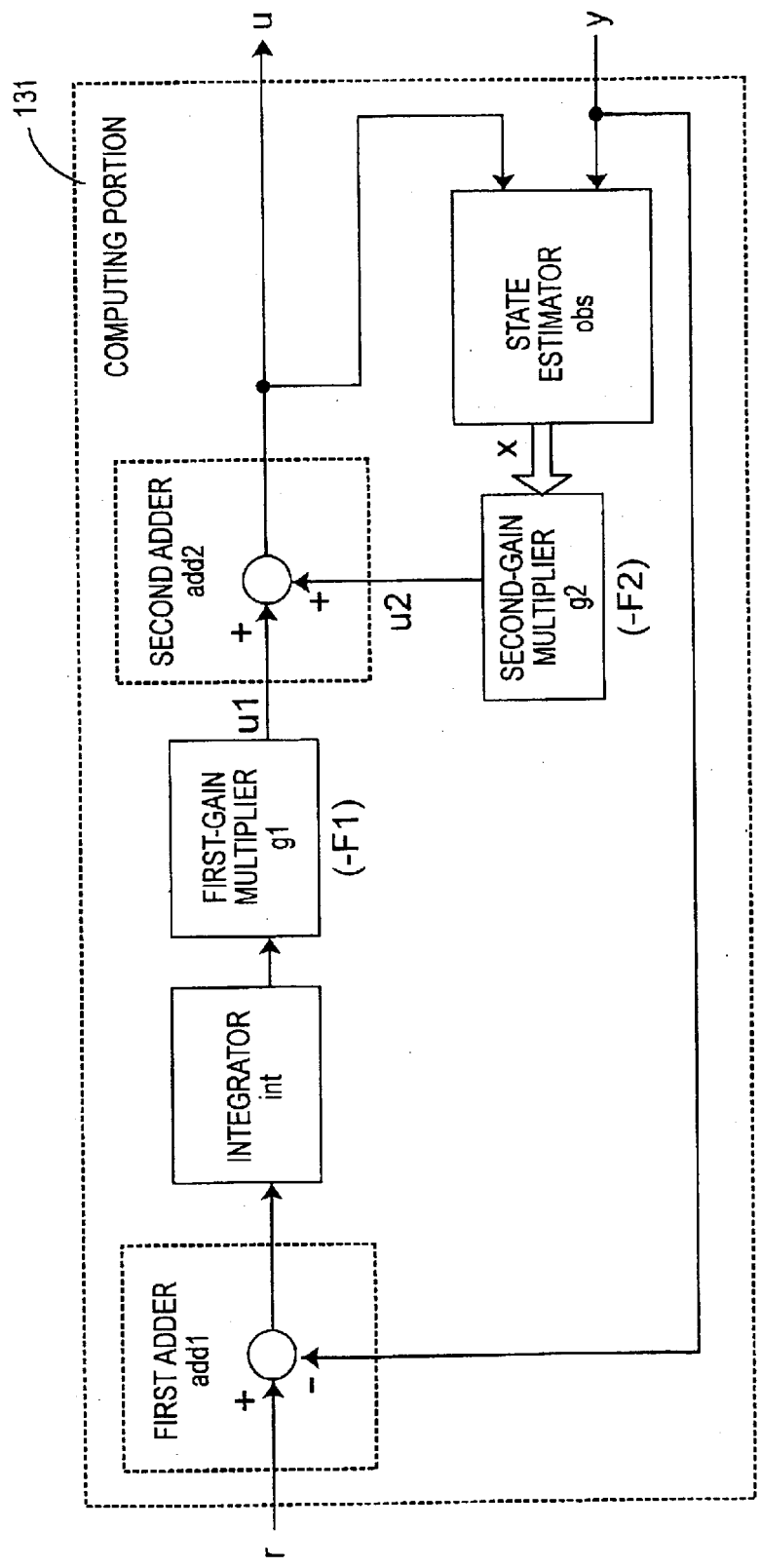
FIG. 5 is a block diagram showing an arrangement of a computing portion of the signal generator.

The operation of the computing portion 131 to generate the control signal will be described by reference to the block diagram of FIG. 5. The computing portion 131 of the signal generator 130 is arranged to effect a feedback control of the control input u to the motor driver circuit 40, such that the count y of the counter 122 coincides with the target value r set in the target-value register 113. The computing portion 131 includes a first adder add1, an integrator int, a first-gain multiplier g1, a state estimator obs, a second-gain integrator g2 and a second adder add2.

In the computing portion 131, the first adder add1 initially calculates an error (r−y) between the target value r set in the target-value register 113 and the count y of the counter 122. Then, the integrator int effects discrete integration (Z-transform) of the error (r−y) calculated by the first adder add1, by the sampling time Ts set in the timing setting register 112, to calculate an integral (Ts/z−1)(r−y) of the error (r−y), wherein "z" represents a complex variable.

Then, the first-gain multiplier g1 generates a first control signal having a value u1=−F1·(Ts/z−1)(r−y), which is a product of the integral (Ts/z−1)(r−y) calculated by the integrator int and the integral gain F1 set in the first-gain register 115.

In the meantime, the state estimator obs estimates a state quantity x representative of the internal state of the paper feeding mechanism, on the basis of the control input u to the motor driver circuit 40 and the count y of the counter 122.

Then, the second-gain multiplier g2 generates a second control signal having a value u2=−F2·x, which is a product of the state quantity x estimated by the state estimator obs and the state-feedback gain F2 set in the second-gain register 116.

The second adder add2 generates the control signal having the control input u which is equal to a sum of the value u1 of the first control signal and the value u2 of the second control signal.

With the thus generated control signal having the control input u applied to the motor driver circuit 40, the LF motor 20 is operated in the direction determined by the control input u and at the angular velocity also determined by the control input u, so that the main roller 10 and the eject roller 14b are rotated. When the control input u is a positive value, the LF motor 20 increases the angular velocity of the main roller 10 in the forward direction (indicated by the arrow "a" in FIG. 1) by an amount corresponding to the absolute value of the control input u. When the control input u is a negative value, the LF motor 20 increases the angular velocity of the main roller 10 in the reverse direction (indicated by the arrow "b" in FIG. 1), namely, reduces the angular velocity in the forward direction, by an amount corresponding to the absolute value of the control input u.

<Operation of Signal Rectifying Portion 132 to Rectify Control Signal Input>

The operation of the signal rectifying portion 132 to rectify the control signal will be described by reference to the flow chart of FIG. 6.

The control routine of FIG. 6 is initiated with step s31 in which the signal rectifying portion 132 determines whether the present point of time is in the above-indicated time period during which the control signal should be rectified or limited. This determination in the step s31 is made by determining whether a time t1 measured by the first timer 133 is shorter than the signal rectifying time tr set in the signal-rectifying register 114. If the time t1 is shorter than the signal rectifying time tr (t1<tr), the control signal should be rectified or limited. If the time t1 is not shorter than the signal rectifying time tr (t1≧tr), the control signal should not be rectified or limited.

If the present point of time is within the time period during which the control signal should be rectified or limited, that is, if an affirmative decision (YES) is obtained in the step s31, the signal rectifying portion 132 goes to step s32 to check the control input u of the control signal generated by the computing portion 131, that is, whether the control input u is a negative value or not.

If the control input u is a negative value, namely, if an affirmative decision (YES) is obtained in the step s32, the signal rectifying portion 132 goes to step s33 to rectify or limit the control input u, more precisely, to limit the control input u to zero in this specific example. Thus, the control signal received by the signal rectifying portion 132 is rectified to prevent the LF motor 20 from operating to increase the angular velocity of the main roller 10 in the reverse direction.

When the time t1 has increased to or exceeded the signal rectifying time tr, namely, when a negative decision (NO) is obtained in the step s31, or when the control input u is equal to zero or a positive value, namely, when a negative decision (NO) is obtained in the step s32, one cycle of execution of the control routine of FIG. 6 is terminated without implementation of the step s33.

It will be understood from the foregoing description of the first embodiment of this invention that the encoder 12 arranged to generate the encoder signals serves as a detector operable to detect an operation of the paper feeding mechanism, more specifically, a rotary motion of the main roller 10. It will also be understood that the first-gain multiplier g1 of the computing portion 131 serves as a first signal generator and a first-gain integrating portion, while the second-gain integrator g2 serves as a second signal generator and a second-gain integrating portion, and that the state estimator obs serves as an estimator, while the second adder add2 serves as a motor-control-signal generator. It will further be understood that the integrator int serves as an integrating portion, and that the integral gain F1 used by the first-gain integrator g1 serves as a first gain, while the state-feedback gain F2 used by the second-gain integrator g2 serves as a second gain.

It will also be understood that the signal rectifying portion 132 functions as a rectified-input applying portion operable to rectify the control signal as generated by the motor-control-signal geneartor, and apply the rectified control signal to an electric motor. It will further be understood that the target-value register 113 and the CPU 30 operable to set the target value r in the target-value register 113 cooperate to constitute a target inputting portion operable to input a target value of a control quantity by which a movable object is operated by the electric motor.

The main roller 10 is rotated in a predetermined forward direction to feed the paper sheet toward the eject roller 14b. It will be understood that the forward rotating direction of the main roller 10 is a predetermined direction in which the movable object is operated, while the reverse rotating direction of the main roller 10 is a direction opposite to the predetermined direction.

<Advantages of the Present Embodiment>

In the printer 1 constructed as described above, the control signal having a negative control input u is rectified in the step s33 of the control routine of FIG. 6, such that the control input u is zeroed, so that the LF motor 20 is prevented from being operated so as to increase the angular velocity of the main roller 10 in the reverse direction, whereby the operation of the paper feeding mechanism to feed the paper sheet in the reverse direction is prevented.

Where the control input u of the control signal is a positive value, the control signal as generated by the computing portion 131 is applied to the motor driver circuit 40. The control routine of FIG. 6 is formulated such that the control signal having a negative control input u is rectified only in the predetermined time period between the moment of initiation of the operation of the LF motor 20 and the moment at which the signal rectifying time tr has expired. In this initial or transient period immediately after the starting of the LF motor 20, the LF motor 20 is unlikely to be controlled so as to operate the paper feeding mechanism for feeding the paper sheet in the reverse direction. In view of this tendency, the control routine of FIG. 6 is arranged to rectify the control signal only in the transient time period, if the control input u is a negative value. This arrangement permits a plugging brake to be applied to the LF motor 20 as needed, after the transient period has expired.

After the initial or transient period has expired, the rectification of the control signal having a negative control input u is inhibited, so that the LF motor 20 can. be braked with a braking force suitable to brake the motion of the movable object, permitting efficient deceleration of the movable object.

In addition, the step s11 of the control routine of FIG. 3 is arranged such that the absolute values of the integral gain F1 and the state-feedback gain F2 to be set in the respective first-gain and second-gain registers 115, 116 increase with an increase in the target value r. Thus, the integral gain F1 and the state-feedback gain F2 are changed depending upon the target value r set in the target-value register 113.

The step s11 of the control routine of FIG. 3 is further arranged such that the signal rectifying time tr to be set in the signal-rectifying-time register 114 decreases with an increase in the target value r and an increase in the absolute values of the integral gain F1 and state-feedback gain F2. Thus, the signal rectifying time tr indicative of the time period during which the control signal is rectified if necessary is changed depending upon the target value r set in the target-value register 113. It will be understood that the CPU 30 implementing the step s11 and the signal-rectifying-time register 114 cooperate to constitute a rectifying-time-period changing portion operable to change the above-indicated time period depending upon the target value r and the gains F1 and F2. It will also be understood that the CPU 30 and the first-gain and second-gain registers 115, 116 cooperate to constitute a gain changing portion operable to change first and second gains in the form of the integral gain F1 and the state-feedback gain F2.

Further, the computing portion 131 of the signal generator 130 is arranged to effect the feedback control of the control input u to the motor driver circuit 40, such that the count y of the counter 122 coincides with the target value r set in the target-value register 113. In addition, the encoder 12 detects a rotating condition of the main roller 10.

Figure 7:
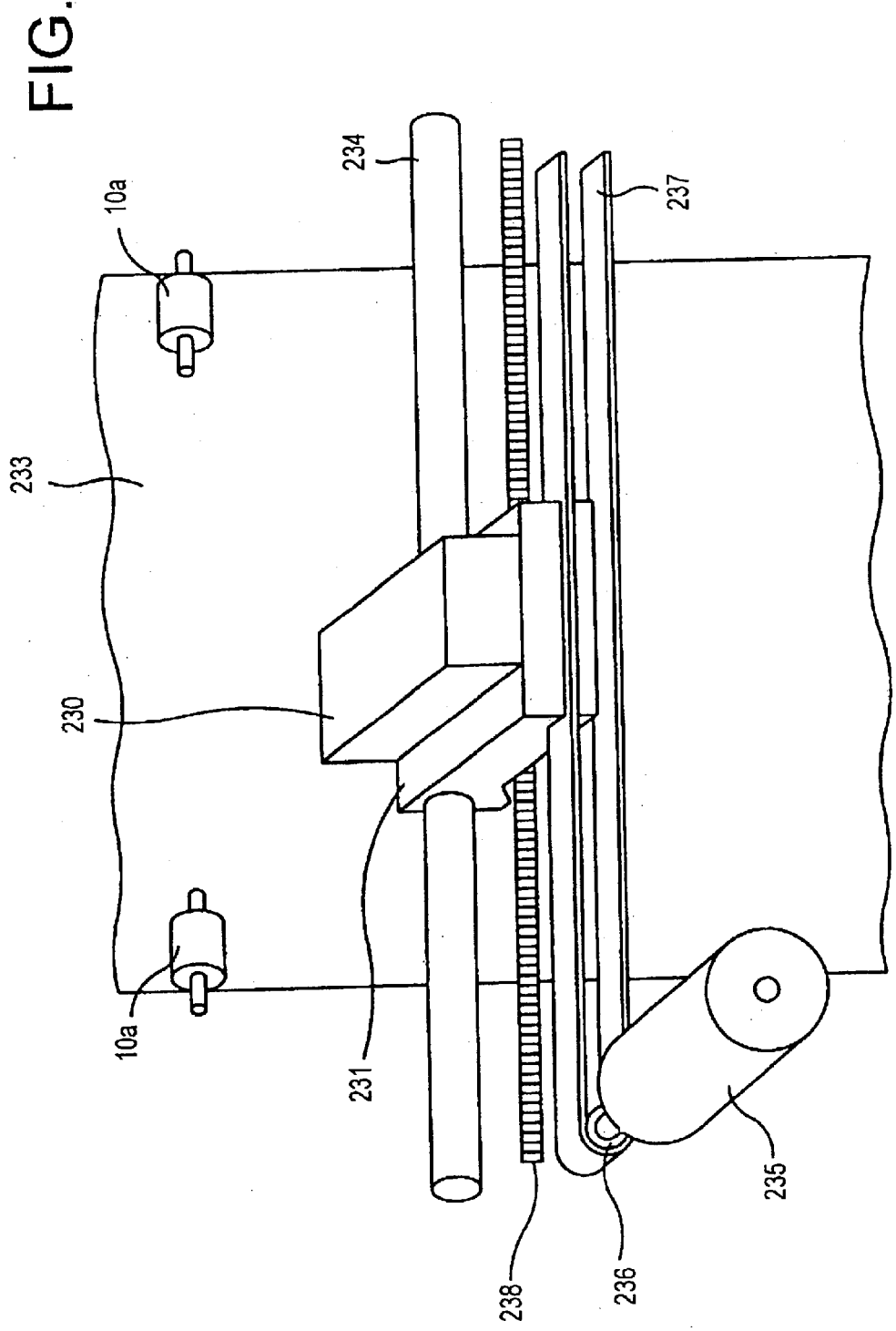
FIG. 7 is a schematic view showing a carriage drive mechanism in the ink-jet printer.

Referring next to FIG. 7, there is shown a carriage drive mechanism of the present ink-jet printer. In FIG. 7, reference sign "10a" denote the pinch rollers which cooperate with the main roller 10 (FIG. 1) to feed the sheet of paper indicated at 233. The carriage drive mechanism includes a guide rod 234 disposed so as to extend in a width direction of the paper sheet 233, which is perpendicular to the feeding direction of the paper sheet 233. The printer has a printing head 230 mounted on a carriage 231 which is slidably supported and guided by the guide rod 234. The printing head 230 has nozzles for injecting an ink onto the paper sheet 233. The carriage 231 is connected to an endless belt 237 extending in parallel with the guide rod 234, and is held in engagement with a driving pulley 236 and a driven or idler pulley (not shown). The driving pulley 236 is driven by a carriage-drive electric motor 235 (hereinafter referred to as "CR motor 235") located at one end of the guide rod 234, while the idler pulley is located at the other end of the guide rod 234.

In the carriage drive mechanism constructed as described above, the carriage 231 is arranged to be reciprocated in the width direction of the paper sheet 233 parallel to the guide rod 234, with a drive force which is produced by the CR motor 235 and which is transmitted to the carriage 231 through the endless belt 237.

Under the guide rod 234, there is disposed a timing scale 238 extending along the guide rod 234. The timing scale 238 has a succession of slits each of which has a predetermined width and which are formed such that the slits are equally spaced apart from each other by a predetermined distance (for example, 1/150 inch or about 0.17 mm) in the direction of movement of the carriage 231. On the underside of the carriage 231, there is disposed a detecting portion in the form of a photo-interrupter including at least one light-emitting element and at least two light-receiving or photo-sensitive elements, which are arranged such that each light-emitting element is opposed to the at least two light-receiving elements, with the timing scale 238 interposed therebetween. This detecting portion cooperates with the timing scale 238 to constitute a linear encoder 239 (shown in FIG. 8).

Figure 9:
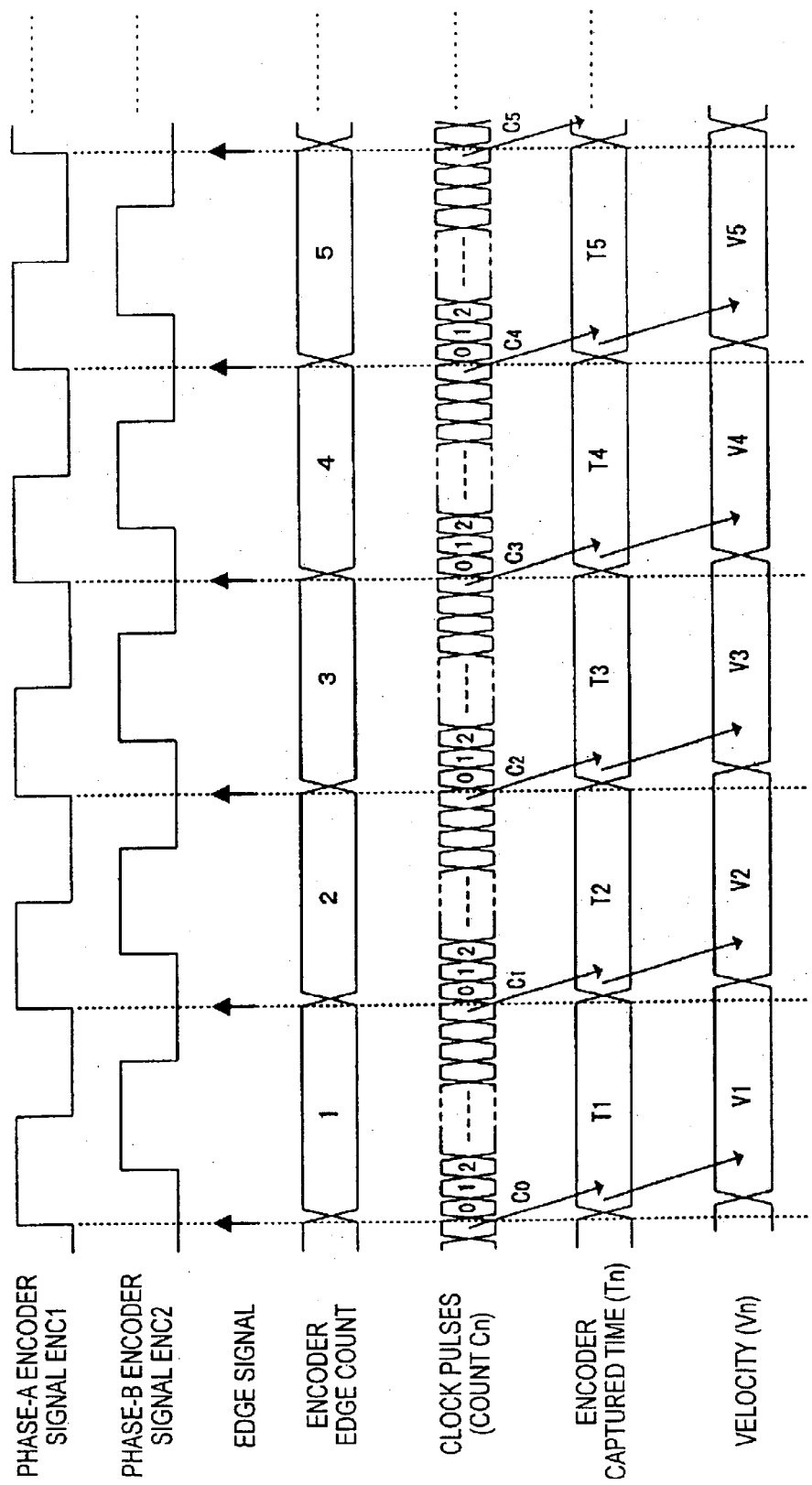
FIG. 9 is a timing chart indicating the operating states of various portions of the carriage motor control apparatus.

The detecting portion of the linear encoder 239 generates two kinds of encoder signals ENC1 and ENC2 which have a phase difference of about 1/4 of the period, as indicated in FIG. 9. When the carriage 231 is continuously moved in a forward direction (right direction as seen in FIG. 7) from the home position (leftmost position as seen in FIG. 7) toward the idler pulley, the phase of the first encoder signal ENC1 is advanced by about 1/4 of the period with respect to the second encoder signal ENC2. When the carriage 231 is moved in a reverse direction from the idler pulley toward the home position, the phase of the first encoder signal ENC1 is retarded by about 1/4 of the period with respect to the second encoder signal ENC2.

Figure 8:
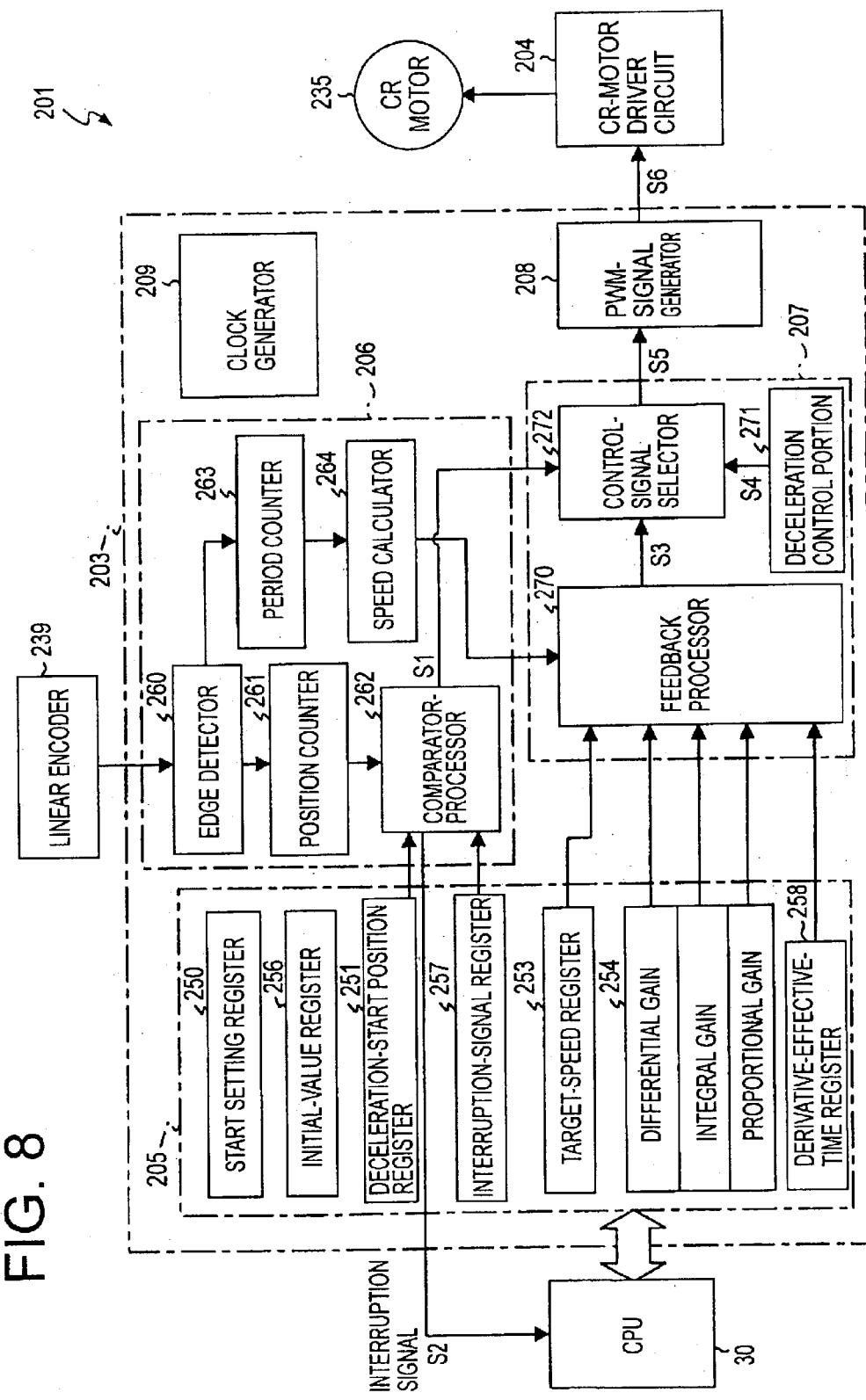
FIG. 8 is a block diagram showing an arrangement of a carriage motor control apparatus according to the preferred embodiment of the invention, to control an electric motor used to drive a carriage of the ink-jet printer.

The block diagram of FIG. 8 shows a carriage motor control apparatus, which is generally indicated at 201. The carriage motor control apparatus 201 is arranged to control the CR motor 235 on the basis of the encoder signals ENC1 and ENC2 generated by the linear encoder 239, for thereby controlling the moving speed of the carriage 231.

As shown in FIG. 8, the carriage motor control apparatus 201 consists of the above-indicated CPU (central processing unit) 30, an ASIC (Application Specific Integrated Circuit) 203, a CR-motor driver circuit 204, and the above-described linear encoder 239. The CPU 30 controls the printer in a centralized or coordinated manner, and the ASIC 203 generates a PWM signal S6 for controlling speed and direction of operation of the CR motor 235. The CR-motor driver circuit 204 controls the CR motor 235 according to the PWM signal S6 generated by the ASIC 203.

Figure 12:
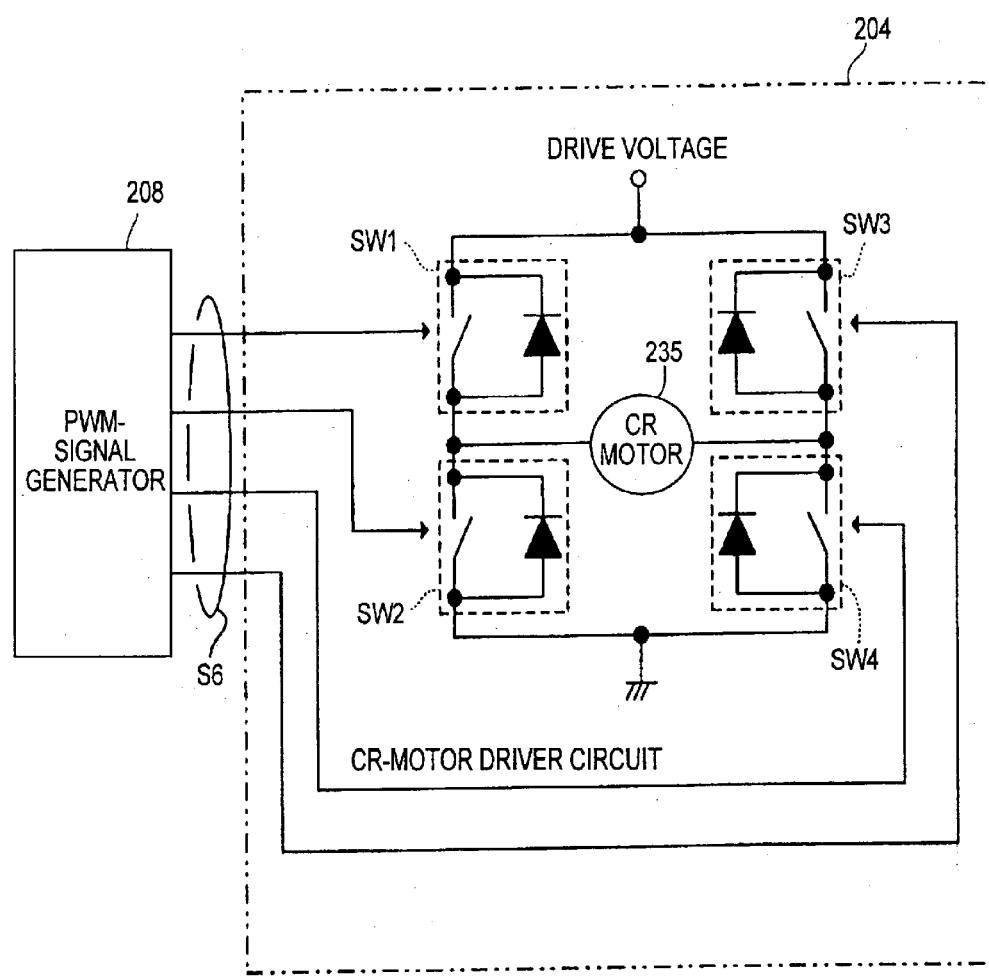
FIG. 12 is a schematic view showing an arrangement of a carriage motor driver circuit.

The CR-motor driver circuit 204, which is constructed as shown in FIG. 12, has an H-bridge circuit incorporating four switching elements SW1, SW2, SW3 and SW4, which are turned ON and OFF according to the PWM signal S6 generated by a PWM-signal generator 208 of the ASIC 203, so that the CR motor 235 is driven. Each of the switching elements SW1–SW4 may be a semiconductor switching element such as a bi-polar transistor or FET (Field-effect transistor).

The ASIC 203 incorporates a register array 205, a carriage detecting portion 206, a motor control portion 207, the above-indicated PWM-signal generator 208 and a clock generator 209. The register array 205 is arranged to store various parameters used for controlling the CR motor 235. The carriage detecting portion 206 is arranged to calculate the position and moving speed of the carriage 231 on the basis of the encoder signals ENC1, ENC2 received from the linear encoder 239. The motor control portion 207 is arranged to generate a motor control signal S5 for controlling the operating speed of the CR motor 235 on the basis of data received from the carriage detecting portion 206. The PWM-signal generator 208 is arranged to generate the PWM signal S6 having a duty ratio determined by the motor control signal S5 generated by the motor control portion 207. The clock generator 209 is arranged to generate clock pulses having a period which is sufficiently shorter than that of the encoder signals ENC1, ENC2. The clock pulses are fed to various portions of the ASIC 203.

Figure 11:
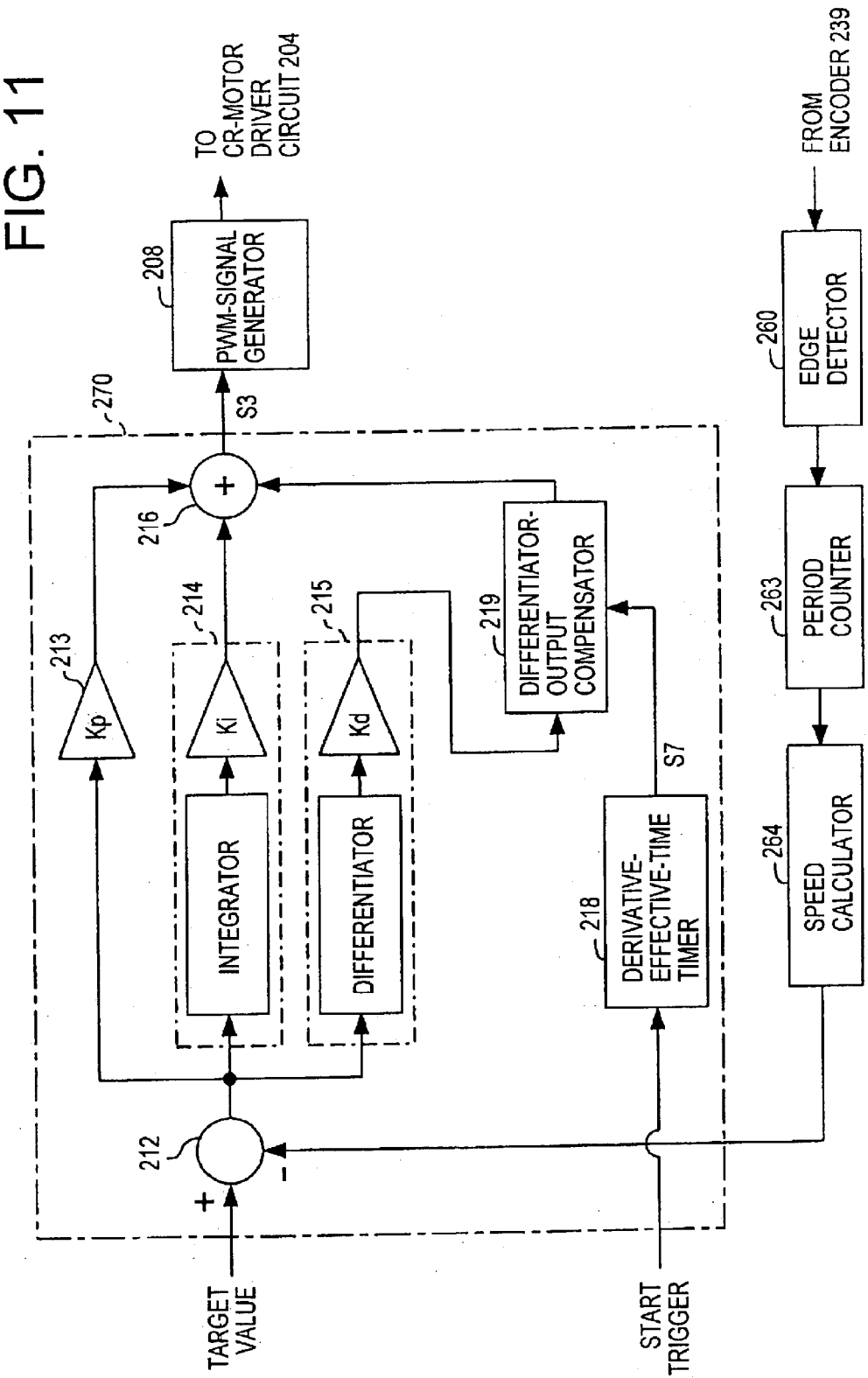
FIG. 11 is a block diagram showing an internal arrangement of a feedback processor of the carriage motor control apparatus, and some external devices connected to the feedback control portion.

The register array 205 includes: a start setting register 250 for starting the CR motor 235; a deceleration-start-position register 251 for setting or storing a deceleration-start position (a printing-end position) at which the deceleration of the carriage 231 is initiated; a target-speed register 253 for setting or storing a target speed of movement of the carriage 231; a gain register 254 for setting or storing a differential gain, an integral gain and a proportional gain, which are used for feedback calculating operations to control the operating speed (torque) of the CR motor 235; an initial-value register 256 for setting or storing initial values of parameters or control quantities that cannot be detected immediately after the starting of the CR motor 235; an interruption-signal register 257 for setting or storing a position at which an interruption signal is applied from the carriage detecting portion 206 to the CPU 30; and a derivative-effective-time register 258 for setting or storing a derivative effective time during which a speed control signal S3 is generated on the basis of a differential control value or quantity or a derivative calculated by a differential operator 215 of the feedback processor 270, as described below in detail by reference to FIG. 11.

The derivative effective time stored in the derivative-effective-time register 258 is a multiple (e.g., 10 times) of the period of the PWM signal S6 to be generated by the PWM generator 208.

The carriage detecting portion 206 includes an edge detecting portion 260 operable to generate an edge signal indicative of the beginning or end of each period of the phase-A encoder signal ENC1, and to detect the operating direction of the CR motor 235, on the basis of the phase-A and phase-B encoder signals ENC1 and ENC2. In the present embodiment, the edge detecting portion 260 detects the edge of the phase-A encoder signal ENC1 while the phase-B encoder signal ENC2 has a low level. The operating direction of the CR motor 235 is detected to be the forward direction when the detected edge of the phase-A encoder signal ENC1 represents a rise of the signal, and to be the reverse direction when the detected edge represents a fall of the signal. The carriage detecting portion 206 further includes a position counter 261 which is arranged to count the edge signals generated by the edge detecting portion 260. As indicated in FIG. 9, the position counter 261 counts up the generated edge signals in the forward direction, when the operating direction of the CR motor 235 detected by the edge detecting portion 260 corresponds to the forward moving direction of the carriage 231, and counts down the edge signals in the reverse direction when the detected operating direction of the CR motor 235 corresponds to the reverse moving direction of the carriage 231. Thus, the count of the position counter 261 ("ENCODER EDGE COUNT" indicated in FIG. 9) indicates the position of the carriage 231 with respect to the home position, that is, the position of the slit of the timing scale 238 at which the carriage 231 is presently located. For example, the count of the position counter 261 is used to determine whether the carriage 231 is located at the deceleration-start position set in the deceleration-start-position register 251, as described below.

The carriage detecting portion 206 further includes a comparator-processor 262 operable to compare the count value of the position counter 261 with a value set in the deceleration-start-position register 251, to determine whether the carriage 231 has been moved to the deceleration-start position, and generate a control switching signal S1 and apply the above-indicated interruption signal S2 to the CPU 30 when the comparator-processor 262 determines that the carriage 231 has reached the deceleration-start position. The carriage detecting portion 206 further includes a period counter 263 operable to detect a period of the edge signals generated by the edge detecting portion 260, by counting the number of the clock pulses Cn generated by the clock generator 209. The carriage detecting portion 206 also includes a speed calculator 264 operable to calculate a moving speed $V_n$ of the carriage 231, on the basis of the spacing distance (1/150 inch) of the slits of the timing scale 238 and a captured time $t_n$ (=$C_{n-1}$×clocking period) determined by a retained value $C_{n-1}$ of the count $C_n$ (FIG. 9) of the period counter 263 obtained in the last period of the phase-A encoder signal ENC1.

The motor control portion 207 includes a feedback processor 270 operable on the basis of the values set in the target-speed register 253, gain register 254 and derivative-effective-time register 258, to generate the speed control signal S3 for controlling the operating speed of the CR motor 235 such that the moving speed of the carriage 231 calculated by the speed calculator 264 coincides with the target speed set in the target-speed register 253. The motor control portion 207 further includes a deceleration control portion 271 operable to generate a deceleration control signal S4 for decelerating the CR motor 235, and a control signal selector 272 operable to supply the PWM-signal generator 208 with the motor control signal S5. Described in detail, the control signal selector 272 supplies the PWM-signal generator 208 with the speed control signal S3 generated by the feedback processor 270, until the control signal selector 272 receives the control switching signal S1 from the comparator-processor 262, and the deceleration control signal S4 generated by the deceleration control portion 271, after the control signal selector 272 receives the control switching signal S1.

Referring next to the flow chart of FIG. 10, there will be described a CR motor control routine executed by the CPU 30 of the present carriage motor control apparatus 201.

The CR motor control routine is initiated with step S110 to set various parameters in the register array 205 of the ASIC 203, namely, the deceleration-start position in the deceleration-start position register 251, the target speed in the target-speed register 253, the differential, integral and proportional gains in the gain register 254, the initial control quantity values in the initial-value register 256, and the derivative effective time in the derivative-effective-time register 258. Then, the control flow goes to step S120 to set the start setting register 250, for activating the various portions of the ASIC 203. When the carriage 231 has reached the deceleration-start position, the interruption signal S2 is generated by the comparator-processor 262. Step S120 is followed by step S130 to determine whether the interruption signal S2 has been generated. One cycle of execution of the present CR motor control routine is terminated upon generation of the interruption signal S2.

In the carriage motor control apparatus 201 constructed as described above, the ASIC 203 is started by the CPU 30 by setting the register array 205, so that the speed control signal S3 generated by the feedback processor 270 is applied as the motor control signal S5 to the PWM-signal generator 208 until the carriage 231 has reached the deceleration-start position set in the deceleration-start-position register 251. Accordingly, the operating speed (torque) of the CR motor 235 is controlled such that the moving speed of the carriage 231 is controlled to be equal to the target speed set in the target-speed register 253. As a result, the carriage 231 is accelerated in an accelerating region so that the moving speed of the carriage 231 is increased to the target value. In the following constant-speed region, the carriage 231 is moved at the target speed.

When the carriage 231 has reached the deceleration-start position, the comparator-processor 262 applies the interruption signal S2 to the CPU 30, while at the same time the motor control signal S5 to be applied to the PWM-signal generator 208 is changed from the speed control signal S3 to the deceleration control signal S4 generated by the deceleration control portion 271. As a result, the CR motor 235 is operated as an electric generator with a kinetic energy of the still moving carriage 231, so that a rotary motion of the CR motor 235 is converted into an electric energy, whereby the carriage 231 is efficiently decelerated in the decelerating region from the deceleration-start position, and is eventually stopped.

As shown in FIG. 11, the feedback processor 270 arranged to apply the speed control signal S3 as the motor control signal S5 to the PWM-signal generator 208 to move the carriage 231 from the zero position to the deceleration-start position includes a subtractor 212, a proportional operator 213, an integral operator 214, a differential operator 215, an adder 216, a derivative-effective-time timer 218, and a differentiator-output compensator 219. The subtractor 212 is operable to subtract, from the target speed set in the target-speed register 253, the detected moving speed of the carriage 231 calculated by the speed calculator 264, so that a speed control error between the target speed and the detected moving speed is calculated. The proportional operator 213 is operable to calculate a proportional control value (proportional control quantity) by multiplying the speed control error (calculated by the subtractor 212) by the proportional gain Kp set in the gain register 254. The integral operator 214 is operable to integrate the calculated speed control error, and multiply the thus obtained sum by the integral gain Ki set in the gain register 254, to calculate an integral control value (integral control quantity). The differential operator 215 is operable to differentiate the speed control error, and multiply the thus obtained derivative by the differential gain Kd set in the gain register 254, to calculate a differential control value (differential control quantity or a derivative). The derivative-effective-time timer 218 is operable to generate a derivative effectuating command signal S7 for the derivative effective time set in the derivative-effective-time register 258, after a start trigger signal is generated. The differentiator-output compensator 219 is operable to apply the output of the differential operator 215 to the adder 216 without any compensation of the output while the derivative effectuating command signal S7 is present, and zero the output of the differential operator 215 while the derivative effectuating command signal S7 is not present. The adder 216 is operable to sum the proportional, integral and differential control values received from the proportional operator 213, integral operator 214 and output compensator 219, and generates the speed control signal S3 corresponding to the sum, which is applied to the PWM-signal generator 208. Thus, the feedback processor 270 is arranged to effect a so-called PID control.

The start trigger signal applied to the feedback processor 270 is generated upon generation of each edge signal from the edge detector 260. This start trigger signal is also applied to the proportional operator 213, integral operator 214 and differential operator 215 as well as the derivative-effective-time timer 218, so that the these operators 213, 214, 215 receive the speed control error from the subtractor 212 and respectively update the proportional, integral and differential control values upon generation of each start trigger signal applied to the feedback processor 270.

The differential operator 215 is arranged to calculate the differential control value for minimizing an influence of instantaneous external disturbances (minute oscillating noise of several hundreds of Hz to several kHz) on the moving speed of the carriage 231.

In the carriage motor control apparatus 201 according to the present embodiment constructed as described above, the feedback processor 270 is arranged to generate the speed control signal S3 on the basis of the proportional, integral and differential control values calculated by the PID control, such that the differential control value as calculated by the differential operator 215 is used to determine the speed control signal S3 for the predetermined derivative effective time after the moment of initiation of calculation of the differential control value by the differential operator 215, and such that the differential control value calculated by the differential operator 215 is compensated by the differentiator-output compensator 219, so as to be zeroed after the predetermined derivative effective time has expired, so that the speed control signal S3 is generated on the basis of only the proportional and integral control values, without the differential control value being taken into account, after the predetermined derivative effective time has passed. Thus, the carriage motor control apparatus 201 does not give the calculated differential control quantity a constant weight when the speed control signal S3 is generated by the PID control, but is adapted to reduce the weight of the calculated differential control quantity after the predetermined derivative effective time has passed.

Namely, the carriage motor control apparatus 201 is arranged such that the speed control signal S3 is generated by using the differential control quantity as calculated by the differential operator 215 for the predetermined derivative effective time, so that the CR motor 235 can be controlled with high stability so as to control the moving speed of the carriage 231 to coincide with the target value with a high response, even in the presence of an instantaneous external disturbance or noise.

Since the carriage motor control apparatus 201 is further arranged such that the calculated differential control quantity used for generating the speed control signal S3 is compensated to be a reduced value after the predetermined derivative effective time has passed, so that the moving speed as represented by the generated speed control signal S3 does not considerably deviate from the actual speed value, even in the presence of a relatively large difference between the detected and actual moving speed values. Although the present carriage motor control apparatus 201 is arranged to discontinuously or discretely detect the moving speed of the carriage 231 by a digital or discrete system on the basis of the edge signal of the encoder 239, the speed control signal S3 will not considerably deviate from the actual moving speed of the carriage even in the terminal portion of each cycle time at which the differential control quantity is updated.

Thus, the present carriage motor control apparatus 201 permits the CR motor 235 to be controlled with high stability even in the presence of an instantaneous external disturbance or noise, for at least the predetermined derivative effective time during which the speed control signal S3 is generated on the basis of the differential control quantity as calculated by the differential operator 215. Further, the present control apparatus 201 is arranged to reduce the calculated differential control quantity as used to generate the speed control signal S3 after expiration of the predetermined derivative effective time, so that the present control apparatus 201 makes it possible to prevent an inadequate control of the CR motor 235 such as an overshoot of its speed with respect to the target speed, which would take place due to inadequate generation of the speed control signal S3 in the terminal portion of each cycle time of calculation of the differential control quantity.

Since the present carriage motor control apparatus 201 is arranged to control the CR motor 235 such that the actual moving speed of the carriage 231 substantially coincides with the target speed value in a sufficiently short control response time, the compensation of the calculated differential control quantity so as to be zeroed makes it possible to optimize the speed control signal S3.

As described above, the derivative effective time stored in the derivative-effective-time register 258 in the carriage motor control apparatus 201 is determined to be longer than a pulse-width-modulation time interval at which the PWM signal S6 is generated by the PWM generator 208. For instance, the derivative effective time is set to be a selected multiple of the pulse-width-modulation time interval.

In the present arrangement, therefore, the compensation of the differential control quantity does not take place during the pulse-width-modulation time interval, making it possible to prevent a delay in the control response of the CR motor 235. In particular, the derivative effective time determined to be a multiple of the pulse-width-modulation time interval permits the moment of compensation of the calculated differential control quantity to be substantially coincident with the moment at which the PWM signal S6 is updated by the PWM signal generator 208, so that the control response of the CR motor 235 can be improved while preventing an unnecessary time between the moment of compensation of the differential control quantity and the moment of updating of the PWM signal S6.

Although the carriage motor control apparatus 201 is arranged to discontinuously or discretely detect the moving speed of the carriage 231 and control the CR motor 235 by PWM control (pulse width modulation), the control apparatus 201 does not suffer from deterioration of the control response of the CR motor 235, which would cause inadequate control of the CR motor 235.

In the present embodiment, the carriage motor control apparatus 201 is an apparatus operable to feedback-control an operating speed of an electric motor, and the carriage 231 is a movable object driven by the electric motor. It will be understood that the linear encoder 239 and the carriage detecting portion 206 cooperate to constitute a speed detector operable to detect the moving speed of the movable object, while the subtractor 212 serves as a speed-control-error calculator operable to calculate a speed control error between the moving speed detected by the detector and a predetermined target speed value. It will also be understood that the proportional operator 213 and the integral operator 214 serve as a control-quantity calculator operable to calculate speed control quantities including a proportional control value and an integral control value, while the differential operator 215 serves as a differential-control-quantity calculator operable to calculate a differential control quantity. It will further be understood that the feedback processor 270 serves as a control-command-value determining portion operable to determine a control command value for operating the electric motor to move the movable object at the target speed value, while the derivative-effective-time timer 218 and the differentiator-output compensator 219 cooperate to constitute a differential-control-quantity compensating portion operable to compensate the differential control value as calculated by the differential-control-quantity calculator so that the compensated differential control value is used by the control-command-value determining portion. It will also be understood that the PWM signal generator 208 functions as a command-signal generator operable to generate a PWM signal on the basis of the control command value determined by the control-command-value determining portion.

<Modifications>

While the motor control apparatus shown in FIGS. 1–6 is provided to control the LF motor 20 for activating the paper feeding mechanism, the principle of control according to the control arrangement for the LF motor 20 is applicable to control the CR motor 235 for moving the carriage 231.

In the illustrated embodiment, the rotary encoder 12 is used to detect the paper feeding movement of the paper feeding mechanism, while the linear encoder 239 is used to detect the movement of the carriage 231. However, detecting means other than the rotary and linear encoders 12, 239, such as a linear encoder may be used to detect the paper feeding movement and the carriage movement.

Although the rotary encoder 12 is attached to the main roller 10 so that the rotary disc 12a is rotated with the main roller 10, the encoder 12 may be attached to the output shaft of the LF motor 20 so that the rotary disc 12a is rotated with the output shaft. In this case, the operating condition of the LF motor 20 is directly detected by the encoder 12.

The step s11 of the control routine of FIG. 3 is formulated such that the signal rectifying time tr to be set in the signal-rectifying-time register 114 decreases with an increase in the target value r and in the absolute values of the integral gain F1 and the state-feedback gain F2. However, the step s11 may be formulated such that the signal rectifying time tr set in the signal-rectifying-time register 114 is held constant irrespective of the target value r and the gains F1 and F2.

Figure 10:
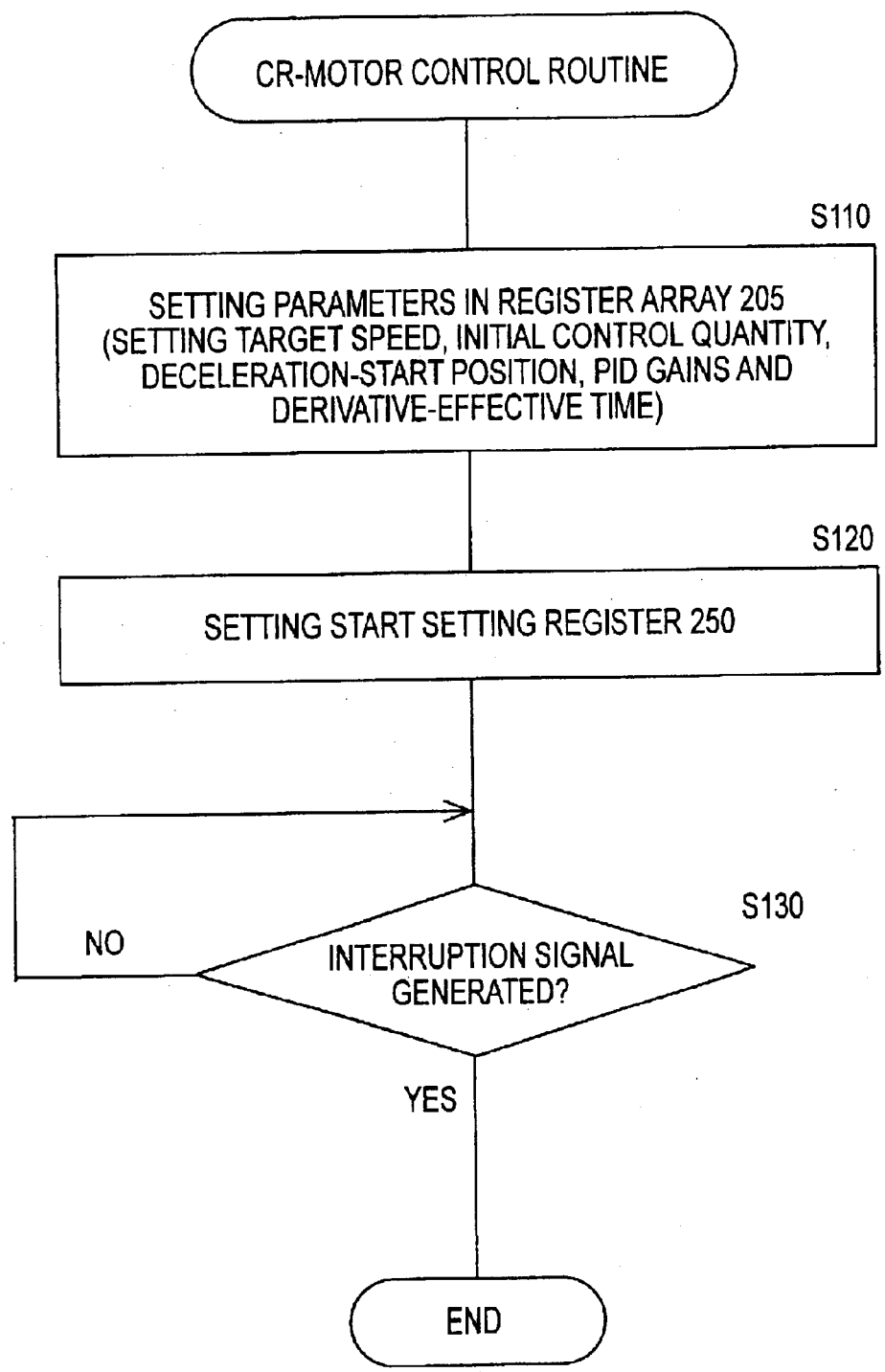
FIG. 10 is a flow chart illustrating a routine executed by a CPU of the carriage motor control apparatus to control the carriage drive motor.

While the CPU 30 is used to execute the control routines of FIGS. 3 and 10, respectively, these control routines may be executed by a computer system connected to the printer 1 through a wire or wireless communication system.

In the illustrated embodiment, the signal generator 130 arranged to generate the control signal according to the control routine of FIG. 4 is a hardware provided by the ASIC. However, the control routine of FIG. 4 may be executed according to a software program by a computer system connected to the CPU 30 or printer 1 through a wire or wireless communication system.

The signal rectifying portion 132 arranged to rectify the control input u according to the control routine of FIG. 6 is also a hardware provided by the ASIC. However, the control routine of FIG. 6 may also be executed according to a software program by a computer system connected to the CPU 30 or printer 1 through a wire or wireless communication system.

In the carriage motor control apparatus 201 of FIGS. 7–12, the start trigger signal applied to the feedback processor 270 is generated upon generation of each edge signal from the edge detector 260. However, the start trigger signal may be generated at a predetermined constant time interval Ts (at a predetermined PID sampling interval Ts) by a trigger-signal generator circuit. The timing chart of FIG. 15 indicates values of various portions of a carriage motor control apparatus according to a second embodiment of the invention provided with the trigger-signal generator circuit indicated above. It is noted that the same reference signs as used for the carriage motor control apparatus 201 according to the first embodiment will be used in the second embodiment described below.

Figure 15:
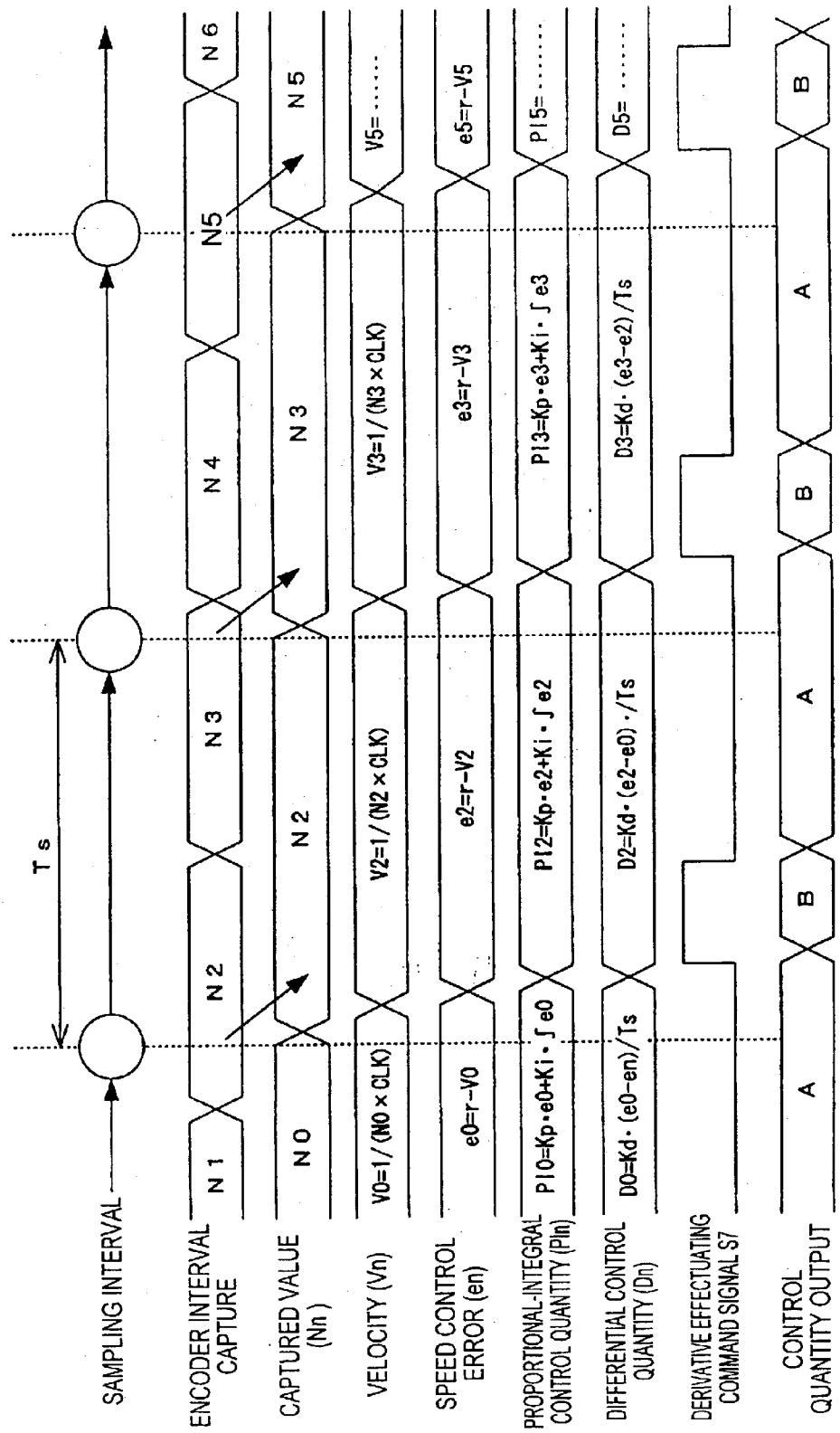
FIG. 15 is a timing chart indicating values of various portions of a carriage motor control apparatus according to a still further embodiment of this invention.

In the carriage motor control apparatus according to the second embodiment of FIG. 15, the period counter 263 retains an encoder interval capture Nn as a captured value Nn upon generation of each start trigger signal, and the speed calculator 264 calculates the moving speed or velocity Vn on the basis of the captured value Nn, that is, $Vn=1/(Nn \times CLK)$, where "CLK" represents a reference clocking interval for measuring the encoder interval.

After the moving speed Vn is calculated, the subtractor 212 of the feedback processor 270 subtracts the moving speed Vn from the target speed value r, to calculate a speed control error $en=r-Vn$, and the proportional and integral operators 213 and 214 calculate a proportional-integral control quantity $PIn=Kp \cdot en+Ki \cdot \int en$, on the basis of the calculated speed control error en. Further, the differential operator 215 calculates a differential control quantity $Dn=Kd \cdot (en-en-1)/Ts$, on the basis of the calculated speed control error en. The derivative-effective-time timer 218 detects the moment of completion of calculation of the differential control quantity Dn, on the basis of the moment of generation of the start trigger signal, and supplies the differentiator-output compensator 219 with the derivative effectuating command signal S7, for the predetermined derivative effective time after the moment of completion of calculation of the differential control quantity Dn.

Namely, the feedback processor 270 supplies the PWM signal generator 208 with the speed control signal S3 indicative of a derivative reflecting control quantity B which is a sum of the proportional-integral control quantity PIn and the differential control quantity Dn, until the predetermined derivative. effective time has expired after the control quantities have been calculated, and supplies the PWM signal generator 208 with the speed control signal S3 indicative of a derivative-removed control quantity A which is equal to the proportional-integral control quantity PIn, after the predetermined derivative effective time has expired.

Thus, the moving speed or velocity Vn is detected at the predetermined interval or period Ts in the second embodiment, so that the speed control signal S3 is updated at the predetermined period Ts.

In the carriage motor control apparatus 201 according to the first embodiment wherein the moving speed Vn is detected upon generation of each edge signal from the edge detector 260, the period of the edge signal increases with a decrease in the moving speed Vn of the carriage 231, so that the interval at which the speed control signal S3 is updated tends to be relatively long as the moving speed of the carriage 231 is relatively low.

In the carriage motor control apparatus according to the second embodiment wherein the moving speed Vn is detected at the suitably determined time interval Ts, the interval at which the speed control signal S3 is updated does not vary with the moving speed of the carriage 231, so that the CR motor 235 can be controlled with a high degree of stability.

In the first and second embodiments, the differential control quantity calculated by the differential operator 215 is zeroed by the differential-output compensator 219 after the predetermined derivative effective time has expired. However, the differential-output compensator 219 may be modified to gradually reduce the differential control quantity from the initial value as calculated by the differential operator 215, as the time passes after expiration of the predetermined derivative effective time. This modification permits generation of the optimum speed control signal S3 and adequate control of the CR motor 235, even where it takes a relatively long control response time for the actual moving speed to coincide with the target speed value.

Alternatively, the differentiator-output compensator 219 may be modified to generate a differential control quantity by multiplying the differential control quantity as calculated by the differential operator 215, by a suitable compensating coefficient Rt (e.g., 0.2) after expiration of the derivative effective time. This arrangement permits generation of the optimum speed control signal S3 and adequate control of the CR motor 235, even where there exists a relatively small speed control error between the actual and target moving speed values as a result of PID control with a relatively short control response time.

Thus, the differentiator-output compensator need not be arranged to zero the differential control quantity after the predetermined derivative effective time has expired, but may be otherwise arranged as desired to assure adequate control of the CR motor 235.

There will next be described an experiment conducted on two specimens of the carriage motor control apparatus according to the principle of the present invention and a specimen of the prior art apparatus.

The specimens of the invention subjected to the experiment are arranged to generate the start trigger signal at a predetermined period Ts (sampling interval Ts) as in the second embodiment of FIG. 15. In the first specimen apparatus, the derivative effective time is set to be 25% of the sampling interval Ts, and the differential control quantity calculated by the differential operator 215 is reduced to $1/10$ after the predetermined derivative effective time has expired. In the second specimen apparatus, the derivative effective time is also set to be 25% of the sampling interval Ts, and the differential control quantity is reduced to $1/100$ after the derivative effective time has expired. The comparative or prior art specimen apparatus is not arranged to effect any compensation of the differential control quantity calculated by the differential operator. The three specimens used in the experiment have the same PID gains (Kp, Kd and Ki).

Figure 16:
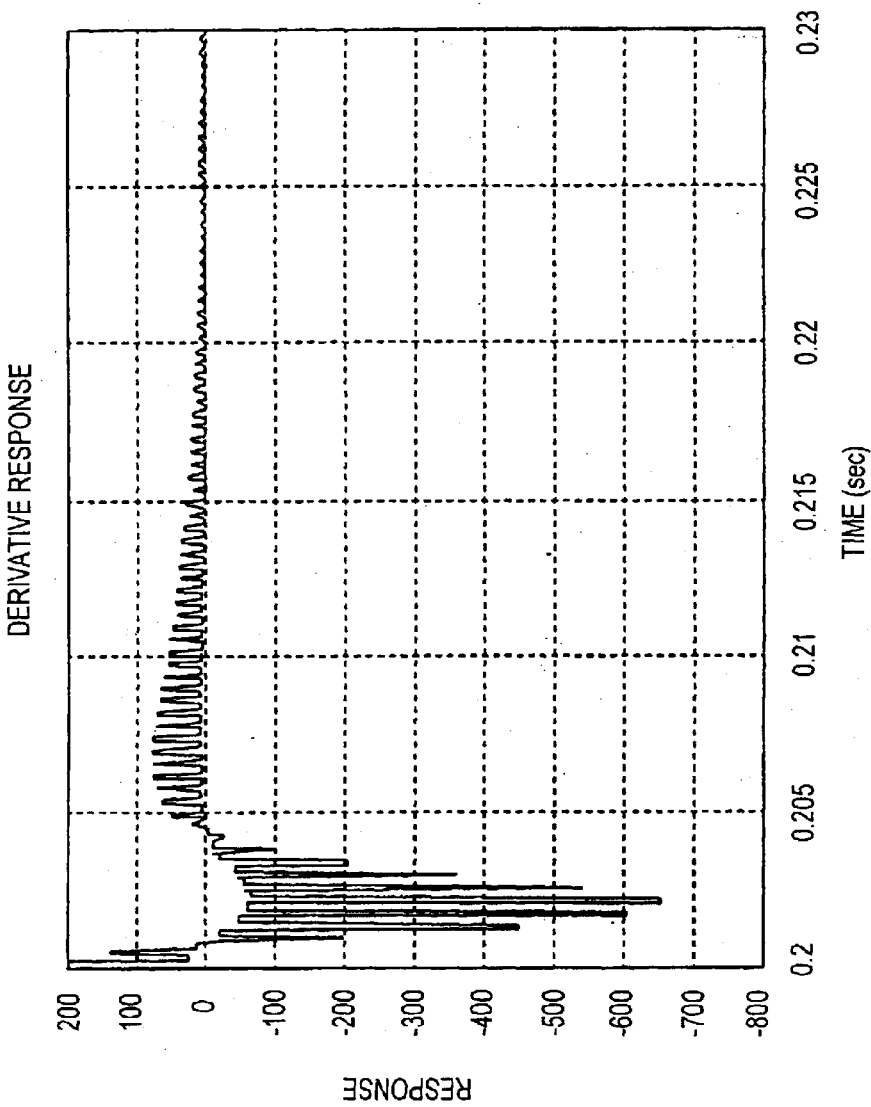
FIG. 16 is a graph indicating a derivative control quantity as calculated by a differential calculator in a first specimen apparatus.
Figure 17:
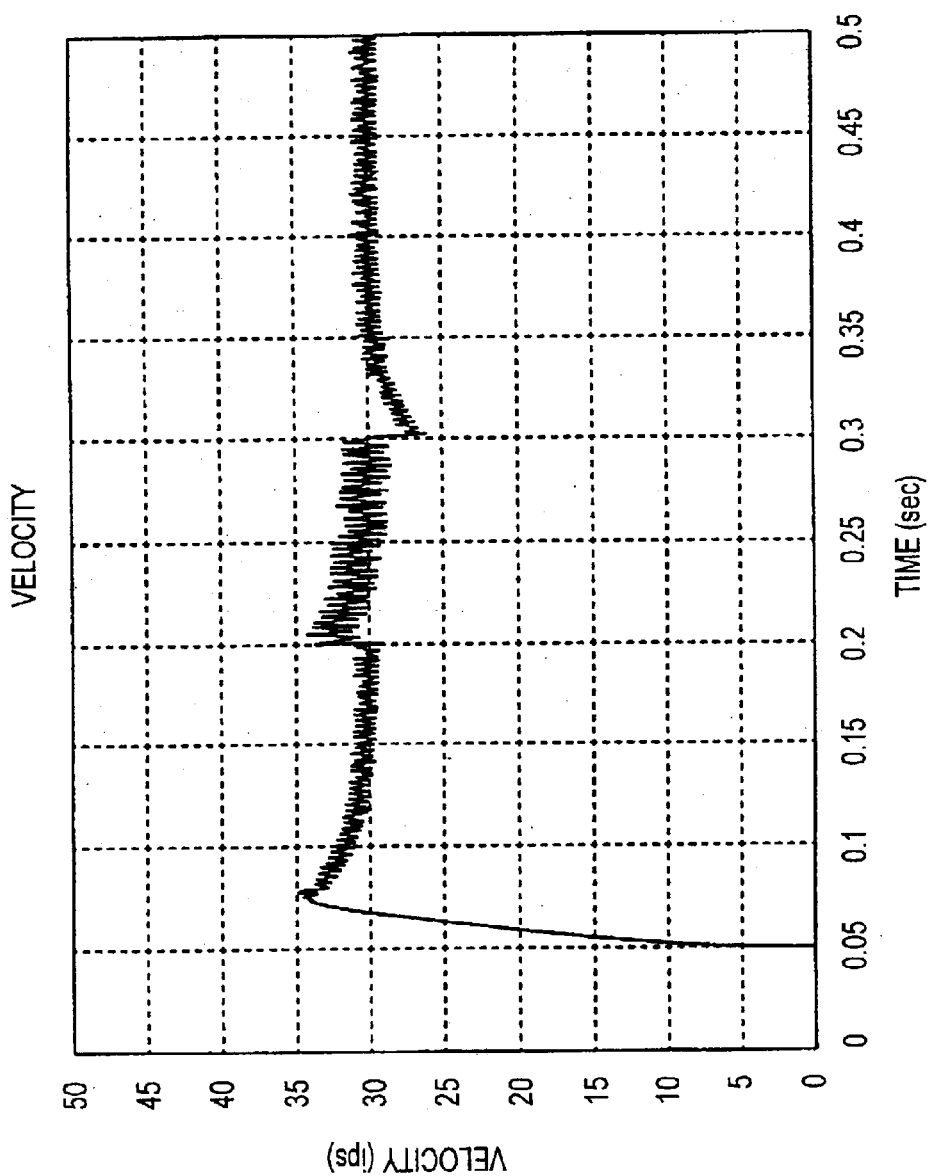
FIG. 17 is a graph indicating a velocity represented by a measured output of a speed calculator in the first specimen apparatus.
Figure 18:
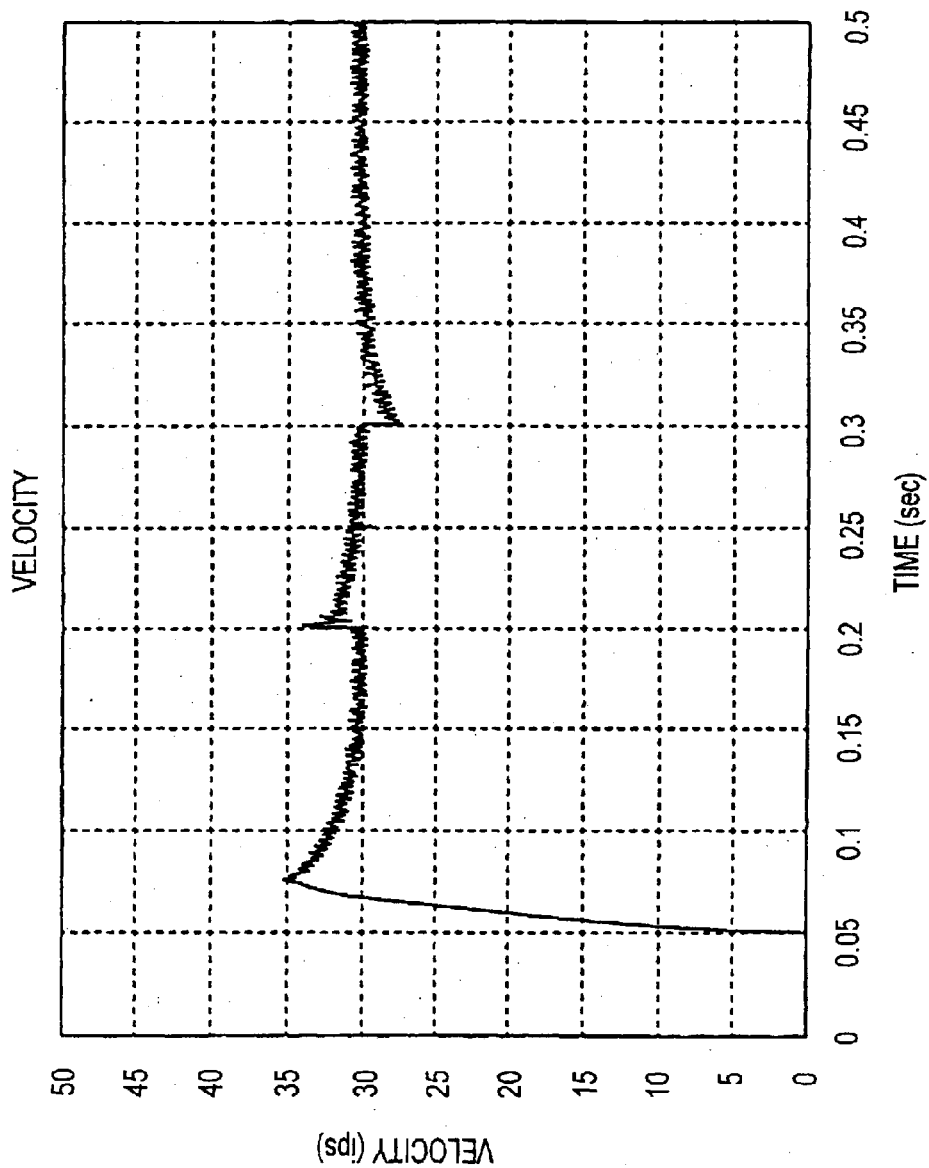
FIG. 18 is a graph indicating a velocity represented by a measured output of a speed calculator in a second specimen apparatus.

The graph of FIG. 16 indicates the differential control quantity as calculated by the differential operator 215 in the first specimen apparatus of the present invention, and the graph of FIG. 17 indicates the detected moving speed or velocity as represented by the output of the speed calculator 264 of the first specimen apparatus of the invention. Further, the graph of FIG. 18 indicates the detected velocity as represented by the speed calculator 264 of the second specimen apparatus of the invention, while the graph of FIG. 19 indicates the detected velocity as represented by the speed calculator 264 in the prior art specimen apparatus. Each specimen apparatus was started at a point of time (0.05 sec.) with the target speed value of 30 ips set in the target-speed register 253, and external disturbances were purposely generated at two points of time, 0.20 sec. and 0.30 sec.

Figure 19:
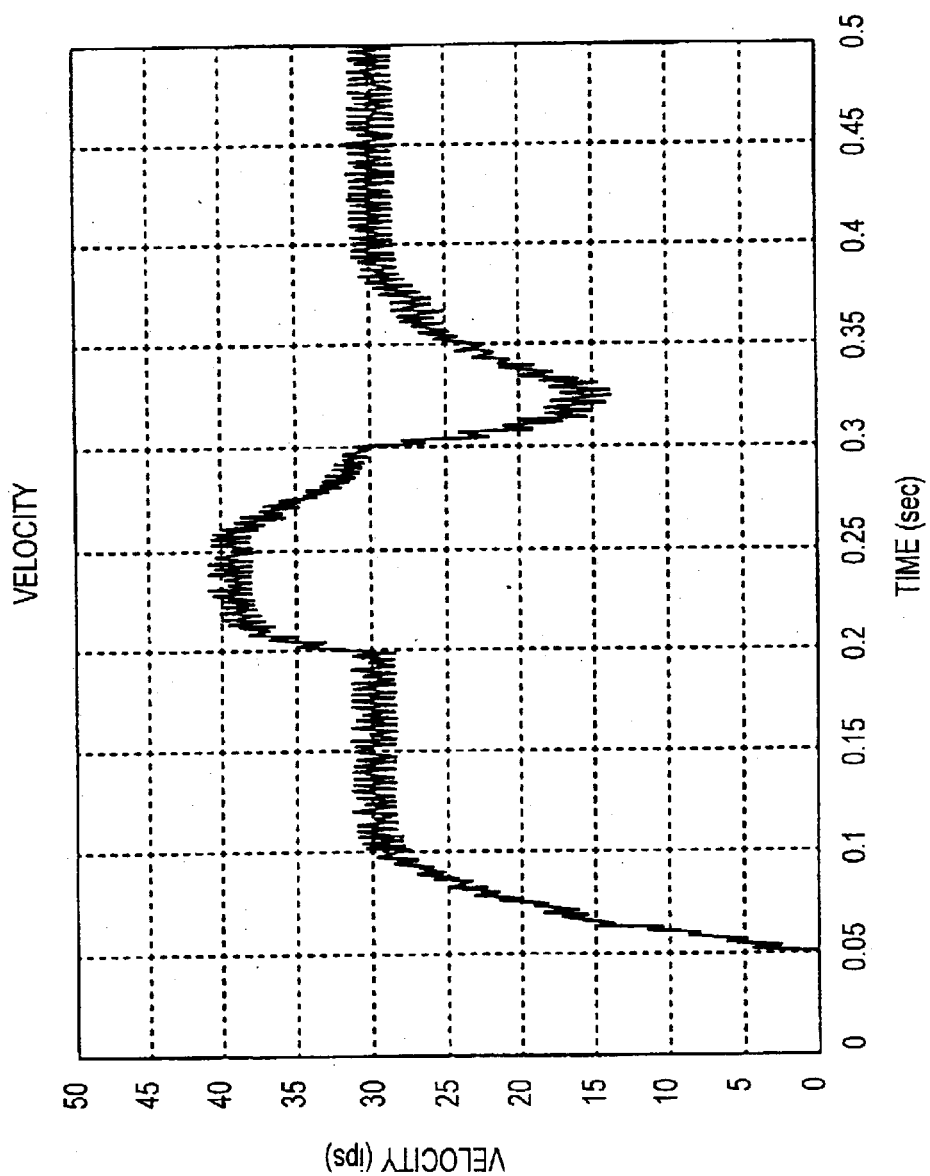
FIG. 19 is a graph indicating a velocity represented by a measured output of a speed calculator in a third or comparative specimen apparatus.

It will be understood from the graph of FIG. 19 that the prior art specimen apparatus suffered from a comparatively large influence of the external disturbances, and a comparatively large magnitude of oscillation in the waveform of the detected velocity immediately after the starting of the apparatus. It will also be understood from the graphs of FIGS. 17 and 18, on the other hand, that the specimen apparatuses of the present invention had considerably smaller influences of the external disturbances and did not substantially suffer from an oscillation in the waveform of the detected velocity immediately after the starting of the apparatus.

It will also be understood from the waveform of FIG. 17 that the differential control quantity is smoothly converged or eventually stabilized, owing to its compensation to the $1/10$ value after expiration of the predetermined derivative effective time, which permitted stable control of the carriage drive motor 235.

Thus, the experiment revealed that the carriage motor control apparatus according to the present invention is advantageous over the prior art apparatus, in the capability of eliminating the external disturbances and the consequent velocity waveform oscillation following the starting of the apparatus, and in the stability of control of the carriage drive motor 235.

While the first and second embodiments use the CR-motor driver circuit 204 of H-bridge configuration as shown in FIG. 12, the CR-motor drive circuit is not limited to that of FIG. 12, but may be arranged otherwise. For instance, the CR-motor driver circuit 204 may be replaced by a modified CR-motor driver circuit 281 as illustrated in FIG. 13, which is provided with a DC motor driver IC 281a and an integrating circuit 281b.

Figure 13:
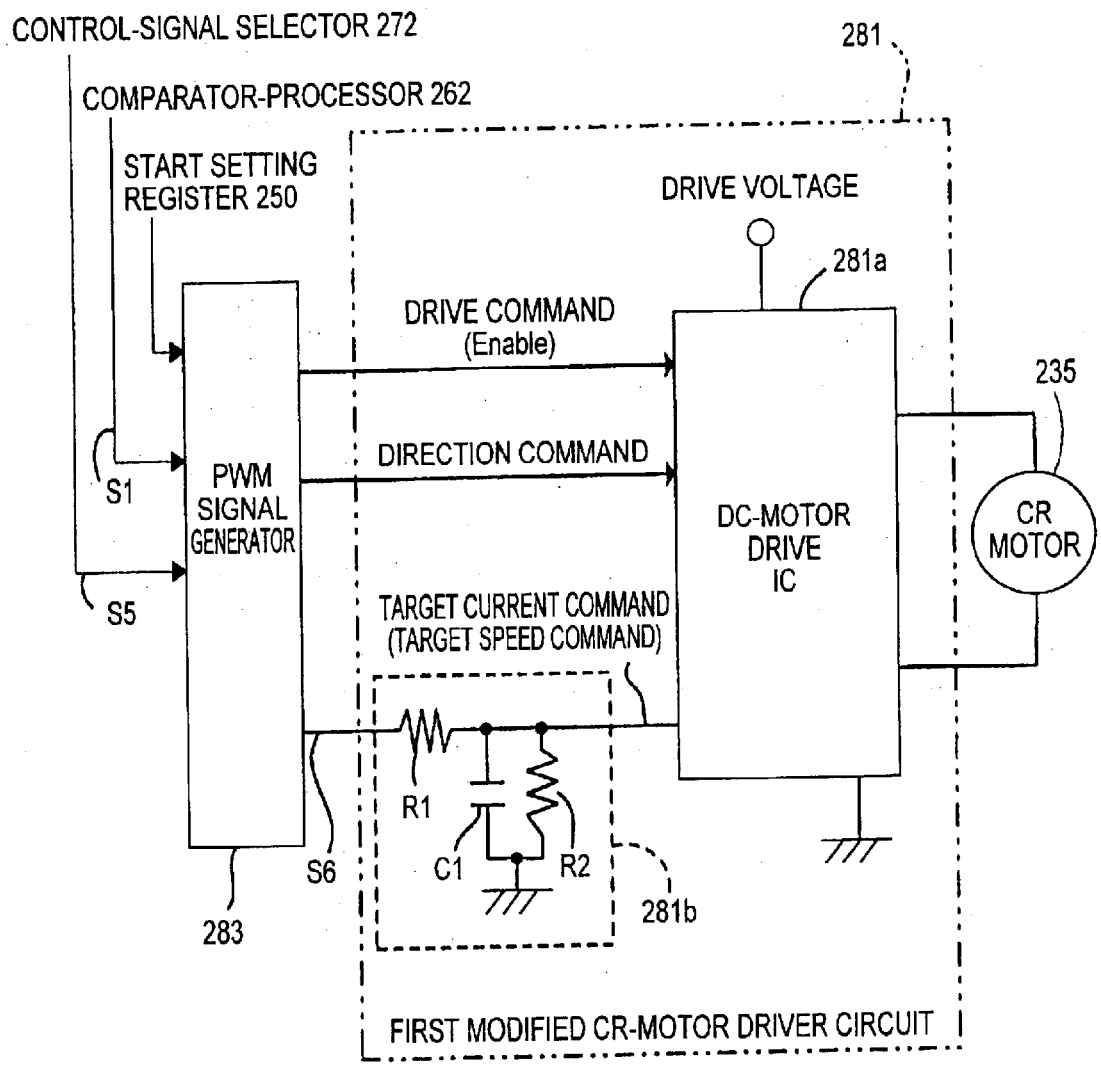
FIG. 13 is a view showing another carriage motor driver circuit according to another embodiment of the invention.

The integrating circuit 281b incorporates resisters R1, R2, and a capacitor C1, and is operable to integrate a PWM signal S6 received from a PWM generator 283, for thereby generating a target speed command (target current command in the form of an analog signal). On the other hand, the DC motor driver IC 281a is arranged to detect an amount of electric current applied to the CR motor 235, and control the amount of electric current to be applied to the CR motor 235 such that the detected amount of electric current coincides with a target value represented by the target speed command (analog signal) received from the integrating circuit 281b. In other words, the DC motor drive IC 281a is arranged to feedback-control the CR motor 235 such that the operating speed of the CR motor 235 coincides with the target value, by controlling the electric current to be applied to the CR motor 235, so as to coincide with the target value. The DC motor driver IC 281a applies the electric current to the CR motor 235 only while a drive command ("Enable") is received from the PWM signal generator 283, and determines the operating direction (forward or reverse direction) of the CR motor 235 on the basis of a direction command also received from the PWM signal generator 283.

Where the modified CR-motor driver circuit 281 of FIG. 13 is used in place of the CR-motor driver circuit 204 of FIG. 12, the ASIC 203 uses the PWM signal generator 283 in place of the PWM signal generator 208. Namely, the PWM signal generator 283 generates the PWM signal S6 and the direction command (indicative of the operating direction of the CR motor 235) on the basis of the motor control signal S5 received from the control-signal selector 272, and generates the drive command ("Enable") indicating whether to energize the CR motor 235 or not, on the basis of the control switching signal S1 received from the comparator-processor 262 and the signal received from the start setting register 250.

The modified CR-motor driver circuit 281 of FIG. 13 according to a third embodiment of the invention permits the operating speed of the CR motor 235 to coincide with the target value, thereby permitting the moving speed of the carriage 231 to coincide with the target value.

Figure 14:
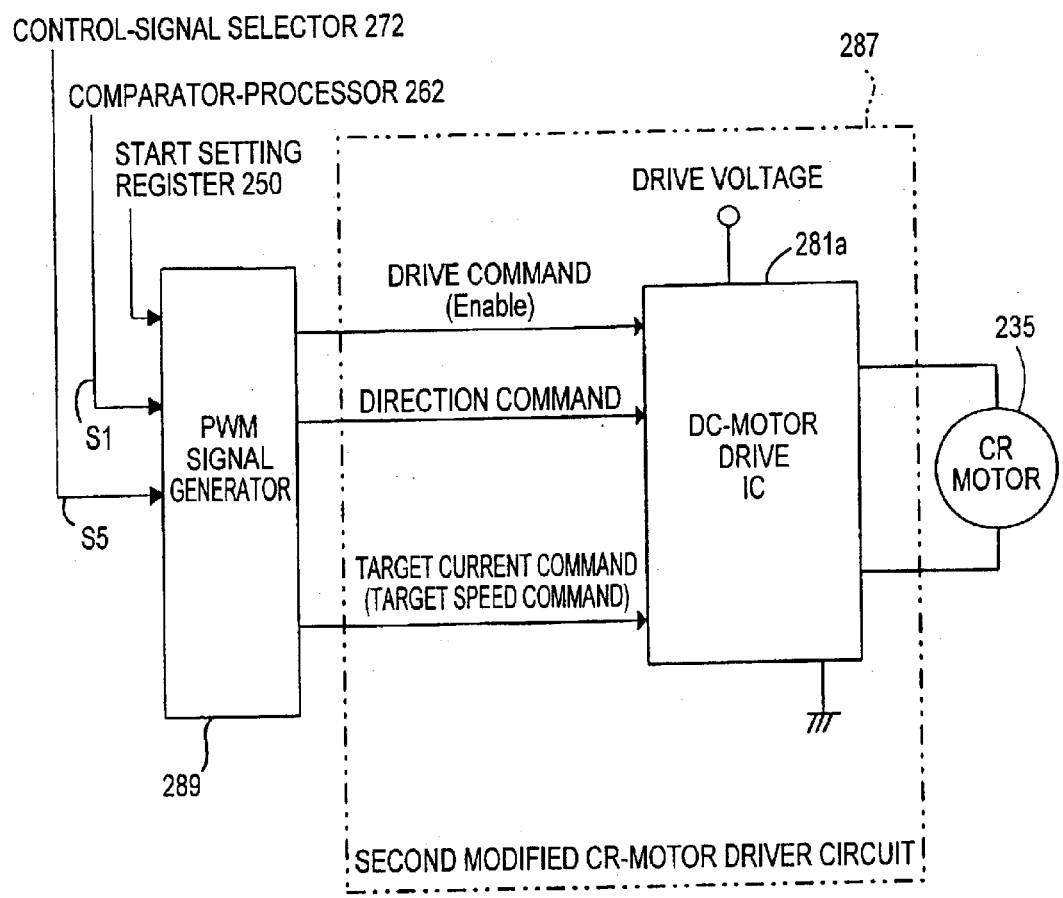
FIG. 14 is a view showing a further carriage motor driver circuit according to a further embodiment of the invention.

The CR-motor driver circuit 204 of FIG. 12 may be replaced by a CR-motor driver circuit 287 shown in FIG. 14 according to a fourth embodiment of the invention. This second modified CR-motor driver circuit 287 is identical with the first modified CR-motor driver circuit 281, except in that the integrating circuit 281b is not provided in the driver circuit 287.

Where the second modified CR-motor driver circuit 287 of FIG. 14 is used, the ASIC 203 uses a PWM signal generator 289 in place of the PWM signal generator 283. The PWM signal generator 289 generates the target current command (target speed command) in the form of an analog signal on the basis of the motor control signal S5 received from the control-signal selector 272.

Unlike the PWM signal generator 283 arranged to generate the PWM signal S6 on the basis of the motor control signal S5, the PWM signal generator 289 generates the target current command in the form of an analog signal, so that the second modified CR-motor driver circuit 287 is not required to be provided with the integrating circuit 281b as provided in the first modified CR-motor driver circuit 281.

The thus arranged second CR-motor driver circuit 287 permits the moving speed of the carriage 231 to coincide with the target value, by controlling the operating speed of the CR motor 235 so as to coincide with the target value.

The PID control of the CR motor 235 is not limited to that by the feedback processor 270 illustrated in FIG. 11 wherein all of the proportional, integral and differential control values or quantities are calculated on the basis of the speed control error as in the illustrated embodiments. For instance, the carriage motor control apparatus according to the present invention may employ a PI-D control of pre-differentiation type wherein the proportional and integral control quantities are calculated on the basis of the speed control error while the differential control quantity is calculated on the basis of the detected moving speed of the carriage 231, or a I-PD control of pre-proportioning and differentiation type wherein the integral control quantity is calculated on the basis of the speed control error while the proportional and differential control quantities are calculated on the basis of the detected moving speed.

In the step S110 of the CR-motor control routine of FIG. 10 executed by the CPU 30, the derivative effective time may be set in the derivative-effective-time register 258 depending upon the target value of the moving speed of the carriage 231 determined by an external command. That is, the derivative effective time is determined depending upon the target moving speed even where the target moving speed is changed according to the external signal. In this case, too, the derivative effective time suitably determined by the target moving speed permits the speed control signal S3 to be suitably controlled so as to control the moving speed of the carriage 231 to coincide with the target value after generation of an external disturbance.

Even where the step S110 is modified to change the derivative effective time with a change in the target moving speed, as described above, the derivative effective time permits the generation of the optimum speed control signal S3 and assures adequate control of the CR motor 235. It will be understood that the thus modified step S110 corresponds to a derivative-effective-time determining portion operable to set the derivative effective time depending upon the target value of the moving speed of the movable object.

In the embodiments described above, the LF motor 20 controlled by the signal generator circuit 100 including the signal rectifying portion 132 is operated to intermittently feed the sheet of paper, while the CR motor 235 controlled by the ASIC 203 including the feedback processor 270 incorporating the differentiator-output compensator 219 is operated to continuously feed the carriage 231. However, it is possible to control the LF motor 20 and the CR motor 235 such that the sheet of paper is continuously fed while the carriage 231 is intermittently fed. In this case, the LF motor 20 may be controlled by a motor control apparatus including the ASIC 203, and/or the CR motor 235 may be controlled by a motor control apparatus including the signal generator circuit 100.

Further, both of the features of the signal generator circuit 100 and the ASIC 203 may be applicable to a single electric motor, for example, to an electric motor provided to feed a carriage of a printer such that the electric motor is controlled so as to prevent or reduce a reverse or oscillating movement of the carriage immediately after starting of the electric motor to feed the carriage, and so as to prevent or reduce an influence of an instantaneous external disturbance on a subsequent feeding movement of the carriage at a predetermined constant speed.

Figure 20:
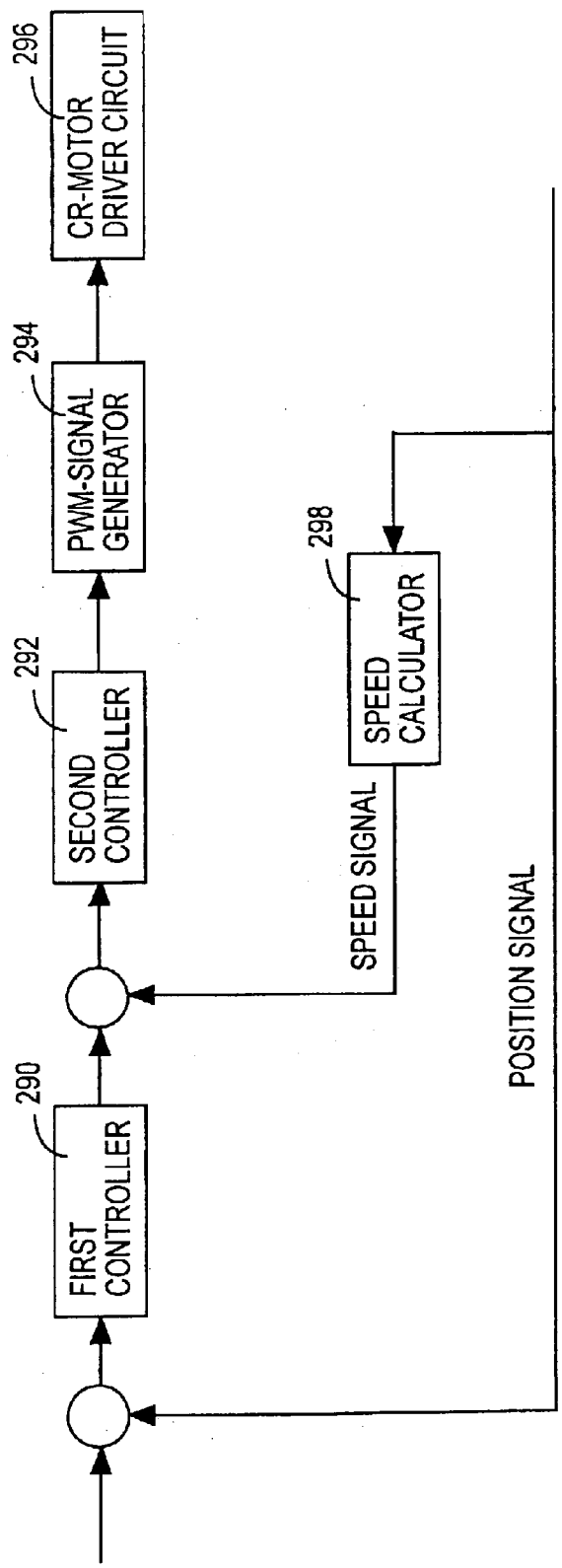
FIG. 20 is a schematic view showing an arrangement of a control apparatus according to a yet further embodiment of this invention for controlling an electric motor for moving a carriage in a printer, which control system includes both a signal rectifying portion as shown in FIG. 2, and a feedback processor having a derivative-effective-time timer and a differentiator-output compensator as shown in FIG. 11.
Figure 21:
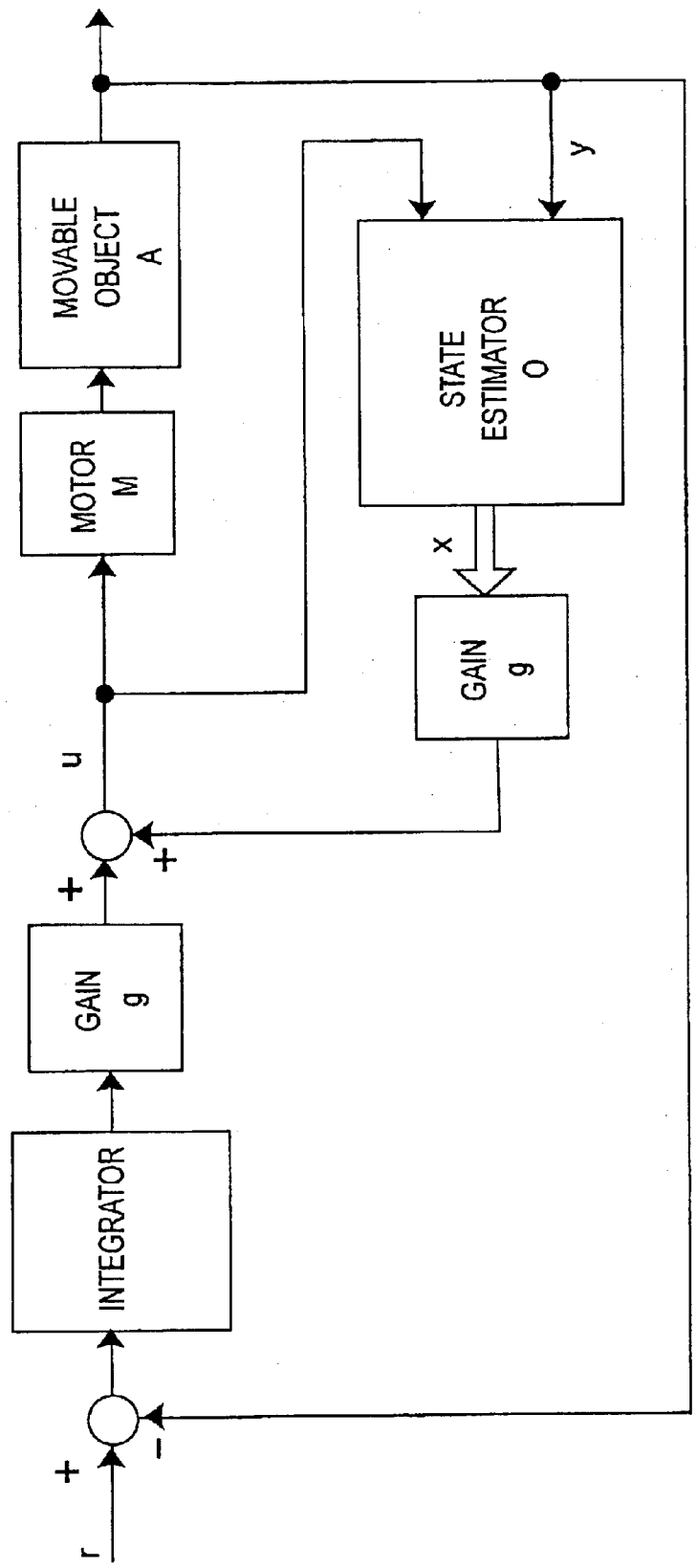
FIG. 21 is a block diagram showing an arrangement of a known control device including a state estimator and operable to control an electric motor.

FIG. 20 illustrates a basic concept of the arrangement incorporating the two features employed for the carriage drive motor. The arrangement includes a first controller 290 incorporating the signal generator 130 of FIG. 2, a second controller 292 incorporating the feedback processor 270 of FIG. 11, a PWM signal generator 294, a CR-motor driver circuit 296 connected to the carriage driver motor, and a speed calculator 298. The PWM signal generator 294 is similar to the PWM signal generator 208, and the CR-motor driver circuit 296 is similar to the CR-motor driver circuit 204. The first controller 290 receives as inputs thereof a target-position signal representative of a target position of the carriage, and an actual-position signal indicative of a detected position of the carriage. The second controller 292 receives as inputs thereof an output of the first controller 290 and a speed signal received from the speed calculator 298, which generates the speed signal on the basis of the actual-position signal. The PWM signal generator 294 generates a pulse-width-modulation signal on the basis of an output of the second controller 292, and the CR-motor driver circuit 296 receives the pulse-width-modulation signal from the PWM signal generator 294. The present arrangement of FIG. 20 is effective to prevent or reduce a reverse or oscillating movement of the carriage immediately after initiation of operation of the electric motor, and an adverse influence of an instantaneous external disturbance or noise on the subsequent feeding movement of the carriage at a predetermined constant speed during a printing operation of a printing head carried by the carriage.

What is claimed is:

1. An apparatus for controlling an electric motor provided to drive a movable object, comprising:

a target inputting portion operable to input a target value for controlling a motion of said movable object by said electric motor;

a detector operable to detect one of the motion of said movable object or a motion of said electric motor;

a first signal generator operable to generate a first control signal on the basis of an output of said detector and said target value input by said target inputting portion;

an estimator operable to estimate a state quantity indicative of a state of the motion of said movable object, on the basis of said output of said detector and a motor control signal applied to said electric motor;

a second signal generator operable to generate a second control signal on the basis of said state quantity estimated by said estimator;

a motor-control-signal generator operable to generate said motor control signal on the basis of said first control signal and said second control signal; and a rectified-input applying portion operable when said motor control signal requires said electric motor to be operated so as to operate said movable object in an opposite direction opposite to a predetermined direction, said rectified-input applying portion rectifying said motor control signal so as to limit the motion of said movable object in said opposite direction, and applying the rectified motor control signal to said electric motor.

2. An apparatus according to claim 1, wherein said rectified-input applying portion applies to said electric motor said motor control signal as generated by said motor-control-signal generator, when said motor control signal requires said electric motor to be operated so as to operate said movable object in said predetermined direction.

3. An apparatus according to claim 1, wherein said rectified-input applying portion is operable for a predetermined time period after a moment of initiation of an operation of said electric motor, and when said motor control signal requires said electric motor to be operated so as to operate said movable object in the direction opposite to said predetermined direction.

4. An apparatus according to claim 3, further comprising a rectifying-time-period changing portion operable to change said time period depending upon said target value.

5. An apparatus according to claim 1, wherein said first signal generator includes an integrating portion operable to integrate an error between said target value and a value represented by the output of said detector, and a first-gain multiplying portion operable to multiply said error integrated by said integrating portion, by a predetermined first gain, and wherein said second-signal generator includes a second-gain multiplying portion operable to multiply said state quantity estimated by said estimator, by a predetermined second gain.

6. An apparatus according to claim 5, wherein said rectified-input applying portion is operable for a predetermined time period after a moment of initiation of an operation of said electric motor, and when said motor control signal requires said electric motor to be operated so as to operate said movable object in the direction opposite to said predetermined direction, said apparatus further comprising:

a gain changing portion operable to change said first gain used by said first-gain multiplying portion; and a rectifying-time-period changing portion operable to change said time period depending upon said target value and said first gain.

7. An apparatus according to claim 5, wherein said rectified-input applying portion is operable for a predetermined time period after a moment of initiation of an operation of said electric motor, and when said motor control signal requires aid electric motor to be operated so as to operate said movable object in the direction opposite to said predetermined direction, said apparatus further comprising:

a gain changing portion operable to change said second gain used by said second-gain multiplying portion; and a rectifying-time-period changing portion operable to change said time period depending upon said target value and said second gain.

8. An apparatus according to claim 1, wherein said movable object includes a rotary body rotatable during an operation of said electric motor, and said detector includes a rotary member rotatable with said rotary body.

9. An apparatus according to claim 1, wherein said detector includes a rotary member attached to a rotary shaft of said electric motor.

10. An apparatus according to claim 1, wherein said movable object is a rotary body rotated by said electric motor to feed a recording medium in a printer for performing a printing operation on said recording medium.

11. An apparatus according to claim 1, wherein said detector detects said one of the motion of said movable object or said motion of said electric motor in a discrete manner.

12. An apparatus according to claim 1, wherein said motor-control-signal generator includes an intermittent-rotary-motion signal generating portion operable to generate said motor control signal for operating said electric motor to cause an intermittent rotary motion in said predetermined direction.

13. An apparatus according to claim 1, wherein said target inputting portion is operable to input said target value which corresponds to a position at which said movable object is positioned by said electric motor.

14. A method of controlling an electric motor provided to drive a movable object, comprising the steps of:

inputting a target value for controlling a motion of said movable object by said electric motor;

detecting one of the motion of said movable object or a motion of said electric motor;

generating a first control signal on the basis of the detected motion of said movable object or electric motor and said target value;

estimating a state quantity indicative of a state of the motion of said movable object, on the basis of the detected motion of said movable object or electric motor and a motor control signal applied to said electric motor;

generating a second control signal on the basis of the estimated state quantity;

generating said motor control signal on the basis of said first control signal and said second control signal; and rectifying said motor control signal, when said motor control signal requires said electric motor to be operated so as to operate said movable object in an opposite direction opposite to a predetermined direction, so as to limit the motion of said movable object in said opposite direction, and applying the rectified motor control signal to said electric motor.

15. A method according to claim 14, wherein said motor control signal is applied to said electric motor, without rectification of the motor control signal, when said motor control signal requires said electric motor to be operated so as to operate said movable object in said predetermined direction.

16. A method according to claim 14, wherein said motor control signal which requires said electric motor to be operated so as to operate said movable object in said opposite direction is rectified for a predetermined time period after a moment of initiation of an operation of said electric motor.

17. A method according to claim 16, further comprising the step of changing said time period depending upon said target value.

18. A method according to claim 14, wherein said first control signal is generated by integrating an error between said target value and the detected motion of said movable object or electric motor, and multiplying the integrated error by a predetermined first gain, and wherein said second control signal is generated by multiplying said estimated state quantity by a predetermined second gain.

19. A method according to claim 18, wherein said motor control signal which requires said electric motor to be operated so as to operate said movable object in said opposite direction is rectified for a predetermined time period after a moment of initiation of an operation of said electric motor, said method further comprising the steps of:

changing said first gain used to generate said first control signal; and changing said time period depending upon said target value and said first gain.

20. A method according to claim 18, wherein said motor control signal which requires said electric motor to be operated so as to operate said movable object in said opposite direction is rectified for a predetermined time period after a moment of initiation of an operation of said electric motor, said method further comprising the steps of:

changing said second gain used to generate said second control signal; and changing said time period depending upon said target value and said second gain.

21. A method according to claim 14, wherein said movable object is a rotary body rotated by said electric motor to feed a recording medium in a printer for performing a printing operation on said recording medium.

22. A control program executable by a computer system, for controlling an electric motor provided to drive a movable object, by implementing the steps of:

inputting a target value for controlling a motion of said movable object by said electric motor;

detecting one of the motion of said movable object or a motion of said electric motor;

generating a first control signal on the basis of the detected motion of said movable object or electric motor and said target value;

estimating a state quantity indicative of a state of the motion of said movable object, on the basis of the detected motion of said movable object or electric motor and a motor control signal applied to said electric motor;

generating a second control signal on the basis of the estimated state quantity;

generating said motor control signal on the basis of said first control signal and said second control signal; and rectifying said motor control signal, when said motor control signal requires said electric motor to be operated so as to operate said movable object in an opposite direction opposite to a predetermined direction, so as to limit the motion of said movable object in said opposite direction, and applying the rectified motor control signal to said electric motor.

23. A control program according to claim 22, wherein said movable object is a rotary body rotated by said electric motor to feed a recording medium in a printer for performing a printing operation on said recording medium.

24. A data storage medium accessible by a computer system and storing a control program according to claim 22.

25. A printer including a paper-feeding electric motor, and a paper-feeding mechanism having a rotary body rotatable by said paper-feeding electric motor to feed a recording medium, during a printing operation on said recording medium, said printer comprising:

a target inputting portion operable to input a target value for controlling a rotary motion of said rotary body by said paper-feeding electric motor;

a detector operable to detect one of the rotary motion of said rotary body and a rotary motion of said paper-feeding electric motor;

a first signal generator operable to generate a first control signal on the basis of an output of said detector and said target value input by said target inputting portion;

an estimator operable to estimate a state quantity indicative of a state of the rotary motion of said rotary body, on the basis of said output of said detector and a motor control signal applied to said paper-feeding electric motor;

a second signal generator operable to generate a second control signal on the basis of said state quantity estimated by said estimator;

a motor-control-signal generator operable to generate said motor control signal on the basis of said first control signal and said second control signal; and a rectified-input applying portion operable when said motor control signal requires said paper-feeding electric motor to be operated so as to rotate said rotary body in an opposite direction opposite to a predetermined direction, said rectified-input applying portion rectifying said motor control signal so as to limit the rotary motion of said rotary body in said opposite direction, and applying the rectified motor control signal to said paper-feeding electric motor.

26. A printer according to claim 25, further including a carriage-drive electric motor, a carriage movable by said carriage-drive electric motor in a direction intersecting a direction of feeding of said recording medium by said paper feeding mechanism, and a printing head carried by said carriage and operable to perform said printing operation on said recording medium, said printer further comprising:

a speed detector operable to detect a moving speed of said carriage in a discrete manner;

a speed-control-error calculator operable to calculate a speed control error between the moving speed detected by said speed detector and an externally commanded target speed value;

a speed-control-quantity calculator operable to calculate speed control quantities including a proportional control quantity proportional to said detected moving speed or said speed control error, and an integral control quantity proportional to an integral of said speed control error;

a differential-control-quantity calculator operable to calculate a differential control quantity proportional to a derivative or an amount of change per unit time of said detected moving speed or said speed control error;

a control-command-value determining portion operable to determine a control command value for operating said carriage-drive electric motor to move said carriage at said target speed value, on the basis of said speed control quantities and said differential control quantity, said electric motor being controlled according to said control command value such that said detected moving speed coincides with said target speed value; and a differential-control-quantity compensating portion operable after a predetermined derivative effective time after each point of time at which said differential control quantity is updated by said differential-control-quantity calculator on the basis of the moving speed detected by said speed detector, to compensate said differential control quantity such that the compensated differential control quantity is smaller than the differential control quantity as updated by said differential-control-quantity calculator, said derivative effective time being shorter than a period of detection of said moving speed by said speed detector.

27. An apparatus for feedback-controlling an operating speed of an electric motor provided to drive a movable object, comprising:

a speed detector operable to detect a moving speed of said movable object in a discrete manner;

a speed-control-error calculator operable to calculate a speed control error between the moving speed detected by said speed detector and an externally commanded target speed value;

a speed-control-quantity calculator operable to calculate speed control quantities including a proportional control quantity proportional to said detected moving speed or said speed control error, and an integral control quantity proportional to an integral of said speed control error;

a differential-control-quantity calculator operable to calculate a differential control quantity proportional to a derivative or an amount of change per unit time of said detected moving speed or said speed control error;

a control-command-value determining portion operable to determine a control command value for operating said electric motor to move said movable object at said target speed value, on the basis of said speed control quantities and said differential control quantity, said electric motor being controlled according to said control command value such that said detected moving speed coincides with said target speed value; and a differential-control-quantity compensating portion operable after expiration of a predetermined derivative effective time after each point of time at which said differential control quantity is updated by said differential-control-quantity calculator on the basis of the moving speed detected by said speed detector, to compensate said differential control quantity such that the compensated differential control quantity is smaller than the differential control quantity as updated by said differential-control-quantity calculator, said derivative effective time being shorter than a period of detection of said moving speed by said speed detector.

28. An apparatus according to claim 27, wherein said differential-control-quantity compensating portion reduces said differential control quantity as a time passes after the expiration of said predetermined derivative effective time.

29. An apparatus according to claim 27, wherein said differential-control-quantity compensating portion reduces said differential control quantity to a predetermined constant value.

30. An apparatus according to claim 27, wherein said differential-control-quantity calculator calculates said differential control quantity at a predetermined constant time interval.

31. An apparatus according to claim 27, further comprising a command-signal generator operable to generate a pulse-width-modulation signal for controlling said electric motor, on the basis of said control command value, at a predetermined pulse-width-modulation time interval, and said predetermined derivative effective time is longer than said pulse-width-modulation time interval.

32. An apparatus according to claim 27, further comprising a derivative-effective-time determining portion operable to determine said predetermined derivative effective time depending upon said target speed value.

33. An apparatus according to claim 27, wherein said movable object is a carriage which is movable by said electric motor and which carries a printing head for performing a printing operation in a printer.

34. An apparatus according to claim 27, further comprising a constant-target-value determining portion operable to determine a constant value as said externally commanded target speed value.

35. A method of feedback-controlling an operating speed of an electric motor provided to drive a movable object, comprising the steps of:

detecting a moving speed of said movable object in a discrete manner;

calculating a speed control error between the detected moving speed and an externally commanded target speed value;

calculating speed control quantities including a proportional control quantity proportional to said detected moving speed or said speed control error, and an integral control quantity proportional to an integral of said speed control error;

calculating a differential control quantity proportional to a derivative or an amount of change of said detected moving speed per unit time or said speed control error;

determining a control command value for operating said electric motor to move said movable object at said target speed value, on the basis of said speed control quantities and said differential control quantity, said electric motor being controlled according to said control command value such that said detected moving speed coincides with said target speed value; and after expiration of a predetermined derivative effective time after each point of time at which said differential control quantity is updated on the basis of the detected moving speed, compensating said differential control quantity such that the compensated differential control quantity is smaller than the updated differential control quantity, said derivative effective time being shorter than a period of detection of said moving speed.

36. A method according to claim 35, wherein said step of compensating said differential control quantity comprises reducing said differential control quantity as a time passes after the expiration of said predetermined derivative effective time.

37. A method according to claim 35, wherein said step of compensating said differential control quantity comprises reducing said differential control quantity to a predetermined constant value.

38. A method according to claim 35, wherein said step of calculating a differential control quantity comprises calculating said differential control quantity at a predetermined constant time interval.

39. A method according to claim 35, further comprising the step of generating a pulse-width-modulation signal for controlling said electric motor, on the basis of said control command value, at a predetermined pulse-width-modulation time interval, and wherein said step of compensating said differential control quantity comprises compensating said differential control quantity after expiration of the predetermined derivative effective time which is longer than said pulse-width-modulation time interval.

40. A method according to claim 35, further comprising the step of determining said predetermined derivative effective time depending upon said target speed value.

41. A method according to claim 35, wherein said movable object is a carriage which is movable by said electric motor and which carries a printing head for performing a printing operation in a printer.

42. A control program executable by a computer system, for controlling an electric motor provided to drive a movable object, by implementing the steps of:
   detecting a moving speed of said movable object in a discrete manner;
   calculating a speed control error between the detected moving speed and an externally commanded target speed value;
   calculating speed control quantities including a proportional control quantity proportional to said detected moving speed or said speed control error, and an integral control quantity proportional to an integral of said speed control error;
   calculating a differential control quantity proportional to a derivative or an amount of change of said detected moving speed per unit time or said speed control error;
   determining a control command value for operating said electric motor to move said movable object at said target speed value, on the basis of said speed control quantities and said differential control quantity, said electric motor being controlled according to said control command value such that said detected moving speed coincides with said target speed value; and
   after expiration of a predetermined derivative effective time after each point of time at which said differential control quantity is updated on the basis of the detected moving speed, compensating said differential control quantity such that the compensated differential control quantity is smaller than the updated differential control quantity, said derivative effective time being shorter than a period of detection of said moving speed.

43. A control program according to claim 42, wherein said movable object is a carriage which is movable by said electric motor and which carries a printing head for performing a printing operation in a printer.

44. A data storage medium accessible by a computer system and storing a control program according to claim 42.

45. A printer including a carriage-drive electric motor, a carriage movable by said carriage-drive electric motor, and a printing head carried by said carriage and operable to perform a printing operation on a recording medium, said printer comprising:
   a speed detector operable to detect a moving speed of said carriage in a discrete manner;
   a speed-control-error calculator operable to calculate a speed control error between the moving speed detected by said speed detector and an externally commanded target speed value;
   a speed-control-quantity calculator operable to calculate speed control quantities including a proportional control quantity proportional to said detected moving speed or said speed control error, and an integral control quantity proportional to an integral of said speed control error;
   a differential-control-quantity calculator operable to calculate a differential control quantity proportional to a derivative or an amount of change of said detected moving speed per unit time or said speed control error;
   a control-command-value determining portion operable to determine a control command value for operating said electric motor to move said carriage at said target speed value, on the basis of said speed control quantities and said differential control quantity, said electric motor being controlled according to said control command value such that said detected moving speed coincides with said target speed value; and
   a differential-control-quantity compensating portion operable after expiration of a predetermined derivative effective time after each point of time at which said differential control quantity is updated by said differential-control-quantity calculator on the basis of the moving speed detected by said speed detector, to compensate said differential control quantity such that the compensated differential control quantity is smaller than the differential control quantity as updated by said differential-control-quantity calculator, said derivative effective time being shorter than a period of detection of said moving speed by said speed detector.

46. A printer including:
   a medium-support member operable to support a recording medium;
   a printing head operable to perform a printing operation on said recording medium supported by said medium-support member;
   an intermittent-relative-movement device including an electric motor and operable to intermittently move said recording medium and said printing head relative to each other; and
   a motor control apparatus operable to control said electric motor,
   and wherein said motor control apparatus comprising:
   a target inputting portion operable to input a target value for controlling an intermittent relative movement of said recording medium and said printing head;
   a detector operable to detect said intermittent relative movement;
   a first signal generator operable to generate a first control signal on the basis of an output of said detector and said target value input by said target inputting portion;
   an estimator operable to estimate a state quantity indicative of a state of said intermittent relative movement, on the basis of said output of said detector and a motor control signal applied to said electric motor;

a second signal generator operable to generate a second control signal on the basis of said state quantity estimated by said estimator;

a motor-control-signal generator operable to generate said motor control signal on the basis of said first control signal and said second control signal; and a rectified-input applying portion operable when said motor control signal requires said electric motor to be operated so as to effect said intermittent relative movement in an opposite direction opposite to a predetermined direction, said rectified-input applying portion rectifying said motor control signal so as to limit said intermittent relative movement in said opposite direction, and applying the rectified motor control signal to said paper-feeding electric motor.

47. A printer according to claim 46, wherein said intermittent-relative-movement device comprises at least one rotatable feed roller for contact with said recording medium to feed said recording medium, and a roller rotating device including said electric motor and operable to intermittently rotate said at last one rotatable feed roller.

48. A printer including:

a medium-support member operable to support a recording medium;

a printing head operable to perform a printing operation on said recording medium supported by said medium-support member;

a continuous-relative-movement device including an electric motor and operable to continuously move said recording medium and said printing head relative to each other; and a motor control apparatus operable to control said electric motor, and wherein said motor control apparatus comprising:

a speed detector operable to detect a speed of a continuous relative movement of said recording medium and said printing head in a discrete manner;

a speed-control-error calculator operable to calculate a speed control error between the speed of said continuous relative movement detected by said speed detector and an externally commanded target speed value;

a speed-control-quantity calculator operable to calculate speed control quantities including a proportional control quantity proportional to the detected speed of said continuous relative movement or said speed control error, and an integral control quantity proportional to an integral of said speed control error;

a differential-control-quantity calculator operable to calculate a differential control quantity proportional to a derivative or an amount of change of the detected speed per unit time of said continuous relative movement or said speed control error;

a control-command-value determining portion operable to determine a control command value for operating said electric motor to effect said continuous relative movement at said target speed value, on the basis of said speed control quantities and said differential control quantity, said electric motor being controlled according to said control command value such that the detected speed of said continuous relative movement coincides with said target speed value; and a differential-control-quantity compensating portion operable after expiration of a predetermined derivative effective time after each point of time at which said differential control quantity is updated by said differential-control-quantity calculator on the basis of the speed of said continuous relative movement detected by said speed detector, to compensate said differential control quantity such that the compensated differential control quantity is smaller than the differential control quantity as updated by said differential-control-quantity calculator, said derivative effective time being shorter than a period of detection of the speed of said continuous relative movement by said speed detector.

49. A printer according to claim 48, wherein said continuous-relative-movement device comprises a carriage which carries said printing head and which is movable in a direction parallel to said medium-support member, and a carriage moving device including said electric motor and operable to move said carriage.

50. A printer including:

a medium-support member operable to support a recording medium;

a printing head operable to perform a printing operation on said recording medium supported by said medium-support member;

an intermittent-relative-movement device including a first electric motor and operable to intermittently move said recording medium and said printing head relative to each other;

a continuous-relative-movement device including a second electric motor and operable to continuously move said recording medium and said printing head relative to each other;

a first motor control apparatus operable to control said first electric motor; and a second motor control apparatus operable to control said second electric motor, wherein said first motor control apparatus comprising:

a target inputting portion operable to input a target value for controlling an intermittent relative movement of said recording medium and said printing head;

a detector operable to detect said intermittent relative movement;

a first signal generator operable to generate a first control signal on the basis of an output of said detector and said target value input by said target inputting portion;

an estimator operable to estimate a state quantity indicative of a state of said intermittent relative movement, on the basis of said output of said detector and a motor control signal applied to said first electric motor;

a second signal generator operable to generate a second control signal on the basis of said state quantity estimated by said estimator;

a motor-control-signal generator operable to generate said motor control signal on the basis of said first control signal and said second control signal; and a rectified-input applying portion operable when said motor control signal requires said first electric motor to be operated so as to effect said intermittent relative movement in an opposite direction opposite to a predetermined direction, said rectified-input applying portion rectifying said motor control signal so as to limit said intermittent relative movement in said opposite direction, and applying the rectified motor control signal to said first electric motor, and wherein said second motor control apparatus comprising:

a speed detector operable to detect a speed of a continuous relative movement of said recording medium and said printing head in a discrete manner;

a speed-control-error calculator operable to calculate a speed control error between the speed of said continuous relative movement detected by said speed detector and an externally commanded target speed value;

a speed-control-quantity calculator operable to calculate speed control quantities including a proportional control quantity proportional to the detected speed of said continuous relative movement or said speed control error, and an integral control quantity proportional to an integral of said speed control error;

a differential-control-quantity calculator operable to calculate a differential control quantity proportional to a derivative or an amount of change per unit time of the detected speed of said continuous relative movement or said speed control error;

a control-command-value determining portion operable to determine a control command value for operating said second electric motor to effect said continuous relative movement at said target speed value, on the basis of said speed control quantities and said differential control quantity, said second electric motor being controlled according to said control command value such that the detected speed of said continuous relative movement coincides with said target speed value; and a differential-control-quantity compensating portion operable after expiration of a predetermined derivative effective time after each point of time at which said differential control quantity is updated by said differential-control-quantity calculator on the basis of the speed of said continuous relative movement detected by said speed detector, to compensate said differential control quantity such that the compensated differential control quantity is smaller than the differential control quantity as updated by said differential-control-quantity calculator, said derivative effective time being shorter than a period of detection of the speed of said continuous relative movement by said speed detector.

51. An apparatus for controlling an electric motor provided to drive a movable object, comprising (a) a position controlling portion and (b) a speed controlling portion, wherein said position controlling portion includes:

a target inputting portion operable to input a target position for controlling a position of said movable object by said electric motor;

a detector operable to detect one of the position of said movable object or a motion of said electric motor;

a first signal generator operable to generate a first control signal on the basis of an output of said detector and said target value input by said target inputting portion;

an estimator operable to estimate a state quantity indicative of a state of the motion of said movable object, on the basis of said output of said detector and a motor control signal applied to said electric motor;

a second signal generator operable to generate a second control signal on the basis of said state quantity estimated by said estimator;

a motor-control-signal generator operable to generate said motor control signal on the basis of said first control signal and said second control signal; and a rectified-input applying portion operable when said motor control signal requires said electric motor to be operated so as to operate said movable object in an opposite direction opposite to a predetermined direction, said rectified-input applying portion rectifying said motor control signal so as to limit the motion of said movable object in said opposite direction, and applying the rectified motor control signal to said electric motor, and wherein said speed controlling portion includes:

a speed detector operable to detect a moving speed of said movable object in a discrete manner;

a speed-control-error calculator operable to calculate a speed control error between the moving speed detected by said speed detector and an externally commanded target speed value;

a speed-control-quantity calculator operable to calculate speed control quantities including a proportional control quantity proportional to said detected moving speed or said speed control error, and an integral control quantity proportional to an integral of said speed control error;

a differential-control-quantity calculator operable to calculate a differential control quantity proportional to a derivative or an amount of change per unit time of said detected moving speed or said speed control error;

a control-command-value determining portion operable to determine a control command value for operating said electric motor to move said movable object at said target speed value, on the basis of said speed control quantities and said differential control quantity, said electric motor being controlled according to said control command value such that said detected moving speed coincides with said target speed value; and a differential-control-quantity compensating portion operable after expiration of a predetermined derivative effective time after each point of time at which said differential control quantity is updated by said differential-control-quantity calculator on the basis of the moving speed detected by said speed detector, to compensate said differential control quantity such that the compensated differential control quantity is smaller than the differential control quantity as updated by said differential-control-quantity calculator, said derivative effective time being shorter than a period of detection of said moving speed by said speed detector.

* * * * *